(12) United States Patent
Dejneka et al.

(10) Patent No.: US 10,544,059 B2
(45) Date of Patent: *Jan. 28, 2020

(54) ION EXCHANGEABLE GLASS, GLASS CERAMICS AND METHODS FOR MAKING THE SAME

(71) Applicant: CORNING INCORPORATED, Corning, NY (US)

(72) Inventors: Matthew John Dejneka, Corning, NY (US); Qiang Fu, Painted Post, NY (US); Timothy Michael Gross, Corning, NY (US); Xiaoju Guo, Painted Post, NY (US); Sumalee Likitvanichkul, Painted Post, NY (US); John Christopher Mauro, Boalsburg, PA (US)

(73) Assignee: CORNING INCORPORATED, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/706,044

(22) Filed: Sep. 15, 2017

(65) Prior Publication Data

US 2018/0022640 A1 Jan. 25, 2018

Related U.S. Application Data

(63) Continuation of application No. 14/469,688, filed on Aug. 27, 2014, now Pat. No. 9,790,124.
(Continued)

(51) Int. Cl.
*C03C 10/00* (2006.01)
*C03B 32/02* (2006.01)
(Continued)

(52) U.S. Cl.
CPC .......... *C03C 10/0009* (2013.01); *C03B 32/02* (2013.01); *C03C 3/091* (2013.01);
(Continued)

(58) Field of Classification Search
None
See application file for complete search history.

(56) References Cited

U.S. PATENT DOCUMENTS 2,920,971 A 1/1960 Stookey
3,282,770 A 11/1966 Stookey et al.
(Continued)

FOREIGN PATENT DOCUMENTS

CN 102177102 A 9/2011
CN 102690059 A 9/2012
(Continued)

OTHER PUBLICATIONS

English Translation of CN201480059079.3 Notice of First Office Action dated Dec. 12, 2017; 7 Pages; Chinese Patent Office.
(Continued)

Primary Examiner — David Sample
(74) Attorney, Agent, or Firm — Kevin M. Johnson

(57) ABSTRACT

Glass-ceramics and precursor glasses that are crystallizable to glass-ceramics are disclosed. The glass-ceramics of one or more embodiments include rutile, anatase, armalcolite or a combination thereof as the predominant crystalline phase. Such glasses and glass-ceramics may include compositions of, in mole %: $SiO_2$ in the range from about 45 to about 75; $Al_2O_3$ in the range from about 4 to about 25; $P_2O_5$ in the range from about 0 to about 10; MgO in the range from about 0 to about 8; $R_2O$ in the range from about 0 to about 33; ZnO in the range from about 0 to about 8; $ZrO_2$ in the range from about 0 to about 4; $B_2O_3$ in the range from about 0 to about 12, and one or more nucleating agents in the range
(Continued)

from about 0.5 to about 12. In some glass-ceramic articles, the total crystalline phase includes up to 20% by weight of the glass-ceramic article.

14 Claims, 22 Drawing Sheets

Related U.S. Application Data

(60) Provisional application No. 62/018,737, filed on Jun. 30, 2014, provisional application No. 61/871,986, filed on Aug. 30, 2013.

(51) Int. Cl.
| | |
|---|---|
| *C03C 21/00* | (2006.01) |
| *C03C 3/097* | (2006.01) |
| *C03C 3/112* | (2006.01) |
| *C03C 4/02* | (2006.01) |
| *C03C 4/00* | (2006.01) |
| *C03C 3/091* | (2006.01) |

(52) U.S. Cl.
CPC .............. *C03C 3/097* (2013.01); *C03C 3/112* (2013.01); *C03C 4/005* (2013.01); *C03C 4/02* (2013.01); *C03C 10/00* (2013.01); *C03C 21/002* (2013.01); *C03C 2204/00* (2013.01); *Y10T 428/315* (2015.01)

(56) References Cited

U.S. PATENT DOCUMENTS

| | | | |
|---|---|---|---|
| 3,380,818 A | 4/1968 | Smith | |
| 3,428,513 A | 2/1969 | Denman | |
| 3,481,726 A | 12/1969 | Fischer et al. | |
| 3,490,984 A | 1/1970 | Petticrew et al. | |
| 3,498,773 A | 3/1970 | Grubb et al. | |
| 3,529,946 A | 9/1970 | Fischer et al. | |
| 3,582,371 A | 6/1971 | Bruno et al. | |
| 3,617,317 A | 11/1971 | Mainz-Gonsenheim et al. | |
| 3,625,718 A | 12/1971 | Petticrew | |
| 3,642,504 A | 2/1972 | Petzold et al. | |
| 3,673,049 A | 6/1972 | Giffen et al. | |
| 3,834,911 A | 9/1974 | Hammel | |
| 3,844,754 A | 10/1974 | Grubb et al. | |
| 3,985,533 A | 10/1976 | Grossman | |
| 4,042,403 A | 8/1977 | Reade | |
| 4,074,992 A | 2/1978 | Voss | |
| 4,074,993 A | 2/1978 | Ackerman et al. | |
| 4,102,664 A | 7/1978 | Dumbaugh, Jr. | |
| 4,461,839 A | 7/1984 | Rittler | |
| 4,515,897 A | 5/1985 | Sack et al. | |
| 5,432,130 A | 7/1995 | Rheinberger et al. | |
| 5,446,008 A | 8/1995 | Krolla et al. | |
| 6,121,175 A | 9/2000 | Drescher et al. | |
| 6,306,784 B1 | 10/2001 | Drescher et al. | |
| 6,689,704 B2 | 2/2004 | Ota et al. | |
| 6,846,760 B2 | 1/2005 | Siebers et al. | |
| 7,141,521 B2 | 11/2006 | Siebers et al. | |
| 7,476,633 B2 | 1/2009 | Comte et al. | |
| 7,666,511 B2 | 2/2010 | Ellison et al. | |
| 8,053,381 B2 | 11/2011 | Siebers et al. | |
| 8,168,295 B2 | 5/2012 | Murata | |
| 8,349,454 B2 | 1/2013 | Murata et al. | |
| 9,115,023 B2 * | 8/2015 | Beall | C03B 20/00 |
| 9,701,574 B2 * | 7/2017 | Beunet | C03C 10/0027 |
| 9,783,453 B2 | 10/2017 | Gross | |
| 9,790,124 B2 * | 10/2017 | Dejneka | C03B 32/02 |
| 2002/0010064 A1 | 1/2002 | Ota et al. | |
| 2002/0023463 A1 | 2/2002 | Siebers et al. | |
| 2004/0072669 A1 | 4/2004 | Beall et al. | |
| 2004/0198579 A1 | 10/2004 | Horsfall et al. | |
| 2005/0143247 A1 | 6/2005 | Siebers et al. | |
| 2007/0213192 A1 | 9/2007 | Comte et al. | |
| 2007/0259767 A1 | 11/2007 | Siebers et al. | |
| 2008/0286548 A1 | 11/2008 | Ellison et al. | |
| 2009/0197088 A1 | 8/2009 | Murata | |
| 2009/0286667 A1 | 11/2009 | Siebers et al. | |
| 2010/0035745 A1 | 2/2010 | Murata | |
| 2010/0087307 A1 | 4/2010 | Murata et al. | |
| 2010/0242715 A1 | 9/2010 | Raichel et al. | |
| 2011/0318571 A1 | 12/2011 | Murata | |
| 2011/0318572 A1 | 12/2011 | Murata | |
| 2012/0135848 A1 | 5/2012 | Beall et al. | |
| 2012/0141760 A1 | 6/2012 | Murata | |
| 2012/0141801 A1 | 6/2012 | Murata | |
| 2014/0087194 A1 | 3/2014 | Dejneka et al. | |
| 2014/0370066 A1 | 12/2014 | Beall et al. | |
| 2015/0099124 A1 * | 4/2015 | Beunet | C03C 3/093 428/410 |

FOREIGN PATENT DOCUMENTS

| | | |
|---|---|---|
| GB | 1221851 A | 2/1971 |
| JP | 57106535 A | 7/1982 |
| JP | 61101434 A | 5/1986 |
| JP | 5070173 A | 3/1993 |
| JP | 5070174 A | 3/1993 |
| JP | 2008115071 A | 5/2008 |
| JP | 2009084075 A | 4/2009 |
| SU | 1717568 A1 | 3/1992 |
| WO | 2013155281 A1 | 10/2013 |
| WO | 2014052711 A1 | 4/2014 |

OTHER PUBLICATIONS

Arvind et al; "The Effect of TiO2 Addition on the Crystallization and Phase Formation in Lithium Aluminum Silicate (LAS) Glasses Nucleated by P2O5"; Journal of Physics and Chemistry of Solids; 69 (2008) 2622-2627.

Biefeld et al; "Effects of Composition Changes, Substitutions, and Hydrostatic Pressure on The Ionic Conductivity in Lithium Aluminosilicate and Related Beta-Eucryptite Materials"; J. Electrochem. Soc: Electrochemical Science and Technology; vol. 125, No. 2, Feb. 1978, p. 179-185.

Cheng "Carbon Effects on Crystallization Kinetics of Li2O—Al2O3—SiO2 Glasses"; Journal of Non-Crystalline Solids, 238, (1998), 152-157.

Cheng "Determining Crystallization Kinetic Parameters of Li2O—Al2O3—SiO2 Glass From Derivative Differential Thermal Analysis Curves"; Materials Science and Engineering B60 (1999) 194-199.

De Lajarte; "The Effect of Fluorine Associated With Other Minor Batch Constituents on Some Properties of Commercial Glasses"; Glass and Ceramic Bulletin; vol. 8, No. 2, 1961; p. 81-86.

Dong et al; "Effect of Glass Cooling Rate on The Crystallization Behavior and Structure of Lithium Aluminosilicate Glass-Ceramics"; Journal of Inorganic Materials; vol. 27, No. 4 2012. pp. 400-404.

Guo et al; "Crystallization and Microstructure of Li2O3—Al2O3—SiO2 Glass Containing Complex Nucleating Agent"; Thermochimica Acta, 444, (2006) 201-205.

Hawley's Condensed Chemical Dictionary, Mar. 15, 2007, Definition of "Glass Ceramic" (No Author Available).

Hu et al; "Controlled Crystallization of Glass-Ceramics With Two Nucleating Agents"; Materials Characterization 60 (2009) 1529-1533.

Hu et al; "Crystallization and Properties of Li2O—Al2O3—SiO2 Glass-Ceramics Doped With CeO2"; Journal of The Chinese Ceramic Society; vol. 32, No. 6, Jun. 2004, pp. 772-776.

Hu et al; "Effect of Nucleating Agents on The Crystallization of Li2O—Al2O3—SiO2 System Glass"; Journal of Thermal Analysis and Calorimetry, vol. 78 (2004) 991-997.

Hu et al; "Phase Transformations of Li2O—Al2O3—SiO2 Glasses With CeO2 Addition"; Ceramics International, 31 (2005) 11-14.

International Search Report and Written Opinion of the International Searching Authority; PCT/US2014/052816; dated Feb. 25, 2015.

(56) References Cited

OTHER PUBLICATIONS

Li et al; "Stability of Microstructure and Properties of Transparent Li2O—Al2O3—SiO3 Glass-Ceramics"; Journal of Inorganic Materials; vol. 24, No. 5, 2009. pp. 1031-1035.
Park et al; "Determination of Mn, Co, Ni, and Cu in Iron Oxide Ore by Atomic Absortpion Spectroscopy. Utilization of APDC-MIBK Extraction System"; Journal of the Korean Chemical Society, vol. 33, No. 3, 1989. pp. 315-320.
Riello et al; "Nucleation and Crystallization Behavior of Glass-Ceramic Materials in The Li2O—Al2O3—SiO2 System of Interest for Their Transparency Properties"; Journal of Noncrystalline Solids 288 (2001) 127-139.
Shyu et al; "Addition of GeO2 to Reduce the Viscosity of Parent Glasses for Low-Expansion, Transparent Glass-Ceramics Containing High-Quartz Solid Solutions"; J Am. Ceram. Soc. 89 [10] 3235-3239 (2006).
Zhilin et al; "Viscosity and Crystallizaiton of Sitall-forming Glasses with Additions of Phosphorus and Titanium Oxides"; 1982, 6, p. 33-36.
Makijima et al; "Glass Material Design Assisting System: Vitres"; Fujitsu, vol. 44, No. 6, 1993. pp. 560-565.
English Translation of JP2016537790 Office Action dated Jul. 3, 2018; 9 Pages; Japanese Patent Office.
English Translation of TW107122030 Office Action and Search Report dated Mar. 5, 2019, Taiwan Patent Office, 4 Pgs.

\* cited by examiner

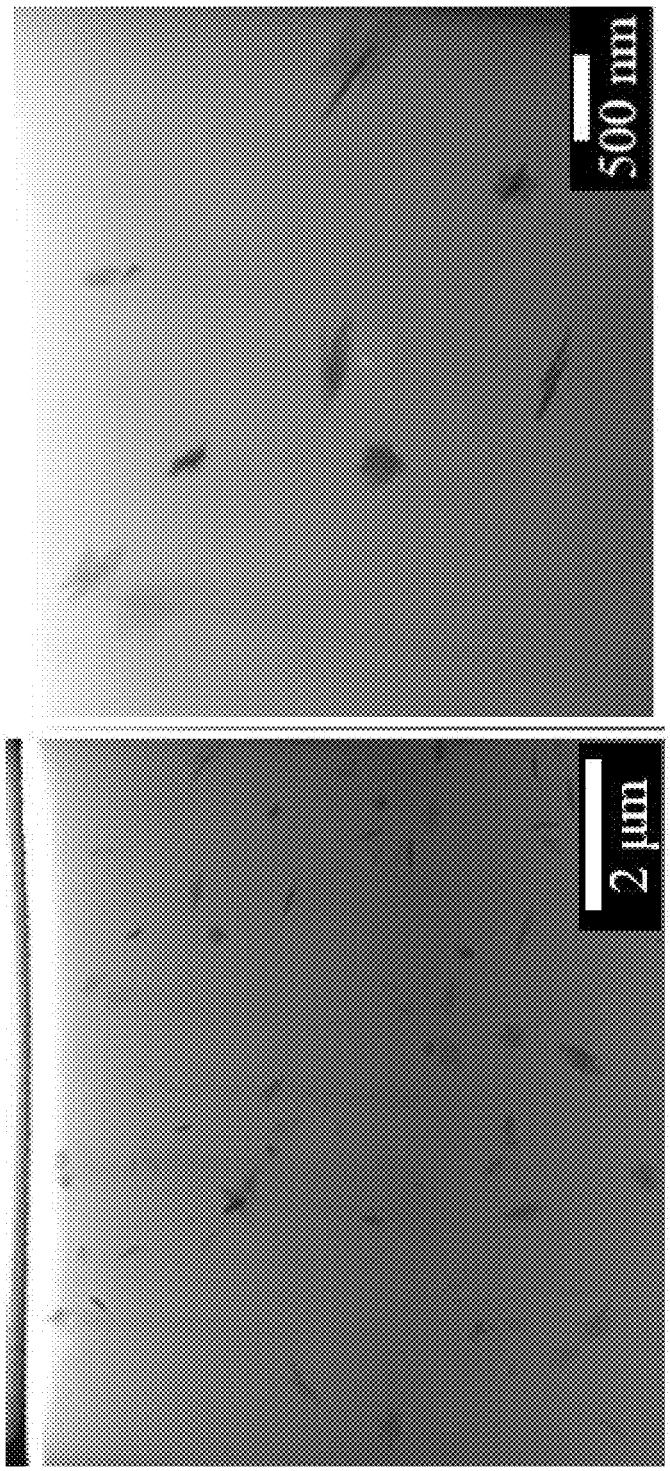

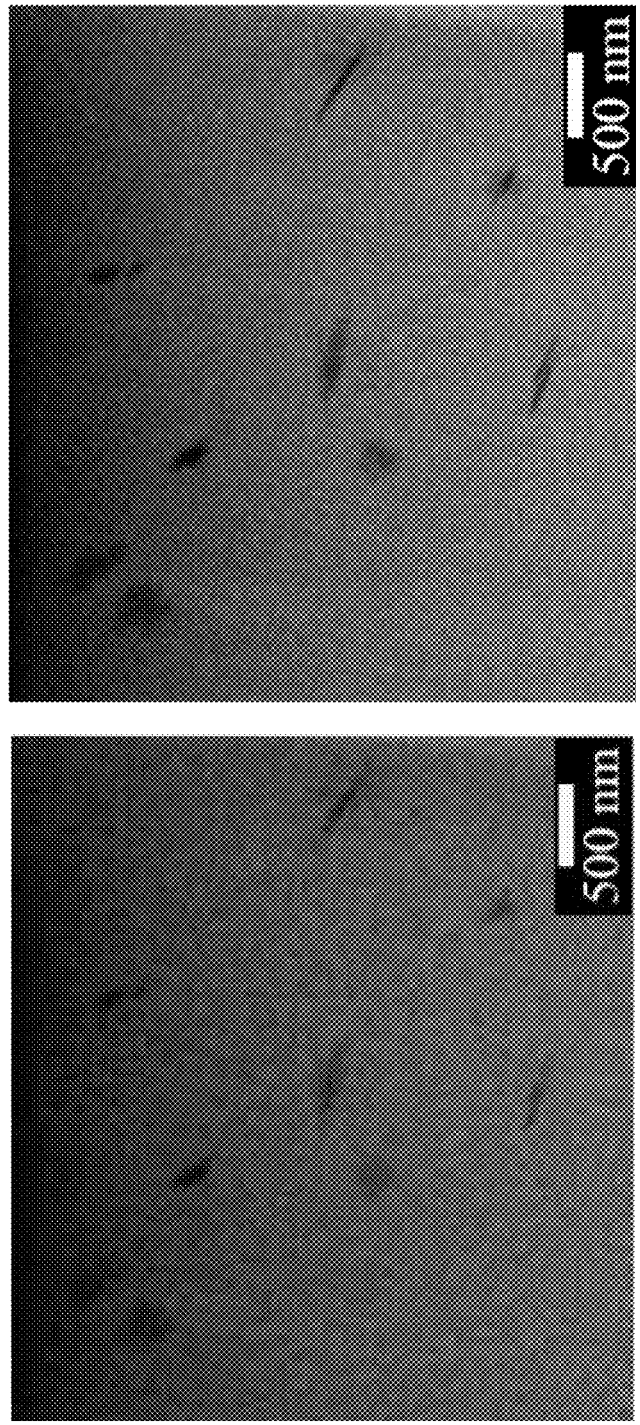

ION EXCHANGEABLE GLASS, GLASS CERAMICS AND METHODS FOR MAKING THE SAME

CROSS-REFERENCE TO RELATED APPLICATIONS

This application is a continuation of U.S. patent application Ser. No. 14/469,688 filed on Aug. 27, 2014, the content of which is relied upon and incorporated herein by reference in its entirety, and claims the benefit of priority under 35 U.S.C. § 120 of U.S. Provisional Application Ser. No. 62/018,737, filed on Jun. 30, 2014, and of U.S. Provisional Application Ser. No. 61/871,986, filed on Aug. 30, 2013, the contents of which are relied upon and incorporated herein by reference in their entirety.

BACKGROUND

The disclosure relates to glass-ceramics and precursor glasses that are crystallizable to glass-ceramics, which may each or both be strengthened by ion exchange processes; methods for making the same and articles including the same. In particular, this disclosure relates to translucent or opaque glass-ceramics that include a total crystalline phase up to about 20% by weight and crystal phases such as anatase, rutile, armalcolite, or a combination thereof, and the precursor glasses used to form such glass-ceramics.

In the past decade, electronic devices such as notebook computers, personal digital assistants, portable navigation device, media players, mobile phones, portable inventory devices and other such devices (frequently referred to as "portable computing devices") have converged, while at the same time becoming small, light, and functionally more powerful. One factor contributing to the development and availability of such smaller devices is an ability to increase computational density and operating speed by ever decreasing electronic component sizes. However, the trend to smaller, lighter, and functionally more powerful electronic devices presents a continuing challenge regarding design of some components of the portable computing devices.

Components associated with portable computing devices encountering particular design challenges include the enclosure or housing used to house the various internal/electronic components. This design challenge generally arises from two conflicting design goals—the desirability of making the enclosure or housing lighter and thinner, and the desirability of making the enclosure or housing stronger and more rigid. Lighter enclosures or housings, typically thin plastic structures with few fasteners, tend to be more flexible while having a tendency to buckle and bow as opposed to stronger and more rigid enclosures or housings, typically thicker plastic structures with more fasteners having more weight. Unfortunately, the increased weight of the stronger, more rigid plastic structures might lead to user dissatisfaction, while the bowing and buckling of the lighter structures might damage the internal/electronic components of the portable computing devices, which almost certainly can lead to user dissatisfaction. Furthermore, plastics are easily scratched due to their low hardness, so their appearance degrades with use.

Among known classes of materials are glass-ceramics that are used widely in various other applications. For example, glass-ceramics are used widely in kitchens as cooktops, cookware, and eating utensils, such as bowls, dinner plates, and the like. Transparent glass-ceramics are used in the production of oven and/or furnace windows, optical elements, mirror substrates, and the like. Glass-ceramics are typically made by crystallizing precursor glasses, which are formulated to be crystallizable, at specified temperatures for specified periods of time to nucleate and grow crystalline phases in a glass matrix.

In some instances, it is desirable to form glass-ceramic articles for use in portable computing devices having specific optical properties, such as opacity and color. Known glass-ceramics based on the $SiO_2$—$Al_2O_3$—$Li_2O$ glass system include those having either β-quartz solid solution ("β-quartz ss" or "β-quartz") as the predominant crystalline phase or β-spodumene solid solution ("β-spodumene ss" or "β-spodumene") as the predominant crystalline phase. Such known glass-ceramics can require specific heat treatment conditions to achieve a desirable color and exhibit lower strength, which may be due to the size and shape of the crystals, their stress filed in the glass and the strength of the residual glass. In addition, such glass ceramics may also exhibit an undesirable level of brittleness, which may be due to a high concentration of crystalline phase(s). Furthermore such glass-ceramics tend to have liquidus viscosities that preclude the use of high throughput forming methods such as float, slot draw, or fusion draw. For example, known glass-ceramics are formed from precursor glasses having liquidus viscosities of about 10 kP, which are not suitable for fusion draw, where liquidus viscosities of above 100 kP or above 200 kP are generally required. Accordingly, although glass-ceramics exhibit desirable properties such as high opacity, various degrees of translucency, and surface luster, which are generally not achievable by fusion forming, such glass-ceramics cannot take advantage of the pristine surfaces and thinness (e.g., 2 mm or less) achieved by fusion forming process.

In view of the foregoing problems with existing enclosures or housings, there exists a need for glass-ceramic and precursor glass materials that are ion exchangeable and with high liquidus viscosities (i.e. liquidus viscosities that enable forming methods such as slot draw, fusion draw, and the like), which provide improved enclosures or housings for portable computing devices, in a potentially more cost effective manner. Also, there exists a need for such materials that provide improved color properties (e.g., whiteness levels) and/or other opaque colors while addressing in an aesthetically pleasing manner the design challenges of creating lightweight, strong, and rigid enclosures or housings.

SUMMARY

One or more aspects of this disclosure pertain to glass-ceramics or glass-ceramic articles with a predominant crystalline phase including anatase, rutile, armalcolite or a combination thereof. In one or more embodiments, the glass-ceramic articles disclosed herein include a total crystalline phase including up to 20% by volume of the glass-ceramic articles. In some embodiments, the glass-ceramic articles include a predominant crystalline phase comprising anatase, rutile, armalcolite or a combination thereof. In one or more embodiments, the predominant crystalline phase comprises crystals having a minor dimension of about 1000 nm or less (e.g., about 500 nm or less or about 100 nm or less). The at least a portion of the crystals in the predominant phase may have a major dimension and an aspect ratio of the major dimension to the minor dimension of about 2 or greater. In some instances, the aspect ratio may be about 5 or greater. In one or more embodiments, the total crystalline phase may be about 20 wt. % or less, about 12 wt. % or less, or about 5 wt. % or less of the glass-ceramic article. In specific instances, the total crystalline phase may include armalcolite and the total crystalline phase may comprise 5 wt. % of the glass-ceramic article.

The glass-ceramics described herein may be characterized by the processes by which they can be formed. Such glass-ceramics may be formed by float processes, fusion processes, slot draw process, thin rolling processes, or a combination thereof. In some embodiments, the glass-ceramic may be shaped into or have a three-dimensional shape. In one or more embodiments, the properties of the precursor glass composition and glass may determine this processing flexibility. The glass-ceramic may exhibit a liquidus viscosity of about 10 kilopoise (kP) or greater, about 20 kP or greater, about 50 kP or greater, or about 100 kP or greater.

In one or more embodiments, the glass-ceramics (and/or the precursor glass composition and/or glasses including such compositions) include, in mol %, $SiO_2$ in the range from about 45 to about 75, $Al_2O_3$ in the range from about 4 to about 25, $P_2O_5$ in the range from about 0 to about 10 (or from about 0.1 to about 10), MgO in the range from about 0 to about 8, $R_2O$ in the range from about 0 to about 33, ZnO in the range from about 0 to about 8, $ZrO_2$ in the range from about 0 to about 4, $B_2O_3$ in the range from about 0 to about 12, and one or more nucleating agents in the range from about 0.5 to about 12. In one variant, the nucleating agent may include $TiO_2$. In another variant, the composition exhibits the compositional relationship ($R_2O$—$Al_2O_3$) is in the range from about −4 to about 4. In one or more embodiments, $R_2O$ may include one or more of $Na_2O$, $Li_2O$ and $K_2O$. In one or more specific embodiments, the composition includes, in mol %, $Li_2O$ in the range from about 0 to about 12, $Na_2O$ in the range from about 4 to about 20 and/or $K_2O$ in the range from about 0 to about 2. In an even more specific embodiment, the composition may optionally include a non-zero amount of $SnO_2$ up to about 2 mol %, and/or $B_2O_3$ in the range from about 2 mol % to about 10 mol %.

The glass-ceramic articles according to one or more embodiments may include a compressive stress layer ("CS layer") extending from a surface of the glass-ceramic article to a depth in the glass-ceramic article. The CS layer may be formed by an ion exchange process. As used herein, the term "ion exchanged" or "IX" is understood to mean glass-ceramics (and/or glasses) disclosed herein that are chemically strengthened by ion exchange processes in which the glass-ceramics (and/or glasses) are treated with a heated salt bath containing ions having a different ionic radius than ions that are present in the glass-ceramic (and/or glass) surface and/or bulk. The ions in the bath replace those ions in the glass-ceramic (and/or glass), which may be smaller in radius (or vice versa depending on the temperature conditions). Glass-ceramics and glasses that are subjected to such ion exchange treatment(s) may be referred to herein as "ion exchanged (IX) glass-ceramics", or "ion exchanged (IX) glasses". In one variant, the CS layer has a compressive stress of at least about 200 MPa. The depth of the CS layer ("DOL") may be at least about 15 μm. The glass-ceramic articles disclosed herein may exhibit a Vickers indentation crack initiation load of at least 10 kgf.

In one variant, the glass-ceramic articles described herein exhibit a color presented in CIELAB color space coordinates determined from specular reflectance measurements using a spectrophotometer with various illuminants. In one example, as measured using a spectrophotometer with illuminant D65, the glass-ceramic articles exhibit CIELAB color space coordinates of: CIE a* in the range from about −2 to about 8; CIE b* in the range from about −7 to about 30; and CIE L* in the range from about 85 to about 100. In another example, as measured using a spectrophotometer with illuminant F02, the glass-ceramic articles exhibit CIELAB color space coordinates of: CIE a* in the range from about −1 to about 0; CIE b* in the range from about −8 to about −3; and CIE L* in the range from about 80 to about 100. These color coordinates may be exhibited when specular reflectance is included or excluded in the measurement.

A second aspect of the instant disclosure pertains to glass precursors of the glass-ceramic articles described herein. In one or more embodiments, the glass precursors may be aluminosilicate glass precursors, which may be characterized as including a fusion formable composition. In one or more embodiments, the glass precursor composition that exhibits a liquidus viscosity of about 10 kilopoise (kP) or greater, about 20 kP or greater, about 50 kP or greater, or about 100 kP or greater. In one variant, the glass precursor composition may exhibit a liquidus temperature of less than about 1400° C. or less than about 1200° C. or less than about 1100° C. The glass-ceramic articles may exhibit these liquidus viscosity or liquidus temperature values when evaluated using know methods in the art.

A third aspect of the instant disclosure pertains to a method of making a glass-ceramic article having predominant crystalline phase including anatase, rutile, armalcolite or a combination thereof. In one or more embodiments, the method includes melting a batch for, and forming, a glass article having a composition that includes $SiO_2$ in the range from about 45 to about 75, $Al_2O_3$ in the range from about 4 to about 25, $P_2O_5$ in the range from about 0 to about 10, MgO in the range from about 0.01 to about 8, $R_2O$ in the range from about 0 to about 33, ZnO in the range from about 0 to about 8, $ZrO_2$ in the range from about 0 to about 4, $B_2O_3$ in the range from about 0 to about 12, and one or more nucleating agents in the range from about 0.5 to about 12. The formed glass article may exhibit a liquidus viscosity of about 10 kP or greater or about 20 kP or greater and a liquidus temperature of less than about 1400° C. in the formation of the glass article. In one or more embodiments, the method may further include ceramming the glass article at a temperature between about 50° C. greater than an annealing temperature of the glass article and about 1100° C. for a period of time to cause the generation of a glass-ceramic article which includes a predominant crystalline phase comprising anatase, rutile, armalcolite or a combination thereof and, thereafter, cooling the glass-ceramic article to room temperature.

In one option, the method may include forming a CS layer in the glass article and/or glass-ceramic article having a compressive stress of about 200 MPa or greater. In some embodiments, the CS layer extends from a surface of the glass article and/or glass-ceramic into the glass article and/or glass-ceramic at a DOL of about 15 μm or greater. The CS layer may be formed by an ion exchange treatment.

Additional features and advantages will be set forth in the detailed description which follows, and in part will be readily apparent to those skilled in the art from that description or recognized by practicing the embodiments as described herein, including the detailed description which follows, the claims, as well as the appended drawings.

Any ranges of values set forth in this specification contemplate all values within the range and are to be construed as support for claims reciting any sub-ranges having endpoints which are real number values within the specified range in question. By way of a hypothetical illustrative example, a recitation in this disclosure of a range of from about 1 to 5 shall be considered to support claims to any of the following ranges: 1-5; 1-4; 1-3; 1-2; 2-5; 2-4; 2-3; 3-5; 3-4; and 4-5. In addition, it is to be understood that such terms as "is," "are," "includes," "having," "comprises," and the like are words of convenience and are not to be construed as limiting terms and yet may encompass the terms "comprises," "consists essentially of," "consists of," and the like as is appropriate.

These and other aspects, advantages, and salient features of this disclosure will become apparent from the following description, the accompanying drawings and claims.

BRIEF DESCRIPTION OF THE DRAWINGS

FIGS. 16A and 16B show high angle annular dark field (HAADF) mapping images for a glass-ceramic of Example 131;

FIGS. 17A-17D show energy-dispersive x-ray (EDX) mapping images for a glass-ceramic formed from Example 131 for elements Mg, Ti, Al and Si, respectively;

DETAILED DESCRIPTION

Figure 1:
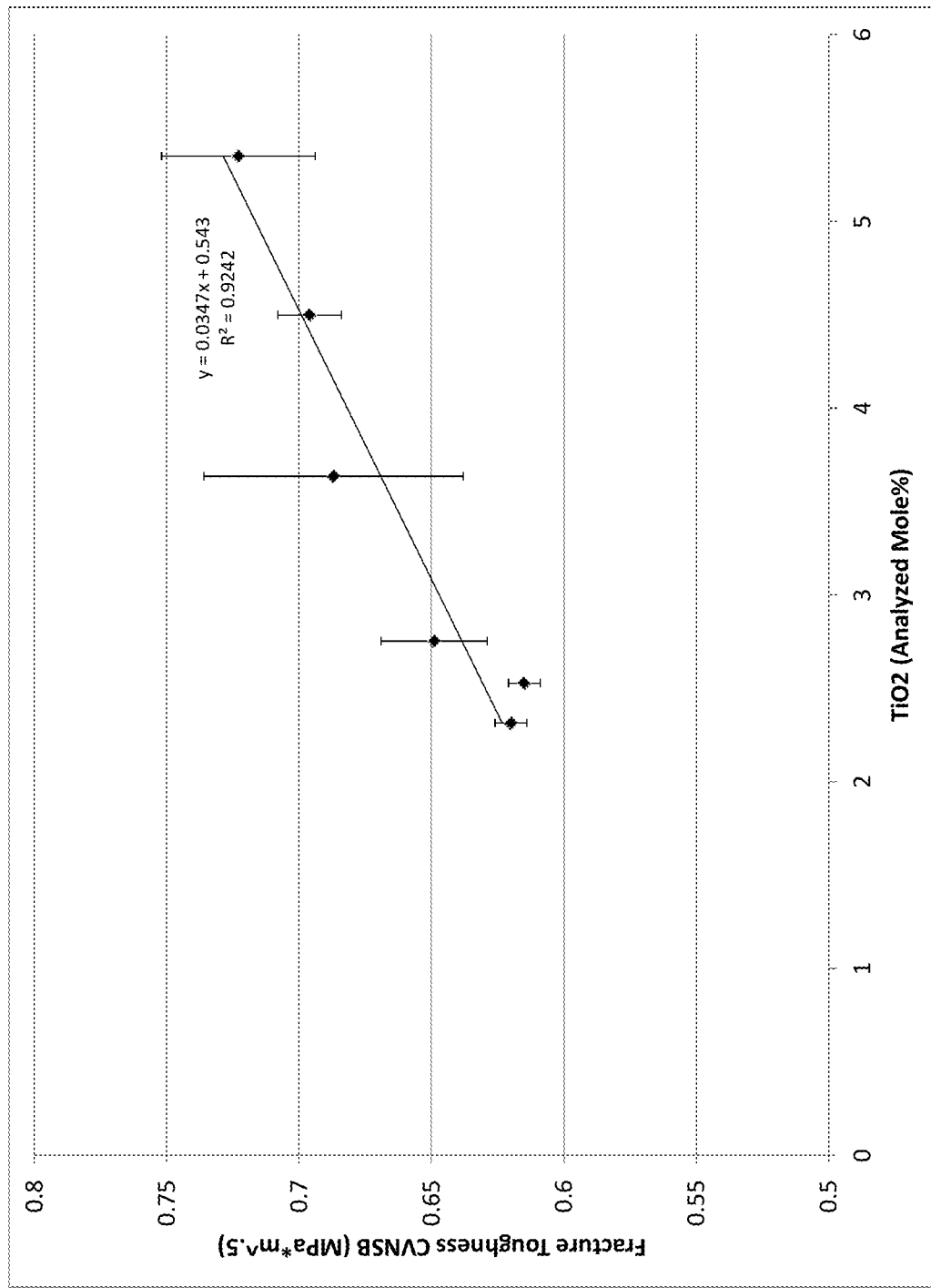
FIG. 1 is a graph showing the relationship between fracture toughness and the amount of $TiO_2$, according to one or more embodiments.

In the following description of exemplary aspects and/or embodiments of this disclosure, reference is made to the accompanying drawings that form a part hereof, and in which are shown by way of illustration specific aspects and/or embodiments in which this disclosure may be practiced. While these aspects and/or embodiments are described in sufficient detail to enable those skilled in the art to practice this disclosure, it will nevertheless be understood that no limitation of the scope of this disclosure is thereby intended. Alterations and further modifications of the features illustrated herein, and additional applications of the principles illustrated herein, which would occur to one skilled in the relevant art and having possession of this disclosure, are to be considered within the scope of this disclosure.

As noted, various aspects and/or embodiments of this disclosure relate to an article including a glass ceramic that may be characterized as translucent and/or opaque. In some embodiments, the glass-ceramic may have a white color, although other colors are contemplated. The glass-ceramic materials may include crystalline phases of anatase, rutile, armalcolite, or a combination thereof and may be ion exchangeable.

The glass-ceramics described herein may be used in a variety of electronic devices or portable computing devices, light diffusers, automotive, appliances, and even architectural applications. To that end, it is desirable that precursor glasses thereto are formulated to have a sufficiently low softening point and/or a sufficiently low coefficient of thermal expansion so as to be compatible with manipulation into complex shapes. Accordingly, the precursor glasses used to form the glass-ceramics are also of interest and are described herein in more detail.

According to one or more aspects of this disclosure, the glass-ceramics include anatase, rutile, armalcolite or a combination thereof as the predominant crystalline phase. The glass-ceramics (and/or precursor glass compositions and/or glass that includes such a composition) of one or more embodiments may include, in mol %, $SiO_2$ in the range from about 45 to about 75; $Al_2O_3$ in the range from about 4 to about 25; $P_2O_5$ in the range from about 0 to about 10; MgO in the range from about 0 to about 8; $R_2O$ in the range from about 0 to about 33; ZnO in the range from about 0 to about 8; $ZrO_2$ in the range from about 0 to about 4; $B_2O_3$ in the range from about 0 to about 12, and one or more nucleating agents in the range from about 0.5 to about 12. The glass-ceramic (and/or precursor glass compositions and/or glass that includes such a composition) may be essentially free of $As_2O_3$ and $Sb_2O_3$. As used herein, the term "essentially free of $As_2O_3$ and $Sb_2O_3$" means that the glass-ceramic (and/or the precursor glass composition and/or glass that includes such a composition) comprises less than about 0.1% by weight of either of $As_2O_3$ or $Sb_2O_3$. As will be described in greater detail, the viscosity and indentation crack initiation load performance of the glass or glass-ceramic are influenced by precursor glass compositions.

In one or more embodiments, SiO$_2$ may be present in glass-ceramic articles (and/or precursor glass compositions and/or glass that includes such a composition) described herein, in mol %, in the range from about 45 to about 75, from about 46 to about 75, from about 47 to about 75, from about 48 to about 75, from about 49 to about 75, from about 50 to about 75, from about 51 to about 75, from about 52 to about 75, from about 53 to about 75, from about 54 to about 75, from about 55 to about 75, from about 56 to about 75, from about 57 to about 75, from about 58 to about 75, from about 59 to about 75, from about 60 to about 75, from about 62 to about 75, from about 45 to about 74, from about 45 to about 73, from about 45 to about 72, from about 45 to about 71, from about 45 to about 70, from about 45 to about 69, from about 45 to about 68, from about 45 to about 67, from about 45 to about 66, from about 45 to about 65, from about 45 to about 64, from about 45 to about 63, from about 45 to about 62, from about 45 to about 61, from about 45 to about 60, from about 46 to about 70, from about 47 to about 68, from about 48 to about 66, from about 49 to about 64, from about 50 to about 62, from about 55 to about 65, from about 51 to about 64, from about 52 to about 63, from about 53 to about 62, from about 54 to about 62, from about 55 to about 61, from about 54 to about 60, from about 62 to about 70, from about 62 to about 69, from about 62 to about 68, and all ranges and sub-ranges therebetween.

In one or more specific embodiments, SiO$_2$ may be present in an amount to serve as the primary glass-forming oxide or to provide a glass or glass-ceramic with sufficient chemical durability for the application for which the glass or glass-ceramic is utilized. For example, the glass or glass-ceramic may be utilized in touch module applications and may be modified to include enough SiO$_2$ to exhibit the requisite chemical durability for such applications, as well as to increase the viscosity for forming operations. The content of SiO$_2$ may be limited to control the melting temperature of the precursor glass composition. In some instances, an excess amount of SiO$_2$ (including, e.g., a precursor glass composition with only SiO$_2$) could drive the fining temperature, at 200 poise, beyond that attainable in typical glass melters so that bubbles cannot be efficiently removed from the glass or glass-ceramic formed from such precursor glass compositions. Thus the SiO$_2$ content should be maintained in the range from about 45 mol % to about 75 mol %, to balance manufacturing needs with good durability. In some embodiments, the precursor glass compositions with the highest liquidus viscosities that ceram to opaque, white glass-ceramics typically include SiO$_2$ in an amount in the range from about 50 mol % to about 65 mol %. As used herein the terms "ceram" and "heat treat" are used interchangeably and the terms "ceramming" and "heat treating" are used interchangeably and include the thermal treatment of precursor glasses to form glass-ceramics.

In one or more embodiments, Al$_2$O$_3$ may be present in the glass-ceramic (and/or the precursor glass composition and/or glass that includes such a composition) described herein, in mol %, in the range from about 4 to about 25, from about 5 to about 25, from about 6 to about 25, from about 7 to about 25, from about 8 to about 20, from about 9 to about 25, from about 10 to about 25, from about 11 to about 25, from about 12 to about 25, from about 4 to about 24, from about 4 to about 22, from about 4 to about 20, from about 4 to about 18, from about 4 to about 16, from about 4 to about 14, from about 4 to about 13, from about 4 to about 12, from about 5 to about 25, from about 6 to about 24, from about 7 to about 22, from about 8 to about 20, from about 9 to about 18, from about 10 to about 16, from about 10 to about 14, from about 11 to about 13, from about 12 to about 18, from about 12 to about 17, from about 12 to about 16, from about 12 to about 15, or from about 13 to about 15, and all ranges and sub-ranges therebetween. The amount of Al$_2$O$_3$ may be adjusted to serve as a glass forming oxide and/or to control the viscosity of molten precursor glass compositions.

In one or more embodiments, an increase in the amount of Al$_2$O$_3$ in a precursor glass composition relative to other alkalis and/or alkaline earths can improve or increase the durability of a glass or glass-ceramic. Without being bound by theory, it is believed that when the concentration of alkali oxide (R$_2$O) in a glass composition is equal to or greater than the concentration of Al$_2$O$_3$, the aluminum ions are found in tetrahedral coordination with the alkali ions acting as charge-balancers. This tetrahedral coordination greatly enhances ion exchange of glass and/or glass-ceramics formed from such precursor glass compositions. This is demonstrated in some of the Examples listed in Table I herein. In the other Examples listed in Table I, the concentration of alkali oxide is less than the concentration of aluminum ions; in this case, the divalent cation oxides (RO) can also charge balance tetrahedral aluminum to various extents. While elements such as calcium, zinc, strontium, and barium behave equivalently to two alkali ions, the high field strength of magnesium ions causes them to not fully charge balance aluminum in tetrahedral coordination, resulting in the formation of five- and six-fold coordinated aluminum. Generally, Al$_2$O$_3$ can play an important role in IXable glass and glass-ceramics since it enables a strong network backbone (i.e., high strain point) while allowing for the relatively fast diffusivity of alkali ions. Charge balanced glasses also have higher viscosity than heavily modified or per-aluminous glasses, so the Al$_2$O$_3$ content can be useful for managing the viscosity. However, when the concentration of Al$_2$O$_3$ is too high, the glass composition may exhibit a higher liquidus temperature and hence lower liquidus viscosity so the Al$_2$O$_3$ concentration of some embodiments should be in the range from about 4 mol % to about 25 mol %. Furthermore, the excess modifiers or the difference (R$_2$O—Al$_2$O$_3$) has a large impact on tetravalent oxide solubility. When the excess modifiers are low, there is a low solubility for tetravalent cations like TiO$_2$, ZrO$_2$, and SnO$_2$. This makes it easy to precipitate crystalline TiO$_2$ (anatase and rutile), but also raises the liquidus temperature. Thus the difference (R$_2$O—Al$_2$O$_3$) of some embodiments should be in the range from about −4 mol % to about 4 mol % to achieve white glass-ceramics with reasonable liquidus viscosity. To achieve embodiments that include white glass-ceramics with a liquidus viscosity greater than 50 kP, the difference (R$_2$O—Al$_2$O$_3$) may be in the range from about −2 mol % to about 2 mol %. Accordingly, in some embodiments, the amount of Al$_2$O$_3$ may be in the range from about 12 mol % to about 17 mol %.

In one or more embodiments, the glass-ceramics (and/or the precursor glass composition and/or glass that includes such a composition) disclosed herein include alkali oxides (R$_2$O) (e.g., Li$_2$O, Na$_2$O, K$_2$O, Rb$_2$O, and/or Cs$_2$O) that are present, in mol %, in an amount in the range from about 0 to about 40, from about 0 to about 33, from about 0 to about 20, from about 8 to about 20, or from about 12 to about 18. In one or more specific embodiments, alkali oxides (R$_2$O) may be present, in mol %, in an amount in the range from about 0.01 to about 40, from about 0.1 to about 40, from about 1 to about 40, from about 2 to about 40, from about 3 to about 40, from about 4 to about 40, from about 5, to about 40, from about 6 to about 40, from about 7 to about 40, from about 8 to about 40, from about 9 to about 40, from about 11 to about 40, from about 12 to about 40, from about 0.01 to about 39, from about 0.01 to about 38, from about 0.01 to about 37, from about 0.01 to about 36, from about 0.01 to about 35, from about 0.01 to about 34, from about 0.01 to about 33, from about 0.01 to about 32, from about 0.01 to about 31, from about 0.01 to about 30, from about 0.01 to about 29, from about 0.01 to about 28, from about 0.01 to about 27, from about 0.01 to about 26, from about 0.01 to about 25, from about 0.01 to about 33, from about 0.1 to about 33, from about 1 to about 33, from about 2 to about 33, from about 3 to about 33, from about 4 to about 33 from about 5 to about 33, from about 6 to about 33, from about 7 to about 33, from about 8 to about 33, from about 9 to about 33, from about 10 to about 33, from about 11 to about 33, from about 12 to about 33, from about 0.01 to about 20, from about 0.1 to about 20, from about 1 to about 20, from about 2 to about 20, from about 3 to about 20, from about 4 to about 20, from about 5 to about 20, from about 6 to about 20, from about 7 to 20, from about 8 to about 20, from about 9 to about 20, from about 10 to about 20, from about 10 to about 17, from about 11 to about 20, from about 12 to about 20, from about 1 to about 19, from about 1 to about 18, from about to 1 to about 17, from about 1 to about 16, from about 1 to about 15, from about 1 to about 14, from about 1 to about 13, from about 1 to about 12, from about 1 to about 19, from about 2 to about 18, from about 3 to about 17, from about 4 to about 16, from about 5 to about 15, from about 6 to about 14, from about 7 to about 13, from about 8 to about 12, or from about 9 to about 11, and all ranges and sub-ranges therebetween.

In one or more embodiments, the amount of alkali oxides ($R_2O$) may be adjusted to provide glass compositions exhibiting low melting temperature and/or low liquidus temperatures. Without being bound by theory, the addition of alkali oxide(s) may increase the coefficient of thermal expansion (CTE) and/or lower the chemical durability of the glasses and/or glass-ceramics that include such precursor glass compositions. In some cases these attributes may be altered dramatically by the addition of alkali oxide(s). The amount of excess alkali in a glass composition can also determine the ceramming or heat treatment temperature used to form the glass-ceramics and the resulting opacity of the glass-ceramics. In one or more embodiments, the inclusion of a small excess of alkali in a glass composition beyond that to charge compensate the $Al_2O_3$, (i.e., $0<R_2O—Al_2O_3\leq 1$) can enhance the desirable white color in glass-ceramics that include such precursor glass compositions and can provide a precursor glass composition that exhibits a low liquidus temperature and high liquidus viscosity. Moreover, in some embodiments, to perform ion exchange, the presence of a small amount of alkali oxide (such as $Li_2O$ and $Na_2O$) in the article to be exchanged may facilitate ion exchange with larger alkali ions (e.g., $K^+$) (e.g., exchanging smaller alkali ions from the glass article with larger alkali ions from a molten salt bath containing such larger alkali ions). Three types of ion exchange can generally be carried out: a $Na^+$ for —$Li^+$ exchange, a $K^+$-for-$Li^+$ exchange, and/or a $K^+$-for-$Na^+$ exchange. A sufficiently high concentration of the small alkali oxide in the precursor glass compositions may be useful to produce a large compressive stress in the glass and/or glass-ceramics that include such glass precursor compositions, since compressive stress is proportional to the number of alkali ions that are exchanged out of the glass and/or glass-ceramic.

In a specific embodiment, $Na_2O$ may be present, in mol %, in the range from about 4 to about 20, from about 5 to about 20, from about 6 to about 20, from about 7 to 20, from about 8 to about 20, from about 9 to about 20, from about 10 to about 20, from about 11 to about 20, from about 12 to about 20, from about 4 to about 19, from about 4 to about 18, from about to 4 to about 17, from about 4 to about 16, from about 4 to about 15, from about 4 to about 14, from about 4 to about 13, from about 4 to about 12, from about 4 to about 19, from about 5 to about 18, from about 6 to about 17, from about 7 to about 17, from about 8 to about 17, from about 9 to about 17, from about 12 to about 14, from about 10 to about 13, or from about 11 to about 12, and all ranges and sub-ranges therebetween. $Na_2O$ is also important for controlling the liquidus temperature and viscosity as well as ion exchange and $TiO_2$ solubility as discussed herein. Thus, in some embodiments, the amount of $Na_2O$ is in the range from about 4 mol % to about 20 mol % to achieve ion exchangeable white glass-ceramics, and in some embodiments, in the range from about 8 mol % to about 17 mol % to obtain liquidus viscosities above 100 kP.

In another specific embodiment, $K_2O$ may be present, in mol %, in the range from about 0 to about 5, from about 0 to about 4, from about 0 to about 3, from about 0 to about 2, from about 0 to about 1, from about 0.1 to about 5, from about 0.1 to about 4, from about 0.1 to about 3, from about 0.1 to about 2, from about 0.1 to about 1, from about 1 to about 5, from about 1 to about 4, from about 1 to about 3, from about 1 to about 2, and all ranges and sub-ranges therebetween. In one or more embodiments, the $K_2O$ controls the CTE, refractive index, and ion exchange rate of the precursor glass and glass-ceramic. Increasing the $K_2O$ concentration at the expense of the concentration of $Na_2O$ increases the rate of ion exchange at the expense of compressive stress in the precursor glass and glass-ceramic, when a $K^+$ for $Na^+$ ion exchange is utilized. Thus the highest compressive stress values are achieved in the precursor glasses and/or glass-ceramics when the precursor glass composition includes $Na_2O$ and no $K_2O$, so there are more $Na^+$ ions to exchange for with $K^+$ ions. However, deeper or greater DOL values for a fixed ion exchange time will be achieved in precursor glasses and glass-ceramics when up to half of the $Na_2O$ in the precursor glass composition is replaced with $K_2O$. At very high $K_2O$ amounts, the formation of leucite during the creaming process increases the liquidus temperature and lowers the liquidus viscosity, so the $K_2O$ content of some embodiments is limited to less than 8 mol % to prevent such an increase in liquidus temperature and decrease in liquidus viscosity. In some embodiments, the $K_2O$ content is limited to less than about 2 mol % to achieve high compressive stress.

In one or more embodiments, $Li_2O$ may be present, in mol %, in an amount in the range from about 0 to about 15, from about 0 to about 12, from about 0 to about 10, from about 0 to about 5, from about 0 to about 2, from about 0.1 to about 15, from about 0.1 to about 12, from about 0.1 to about 10, from about 0.1 to about 5, from about 1 to about 15, from about 1 to about 10, from about 1 to about 5, or from about 1 to about 2, and all ranges and sub-ranges therebetween. In one or more embodiments, $Li_2O$ may be used as a primary alkali during IX process. At high $Li_2O$ contents, the formation of spodumene or lithium disilicate crystals increases the liquidus temperature, so in some embodiments, the $Li_2O$ content is less than about 12 mol % to maintain a low liquidus temperature. Since $Li^+$ ions in the precursor glass and/or glass-ceramic quickly poison $K^+$ containing ion exchange baths, in embodiments utilizing such baths to exchange K⁺ ions into the precursor glass and/or glass-ceramic, the Li$_2$O content of the precursor glass composition is less than 2 mol %.

In one or more embodiments, the glass-ceramic (and/or the precursor glass composition and/or glass that includes such a composition) may exhibit the following compositional criteria: the sum Li$_2$O+Na$_2$O+K$_2$O may be, in mol %, in the range from about 4 to about 30, from about 4 to about 28, from about 4 to about 26, from about 4 to about 24, from about 4 to about 22, from about 4 to about 20, from about 4 to about 18, from about 4 to about 16, from about 4 to about 14, from about 4 to about 12, from about 4 to about 10, from about 6 to about 30, from about 8 to about 30, from about 10 to about 30, from about 12 to about 30, from about 14 to about 30, from about 16 to about 30, from about 16 to about 30, from about 18 to about 30, or from about 20 to about 30, and all ranges and sub-ranges therebetween.

In some embodiments, the glass-ceramics (and/or the precursor glass composition and/or glass that includes such a composition) described herein, exhibit the following compositional criteria: the difference (R$_2$O—Al$_2$O$_3$) may be, in mol %, in the range from about −4 to about 4, in the range from about −3 to about 3, from about −2 to about 2, from about −0.5 to about 2, from about −1 to about 1, from about 0 to about 1, and from about −1 to about 0, and all ranges and sub-ranges therebetween. In one or more embodiments the lower limit of the difference (R$_2$O—Al$_2$O$_3$) may include −4.0, −3.5, −3.0, −2.5, −2.0, −1.5, −1.0, −0.5, −0.4, −0.3, −0.2, −0.1 and all ranges and sub-ranges therebetween. In one or more embodiments the upper limit of the difference (R$_2$O—Al$_2$O$_3$) may include 3.5, 3.0, 2.5, 2.0, 1.5, 1.0, 0.5, 0.4, 0.3, 0.2, 0.1 and all ranges and sub-ranges therebetween.

In one or more embodiments, the glass-ceramics (and/or the precursor glass composition and/or glass that includes such a composition) described herein include a nucleating agent that may be characterized as self-nucleating. As used herein, nucleating agent refers to a component in the glass-ceramics (and/or the precursor glass composition and/or glass that includes such a composition) that serves as the starting point of the nuclei itself (i.e., is a discontinuity or defect in the homogenous or amorphous phase from which the crystal phase is generated), and does not require other components to promote nucleation. In one or more embodiments, the nucleating agent(s) may be present, in mol %, in the glass-ceramics (and/or the precursor glass composition and/or glass that includes such a composition) described herein in the range from about 0.1 to about 12, from about 0.1 to about 10, from about 0.1 to about 7, from about 1 to about 5, from about bout 2 to about 4. In one or more embodiments, the nucleating agent may be present, in mol %, in the range from about 0.1 to about 10, from about 0.5 to about 10, from about 1 to about 10, from about 1 to about 12, from about 1.5 to about 10, from about 2 to about 10, from about 2.5 to about 10, from about 3 to about 10, from about 0.1 to about 7, from about 0.5 to about 7, from about 1 to about 7 from about 1.5 to about 7, from about 2 to about 7, from about 2.5 to about 7, from about 3 to about 7, from about 0.1 to about 6.5, from about 0.1 to about 6, from about 0.1 to about 5.5, from about 0.1 to about 5, from about 2 to about 5, from about 0.1 to about 4.5, from about 0.1 to about 4, from about 0.5 to about 4, from about 1 to about 4, from about 1.5 to about 4, or from about 2 to about 4, and all ranges and sub-ranges therebetween.

In one or more embodiments, the glass-ceramics (and/or the precursor glass composition and/or glass that includes such a composition) include TiO$_2$, which may be present in the form of rutile and/or anatase (after heat treatment of a glass to form a glass-ceramic). In one or more embodiments, TiO$_2$ is utilized and is "self-nucleating" as it does not require secondary nucleating agents to grow anatase and rutile crystals. Both rutile and anatase both have very high refractive index, for example, 2.609 and 2.488, respectively, which results in very efficient light scattering when embedded in a glass with low refractive index (e.g., around 1.5). Anatase and rutile are also birefringent and often grow in elongated grains with high aspect ratio which further adds to their scattering power, resulting in glass-ceramics with a dense opal appearance at relatively low crystal contents. As used herein, the term "dense opal" refers to a material that is not transparent, or can appear opaque to the naked eye. Materials characterized as dense opal may appear, when evaluated using some optical equipment, depending on thickness, as not completely opaque but rather translucent because there is some transparency (i.e., some light passes through the material). This dense opal appearance can be achieved in thin cross-sections (i.e., having a thickness of about 1 mm) by including less than about 12 mol % of the crystallizing component (e.g., TiO$_2$). Where TiO$_2$ is utilized, higher TiO$_2$ levels (e.g., >4 mole %) provide very opaque glass-ceramics at thicknesses of about 1 mm, while around 3 mole % TiO$_2$ provides opaque glass-ceramics at the same thickness. When TiO$_2$ is below 3 mole %, the liquidus viscosity of the precursor glass composition can be very high, but the opacity of the resulting glass-ceramic begins to suffer, resulting in translucent glass-ceramics. Moreover, if the concentration of TiO$_2$ is too low (<1.5 mol %), the precursor glass does not crystallize. Thus the TiO$_2$ content of some embodiments is in the range from about 1 mol % to about 12 mol %, and some embodiments include from about 2 mol % to about 5 mol %, from about 2 mol % to about 4.5 mol % TiO$_2$ or from about 2 mol % to about 4 mol %, to provide an desirable opacity and liquidus viscosity. In some embodiments, the glass-ceramics (and/or the precursor glass composition and/or glass that includes such a composition) includes about 2 mol % of TiO$_2$ or more to generate an armalcolite phase. In some embodiments, the amount of TiO$_2$ may be about 3 mol % or greater In one or more specific embodiments, the nucleating agent may include ZnO, ZrO$_2$, titanium, platinum, gold, rhodium, and other nucleating agents known in the art. In one or more embodiments, nucleating agent, and in particular, ZrO$_2$ may be present, in mol %, in the range from about 0 to about 4, from about 0 to about 3, from about 0 to about 2, from about 0 to about 1, from about 0.1 to about 4, from about 0.1 to about 3, from about 0.1 to about 2, from about 0.1 to about 1, from about 1 to about 4, from about 1 to about 3, from about 1 to about 2, and all ranges and sub-ranges therebetween. Precious metals such as platinum, gold, rhodium, silver, and iridium are typically used at very low concentrations ranging from 0.005 mol % to about 0.1 mol % since they can be very effective but expensive.

In one or more embodiments, the glass-ceramic (and/or the precursor glass composition and/or glass that includes such a composition) disclosed herein may include one or more divalent cation oxides, such as alkaline earth oxides and/or ZnO. Such divalent cation oxides may be included to improve the melting behavior of the precursor glass compositions. With respect to ion exchange performance, the presence of divalent cations acts to decrease alkali mobility. When larger divalent cation oxides (such as CaO, SrO and BaO) are utilized, there may be a negative effect on ion exchange performance. Furthermore, smaller divalent cation oxides generally help develop the compressive stress in an IX glass and/or IX glass-ceramic more than the larger divalent cation oxides. Hence, divalent cation oxides such as MgO and ZnO can offer advantages with respect to improved stress relaxation, while minimizing the adverse effects on alkali diffusivity. However, when high concentrations of MgO and ZnO are utilized, there may be tendency for such divalent cation oxides to form forsterite ($Mg_2SiO_4$), gahnite ($ZnAl_2O_4$) or willemite ($Zn_2SiO_4$), respectively, thus causing the liquidus temperature to rise very steeply. In one or more embodiments of the glass-ceramics, glasses and/or precursor glass compositions disclosed herein may incorporate MgO and/or ZnO as the only divalent cation oxide and may, optionally, exclude other divalent cation oxides. Thus the MgO and ZnO contents of some embodiments are less than 8 mol % to maintain a reasonable liquidus temperature and in some embodiments, less than 5 mol % to enhance ion exchange performance.

In one or more embodiments, MgO may be present, in mol %, in the glass-ceramic (and/or the precursor glass composition and/or glass that includes such a composition) disclosed herein, in the range from about 0 to about 8, from about 0 to about 6, from about 0 to about 4, from about 0 to about 3.5, from about 0 to about 3, from about 0 to about 2.5, from about 0 to about 2, from about 0 to about 1.5, from about 0 to about 1, from about 0.1 to about 4, from about 0.1 to about 3.5, from about 0.1 to about 3, from about 0.1 to about 2.5, from about 0.1 to about 2, from about 0.1 to about 1.5, from about 0.1 to about 1, from about 0.5 to about 3.5, from about 1 to about 3, from 1.5 to about 2.5, from about 2 to about 6, or from about 2 to about 4, and all ranges and sub-ranges therebetween. In some embodiments, the amount of MgO may be about 2 mol % or greater, or about 2.4% or greater for the formation of armalcolite.

In one or more embodiments, ZnO may be present, in mol %, in the glass-ceramic (and/or the precursor glass composition and/or glass that includes such a composition) disclosed herein, in the range from about 0 to about 8, from about 0 to about 7, from about 0 to about 6, from about 0 to about 5, from about 0 to about 4, from about 0 to about 3.5, from about 0 to about 3, from about 0 to about 2.5, from about 0 to about 2, from about 0 to about 1.5, from about 0 to about 1, from about 0.1 to about 5, from about 0.1 to about 4, from about 0.1 to about 3.5, from about 0.1 to about 3, from about 0.1 to about 2.5, from about 0.1 to about 2, from about 0.1 to about 1.5, from about 0.1 to about 1, from about 0.5 to about 4.5, from about 1 to about 4, from 1.5 to about 3.5, or from about 2 to about 3, and all ranges and sub-ranges therebetween.

One or more embodiments of the glass-ceramic (and/or the precursor glass composition and/or glass that includes such a composition) disclosed herein may include $P_2O_5$. For example, $P_2O_5$ may be present, in mol %, in an amount in the range from about 0 to about 10, from about 0 to about 9, from about 0 to about 8, from about 0 to about 7, from about 0 to about 6, from about 0 to about 5, from about 0 to about 4, from about 0 to about 3, from about 0 to about 2, from about 0.1 to about 10, from about 0.1 to about 9 from about 0.1 to about 8, from about 0.1 to about 7, from about 0.1 to about 6, from about 0.1 to about 5, from about 1 to about 10, from about 1 to about 9, from 1 to about 8, from about 1 to about 7, from about 1 to about 6, from about 1 to about 5, from about 1.5 to about 10, from about 2 to about 10, from about 2.5 to about 10, from about 3 to about 10, from about 3.5 to about 10, from about 4 to about 10, from about 4.5 to about 10, from about 5 to about 10, from about 5.5 to about 10, from about 6 to about 9.5, from about 6 to about 9, from about 6 to about 8.5, or from about 6 to about 8 and all ranges and sub-ranges therebetween. $P_2O_5$ increases the rate of ion exchange, softens the precursor glass, improves the damage resistance, and also controls the color of the resulting glass-ceramic. In some embodiments, $P_2O_5$ is present in an amount of less than about 12 mol % to prevent excessive softening of the precursor glass. At amounts of $P_2O_5$ less than about 6 mol %, the resulting glass-ceramics tend to exhibit a yellow, blue or brown color or tint depending on how much $TiO_2$ and $P_2O_5$ are present and the damage resistance decreases. In one or more embodiments, the amount of $P_2O_5$ is maintained in the range from about 6 mol % to about 9 mol %.

One or more embodiments of the glass-ceramic (and/or the precursor glass composition and/or glass that includes such a composition) disclosed herein may include $B_2O_3$. For example, $B_2O_3$ may be present, in mol %, in an amount of up to 1 or, alternatively, in mole in the range from about 0 to about 12, from about 0 to about 10, from about 0 to about 8, from about 0 to about 6, from about 0 to about 4, from about 0 to about 2, from about 0.1 to about 12, from about 0.1 to about 10, from about 0.1 to about 8, from about 0.1 to about 6, from about 0.1 to about 4, from about 0.1 to about 2, from about 0.01 to about 1, from about 0.1 to about 1, from about 1 to about 12, from about 2 to about 12, from about 2 to about 10, from about 2 to about 5, from about 1 to about 3, from about 2 to about 4, from about 8 to about 12, from about 8 to about 10, from about 9 to about 10, or from about 4 to about 10 and all ranges and sub-ranges therebetween.

In one or more embodiments, the amount of $B_2O_3$ and/or $P_2O_5$ may be adjusted based on the desired damage resistance of the glass and/or the glass-ceramic. Without being bound by theory, $B_2O_3$ and $P_2O_5$ can decrease the melting viscosity and effectively help to suppress zircon breakdown viscosity (i.e., the viscosity at which zircon breaks down to form $ZrO_2$). $P_2O_5$ can improve the diffusivity and decrease ion exchange times. However, in some instances, the floppy structure formed by boron and phosphorus sacrifice some compressive stress capability, and this effect can be pronounced due to the presence of $P_2O_5$. The inclusion of $P_2O_5$ yields glass-ceramics that have a white color. In some embodiments, the inclusion of specific amounts of $B_2O_3$ may lead to glass-ceramics having a bluish grey color.

In some embodiments, the addition of $B_2O_3$ into the precursor glass improves the damage resistance of the resulting glass. When boron is not charge balanced by alkali oxides or divalent cation oxides, it will be in a trigonal coordination state, which can open up the glass structure. The network around the trigonal coordinated boron is not as rigid as the network around tetrahedrally coordinated boron because the bonds in the network around trigonal coordinated boron tend to be less rigid or even floppy, and therefore the glasses can tolerate some deformation before crack formation. The amount of boron should be limited to prevent reduction in viscosity at liquidus temperature, which could preclude the use of fusion forming and other such forming methods.

The glass-ceramics (and/or the precursor glass composition and/or glass that includes such a composition) according to one or more embodiments may further include a non-zero amount of $SnO_2$ up to about 2 mol %. For example, $SnO_2$ may be present in the range from about 0 to about 2, from about 0 to about 1, from about 0.01 to about 2, from about 0.01 to about 1, from about 0.1 to about 2, from about 0.1 to about 1, or from about 1 to about 2, and all ranges and sub-ranges therebetween. $SnO_2$ serves as a fining agent to reduce bubbles and improve glass quality, but can compete with $TiO_2$ solubility at high concentrations. In embodiments where $SnO_2$ is used as a fining agent, it may be present in the range from about 0.01 mol % to about 2 mol % or from about 0.07 mol % to about 1.2 mol % to improve quality without negatively impacting $TiO_2$ solubility and liquidus.

The glass-ceramics (and/or the precursor glass composition and/or glass that includes such a composition) disclosed herein may be essentially free of $As_2O_3$ and $Sb_2O_3$. As used herein, the term "essentially free of $As_2O_3$ and $Sb_2O_3$" means that the glass-ceramic article (or the glass composition) comprises less than about 0.1% by weight of either of $As_2O_3$ or $Sb_2O_3$.

In one or more embodiments, the glass-ceramic may comprise a non-zero weight percent of total crystalline phase up to about 20% by weight. In one or more embodiments, the total crystalline phase may be present, in wt. %, in the glass-ceramic in the range from about 0.1 to about 20, from about 0.1 to about 18, from about 0.1 to about 16, from about 0.1 to about 14, from about 1 to about 20, from about 2 to about 20, from about 4 to about 20, from about 6 to about 20, from about 8 to about 20, from about 10 to about 20, from about 1 to about 9, from about 2 to about 8, from about 3 to about 7, from about 4 to about 7, from about 5 to about 7, or from about 6 to about 7, and all ranges and sub-ranges therebetween. In one or more embodiments, the total crystalline phase may include about 12 wt. % or less, or about 5 wt. % or less of the glass-ceramic article. The amount of components in the precursor glass composition may be adjusted to form the desired amount of total crystalline phase. In one or more specific embodiments, the amount of $TiO_2$ may be adjusted to provide a desired amount of crystalline phase. Without being bound by theory, the portion of the crystalline phase disclosed herein provides a glass-ceramic that behaves like a glass. For example these low crystallinity glass-ceramics can be reformed, bent, or fused after the part has been cerammed the glass phase predominates the weight percent and thus determines most of the thermophysical properties of the glass-ceramic. In some embodiments, the crystalline phase may be considered low such that crystals may be small in size or not even present in local areas. In one or more specific embodiments, the crystals in some local areas may have one or more dimensions with a size on the nanometer scale. In the embodiments disclosed herein, the glass-ceramics may be formed using fusion forming techniques or other techniques that require the material being formed to exhibit glass-like properties or properties typically exhibited by glass materials.

In one example, the glass-like properties exhibited by the glass-ceramics disclosed herein include improved indentation crack initiation load performance. Without being bound by theory, one or more embodiments of the glass-ceramics disclosed herein exhibit glass-like properties because the indentation crack initiation load results are similar to the results obtained when glass materials are tested in the same manner. Accordingly, the glass-ceramics according to one or more embodiments exhibit a greater glass phase than other known glass-ceramics and thus can be formed using known glass forming techniques that may be otherwise unavailable if a greater crystalline phase weight percent or larger crystals were present. In known glass-ceramics having a greater amount of crystalline phase (in wt. %), the crystals present may be more numerous or may be larger in size in the precursor glass composition and, therefore, the processes available for forming the glass-ceramic may be limited due the presence of the crystals and/or crystalline phase.

In one or more embodiments, the predominant crystalline phase may include anatase, rutile, armalcolite or a combination thereof. As used herein, the phrase "predominant crystalline phase" means that such a crystalline phase constitutes the greatest percent weight of the all the crystalline phases in the glass-ceramics described herein. For example, in one or more embodiments an anatase crystalline phase may comprise the greatest percent by weight of all of the crystalline phases in the glass-ceramic. In other embodiments, a rutile crystalline phase may comprise the greatest percent by weight of all of the crystalline phases in the glass-ceramic articles. In yet other embodiments, a combination of any two or all three of an anatase crystalline phase, a rutile crystalline phase and an armalcolite crystalline phase may comprise the greatest percent by weight of all of the crystalline phases in the glass-ceramic articles.

In one or more specific embodiments, anatase, rutile and armalcolite may be present, either individually or in combination, in an amount up to 100 wt. % of the total crystalline phase of the glass-ceramics. In one or more alternative embodiments, anatase, rutile and armalcolite may be present either individually or in combination, in an amount, in wt. % of the total crystalline phase, in the range from about 0.1 to about 90, from about 1 to about 90, from about 1 to about 80, from about 1 to about 70, from about 1 to about 60, from about 10 to about 100, 20 to about 100, from about 30 to about 100, from about 40 to about 100, from about 20 to about 90, from about 30 to about 80, from about 40 to about 70, from about 50 to about 60, or from about 30 to about 40, and all ranges and sub-ranges therebetween.

The amount of anatase, rutile and/or armalcolite in the total crystalline phase may be modified by adjusting the amount of $TiO_2$ and/or $B_2O_3$ in the precursor glass composition. If the amount of $TiO_2$ is reduced, other crystalline phases other than rutile, anatase and/or amalcolite may form in the glass-ceramic. As otherwise described herein, other crystalline phases other than anatase and/or rutile and/or armalcolite may exhibit lower refractive index and thus provide glass-ceramics that may not exhibit the same brightness or whiteness as glass-ceramics containing anatase and/or rutile and/or armalcolite as the predominant crystalline phase(s). For example, the high refractive index of armalcolite, which is typically about 2.3, provides a white opaque color in the glass ceramics. In some instances the combined amount of any one or more of anatase, rutile and armalcolite is limited to less than about 20 wt %, less than about 15 wt %, less than about 12 wt %, less than about 10 wt % or less than about 5 wt %, but is greater than about 0.1 wt. %, of the glass-ceramic.

In some embodiments, the crystals present in the predominant crystal phase may further be characterized. The crystals may be anatase, rutile, armalcolite or a combination thereof. In some examples, at least a portion of the crystals in the predominant crystal phase have a minor dimension of about 1000 nm or less, about 500 nm or less or about 100 nm or less. In some embodiments, the minor dimension may be in the range from about 10 nm to about 1000 nm, from about 10 nm to about 500 nm, from about 10 nm to about 400 nm, from about 50 nm to about 1000 nm, from about 100 nm to about 1000 nm, form about 100 nm to about 1000 nm, form about 200 nm to about 1000 nm, from about 300 nm to about 1000 nm, from about 1 nm to about 200 nm, from about 10 nm to about 200 nm, from about 20 nm to about 200 nm, form about 30 nm to about 200 nm, from about 40 nm to about 200 nm, from about 50 nm to about 200 nm, from about 10 nm to about 100 nm, from about 50 nm to about 100 nm. The at least a portion of the crystals in the predominant phase may have an aspect ratio defined as the ratio of a major dimension of the crystal to the minor dimension of the crystal. In some instances, the aspect ratio may be about 2 or greater, or about 5 or greater.

Other crystalline phase(s) in the glass-ceramic articles may include: nepheline, β-spodumene, β-quartz, β-eucryptite, spinel, $Na_2Ca_3Al_2(PO_4)_2(SiO_4)_2$, $Ca(PO_3)_2$, $Ca_2SiO_4$, $Ca_{26}Mg_{0.4}(PO_4)_2$ and the like. In one or more embodiments, the crystalline phase(s) other than anatase, rutile and/or armalcolite may be characterized as minor. In one or more embodiments, the amount of minor crystalline phases may be minimized to provide a glass-ceramic exhibiting a bright white color. Without being bound by theory, it is believed that minor crystalline phases, such as those described herein, may introduce other colors or optical properties that are not as desirable. In one or more embodiments, the minor crystalline phases may exhibit a lower refractive index that does not provide the bright white color that maybe desired. Accordingly, in one or more embodiments, the weight percent of the minor crystalline phase(s) may be modified or even minimized to adjust the whiteness and/or brightness of the glass-ceramic. In one or more alternative embodiments, the weight percent of the minor crystalline phase(s) may be increased or decreased to adjust the mechanical properties of the glass-ceramic.

To achieve opacity, these other crystalline phases (other than rutile, anatase and/or armalcolite) may need to have a sufficient product of their size multiplied by their number density to achieve enough optical scattering for opacity. Large crystals can serve as flaws that weaken the material and reduce their usefulness. Anatase, rutile and armalcolite however, have a high refractive index, birefringence, and often grow in elongated needle like crystals which impart optical opacity at lower weight percent fraction. Since anatase, rutile and armalcolite scatter so efficiently, opaque materials can be made with small crystals so that the mechanical strength of the glass-ceramic is not degraded. Furthermore, the elongated grains of anatase, rutile and armalcolite help to toughen the glass-ceramic. For example, as shown in FIG. 1, fracture toughness increases as the amount of $TiO_2$ is increased.

The glass-ceramics disclosed herein may exhibit opaqueness and an average % opacity≥85% for a 0.8 mm thickness over the wavelength range from about 380 nm to about 780 nm. In one or more embodiments, the average opacity is 86% or greater, 87% or greater, 88% or greater 89% or greater, greater than about 90%, greater than about 91%, greater than about 92%, greater than about 93%, greater than about 94%, greater than about 95%, greater than about 96%, greater than about 97% and even greater than about 98%, over the visible wavelength range of 380 nm to about 780 nm. Opacity is measured using a contrast ratio method with a spectrophotometer (for example, spectrophotometers supplied by X-rite under the model number Color i7) and different illuminants (e.g., F02, D65, A-10). The opacity of samples was measured over both a light colored backing and a dark colored backing.

The glass-ceramics described herein may be characterized by the processes by which they can be formed. Such glass-ceramics may be formed by float processes, fusion processes, slot draw process, thin rolling processes, or a combination thereof. In some embodiments, the glass-ceramic may be shaped into or have a three-dimensional shape. In one or more embodiments, the properties of the precursor glass composition and glass (e.g., viscosity) used to form the glass-ceramic may determine this processing flexibility.

In still further aspects, at least a portion of a surface of the glass-ceramics and/or precursor glasses can be strengthened, for example, by an IX process. In other words, at least a portion of the surface of the glass-ceramics and/or precursor glasses described herein are ion exchangeable or adapted to IX treatment thus yielding an IX glass-ceramic or IX glass. In one or more embodiments, the IX glass-ceramic and/or IX glass may include a CS layer extending from a surface of the glass-ceramic and/or glass to a DOL within the glass-ceramic and/or glass. In one variant, the CS layer may exhibit a compressive stress of at least about 200 MPa, at least about 250 MPa, at least about 300 MPa, at least about 350 MPa, at least about 400 MPa, at least about 450 MPa, at least about 500 MPa, at least about 550 MPa, at least about 600 MPa, at least about 650, at least about 700 MPa, and all ranges and sub-ranges therebetween. In another embodiment, the DOL may be about 15 μm or greater, about 20 μm or greater, about 25 μm or greater, about 30 μm or greater, about 35 μm or greater, about 40 μm or greater, about 45 μm or greater, about 50 μm or greater, or about 75 μm or greater. The upper limit may be up to and including about 100 μm or 150 μm and all ranges and sub-ranges therebetween.

In one or more embodiments, the glass-ceramic is IXable at a higher rate than other glass-ceramic articles made from compositions that differ from the compositions disclosed herein. As otherwise mentioned herein, in one or more embodiments, the inclusion of $P_2O_5$ facilitates faster ion exchange as compared to other precursor glass composition and/or glass that includes such compositions, which do not include $P_2O_5$.

It is noted that in addition to single step IX processes, multiple IX procedures might be utilized to create a designed IX profile for enhanced performance. That is, a stress profile created to a selected DOL by using IX baths formulated with differing concentration of ions or by using multiple IX baths formulated using different ion species having different ionic radii.

The glass-ceramics according to one or more embodiments may exhibit superior mechanical properties. For example, the glass-ceramic article may exhibit a high crack initiation threshold, as measured using a Vickers indenter ("Vickers indentation crack initiation threshold"). Such glass-ceramics may be IX glass-ceramic articles. In one or more embodiments, the glass-ceramics may exhibit a Vickers indentation crack initiation load of at least about 10 kgf In one or more specific embodiments, the glass-ceramics may exhibit a Vickers indentation crack initiation load of at least about 15 kgf or even at least about 20 kgf. Such glass-ceramics may be IX glass-ceramics that are ion exchanged, as described herein, for 1 hour, 2 hours or 4 hours, in a bath having a temperature of about 410° C.

In one or more embodiments, the glass-ceramic may exhibit a white color or may be characterized as essentially white. As used herein, the term "essentially white" means that the glass-ceramic has a color presented in CIELAB color space coordinates determined from specular reflectance measurements using a spectrophotometer and different illuminants. For example, as measured using illuminant D65, the glass-ceramic may exhibit CIELAB color coordinates of CIE a* in the range from about −2 to about 8; CIE b* in the range from about −7 to about 30; and CIE L* in the range from about 85 to about 100. In some embodiments, the glass-ceramic may exhibit CIELAB color coordinates of CIE a* in the range from about −1 to about 0, CIE b* in the range from about −8 to about −3, and CIE L* in the range from about 80 to about 100, as measured using a spectrophotometer with illuminant F02 or D65. These values may be obtained when specular reflectance is included or excluded during measurement. Moreover, the glass-ceramics exhibit an essentially white color even when processing conditions utilized to form the glass-ceramics vary. For example, the glass-ceramics exhibit an essentially white color even when heat treatment temperature(s) vary by as much as 100° C. In one variant, the essentially white color is exhibited by the glass-ceramics when heat treatment temperatures vary by more than 5° C., 10° C., 20° C., 30° C., 40° C., 50° C., 60° C., 70° C., 80° C., 90° C. and 95° C.

In one or more embodiments, the glass-ceramic may exhibit a color or tint, other than white. In such embodiments, colorants in the form of metallic ions may be present in the precursor glass such as transition metal ions and oxides of Co, Cr, Cu, Sn, Mn, Sb, Fe, Bi, Ni, V, Se and others known in the art.

Precursors Glass Compositions and Glasses

A second aspect of this disclosure pertains to the precursor glass compositions and glasses including the same utilized to form the glass-ceramics described herein. The glass-ceramics according to one or more embodiments may be formed from a glass, such as an aluminosilicate glass, having a precursor glass composition as otherwise described herein with respect to the glass-ceramics.

In one or more embodiments, the glass composition exhibits a liquidus viscosity of about 20 kP or greater and a liquidus temperature of less than about 1400° C. when formed into a glass article via, for example, down drawing. The precursor glass compositions may be formed into a glass article that also exhibits a liquidus viscosity of at least about 20 kilopoise (kP) and a liquidus temperature of less than about 1400° C. In one variant, the glass composition and/or glass including such composition may exhibit a liquidus viscosity of at least about 20 kP or greater, 22 kP or greater, 24 kP or greater, 26 kP or greater, 28 kP or greater, 30 kP or greater, or about 50 kP or greater, including all ranges and sub-ranges therebetween. In another variant, the glass composition and/or glass including such composition may exhibit a liquidus temperature of about 1350° C. or less, 1300° C. or less, 1250° C. or less, 1200° C. or less, 1150° C. or less, 1100° C. or less, 1050° C. or less, 1000° C. or less, 950° C. or less, 900° C. or less, and all ranges and sub-ranges therebetween. The precursor glass compositions and glass that includes such compositions may be described as crystallizable. In some embodiments, the glass composition may be characterized as formable by a fusion draw process, formable by a slot draw process, formable by a float process, formable by a thin rolling process, or a combination thereof. In some embodiments, the glass may be shaped into or have a three-dimensional shape.

A third aspect of the present disclosure pertains to a method for forming precursor glasses formulated to be crystallizable to glass-ceramics and methods for forming glass-ceramics having a anatase, rutile, armalcolite or a combination thereof as the predominant crystalline phase. In one or more embodiments, the methods included melting a batch for, and forming, a glass having a composition as otherwise described herein. For example, the composition may include in mol %: $SiO_2$ in the range from about 45 to about 75; $Al_2O_3$ in the range from about 4 to about 25; $P_2O_5$ in the range from about 0.1 to about 10; MgO in the range from about 0.01 to about 8; $R_2O$ in the range from about 0 to about 33; ZnO in the range from about 0 to about 8; $ZrO_2$ in the range from about 0 to about 4, $B_2O_3$ in the range from about 0 to about 12, and one or more nucleating agents in the range from about 0.5 to about 12. In one or more embodiments, the composition may include one or more colorants in the form of metallic ions, such as transition metal ions and oxides of Co, Cr, Cu, Sn, Mn, Sb, Fe, Bi, Ni, V, Se and others known in the art.

In addition, the batch is formulated to produce the precursor glass articles and compositions described herein, which, upon fining and homogenization, form molten glass compositions at a temperature below about 1600° C. Still yet other aspects of the method include forming molten precursor glasses into the glass article described herein. The method may further include ceramming the glass for a period of time to cause the generation of a glass-ceramic which includes a predominant crystalline phase comprising anatase, rutile, armalcolite or a combination thereof; and cooling the glass-ceramic to room temperature. Forming the glass may include down drawing (by either a slot draw or fusion draw process), float processing, or thin rolling the glass. In some embodiments, the method may include shaping the glass or glass-ceramic to a three-dimensional shape.

In one or more embodiments, the precursor glass composition exhibits a liquidus viscosity of about 10 kilopoise (kP) or greater (e.g., 20 kP or greater, 50 kP or greater or 100 kP or greater) and a liquidus temperature of less than about 1400° C. during forming (e.g., down drawn).

Regarding raw material selection it is recommended that low iron content sand is used as the $SiO_2$ source. Prior acid treatment may be necessary to reduce the iron level of the sand and other batch materials. It is important to make sure that the treatment of the batch materials per se does not introduce more than 500 ppm iron oxides. In some embodiments, raw materials that contribute less than 200 ppm total $Fe_2O_3$ to the glass and glass-ceramic may be utilized, if a bright white glass-ceramic is desired. Anhydrous boric acid may be used as the source of $B_2O_3$. One skilled in the art can calculate the amount of batch materials used according to the projected final composition of the glass-ceramic. As mentioned above, a fining agent that has been found to be beneficial is $SnO_2$ in a non-zero amount up to 2 mole %.

The mixed batch materials are then charged into a glass tank and melted according to conventional glass melting process. One skilled in the glass melting art can adjust the composition of the batch within the above described compositional range to fine tune the melting ease of the glass in order to accommodate the operating capacity and temperature of the glass melting tank. The molten glass can be homogenized and fined using conventional methods.

The homogenized, fined and thermally uniform molten glass is then formed into desired shapes. Various shaping may be used, such as casting, molding, pressing, rolling, floating, and the like. Generally, the glass should be formed at a viscosity lower than the liquidus viscosity (hence a temperature higher than the liquidus temperature). When pressing is utilized, the glass is first delivered to high temperature molds and formed into glass articles with desired shape, surface texture and surface roughness by using a plunger. To obtain low surface roughness and a precise surface contour, precision plungers are required to press the glass gobs filled in the molds. It is also required that the plungers will not introduce IR absorbing oxides or other defects onto the surface of the glass article should high IR transmission is required. The moldings are then removed from the molds and transferred to a glass annealer to remove enough stress in the moldings for further processing where necessary and desirable. Thereafter, the cooled glass moldings are inspected, analyzed of chemical and physical properties for quality control purpose. Surface roughness and contour may be tested for compliance with product specification.

To produce the glass-ceramic article of the present disclosure, the thus prepared glass articles are placed into a crystallization kiln to undergo the ceramming process. The temperature-temporal profile of the kiln is desirably program-controlled and optimized to ensure that the glass moldings and other glass articles, such as glass plates and the like, are formed into glass-ceramic articles described herein. As described above, the glass composition and the thermal history during the ceramming process determine the final crystalline phases, their assemblage and crystallite sizes in the final product. In one or more embodiments, the glass articles are heat treated to a temperature in the range from about 700° C. to about 1000° C. for a period of time sufficient to cause the generation of crystals and thus, a glass-ceramic. Generally, the glass articles are first heated to a nucleation temperature (Tn) range where crystal nuclei start to form. Subsequently, they are heated to an even higher maximum crystallization temperature Tc to obtain the desired crystalline phase(s). It is often desired to keep the articles at Tc for a period of time so that crystallization reaches a desired extent. In order to obtain the glass-ceramic articles of the present disclosure, the nucleation temperature Tn is in the range from about 700° C. to about 800° C., and the crystallization temperature Tc is in the range from about 800° C. to about 1000° C. After crystallization, the articles are allowed to exit the crystallization kiln and are cooled to room temperature. One skilled in the art can adjust Tn, Tc and the temperature-temporal profile of the crystallization cycle to accommodate the different glass compositions within the above-described range. The glass-ceramic article of the present disclosure can advantageously exhibit an opaque white coloring.

In one or more embodiments, the method includes (i) heating the glass at a rate of about 5° C./min to a nucleation temperature (Tn) ranging between 700° C. and 800° C. or until the glass exhibits a viscosity from about $10^9$ to about $10^{13}$ poise (e.g., from about $10^{10}$ to about $10^{12}$ poise); (ii) maintaining the glass at the nucleation temperature for a time ranging between 1 h to 8 h (or specifically from about 1 h to about 4 h) to produce a nucleated glass; (iii) heating the nucleated glass at a rate of about 5° C./min to a crystallization temperature (Tc) ranging between about 50° C. greater than an annealing temperature of the glass (e.g., 800° C.) and about 1100° C. or until the nucleated glass exhibits a viscosity from about $10^7$ to about $10^{12}$ poise (e.g., from about $10^8$ poise to about $10^{11}$ poise); (iv) maintaining the nucleated glass at the crystallization temperature for a time ranging between about 2 h to about 8 h (or more specifically from about 2 h to about 4 h) to produce an article comprising and/or a glass-ceramic as described herein; and (v) cooling the article comprising and/or glass-ceramic to room temperature. The viscosity and/or temperatures to which the glass or nucleated glass is heated may be adjusted to maintain the desired shape of the glass or glass-ceramic. The opacity of the resulting glass-ceramic may be modified by modifying the ceramming temperatures and/or times. For example, lighter opals (or less opaque glass-ceramics) may be formed using lower nucleation and/or crystallization temperatures and shorter nucleation and/or crystallization times, and more opaque glass-ceramics can be formed using higher nucleation and/or crystallization temperatures and longer nucleation and/or crystallization times. As otherwise described herein, the amount of nucleating agent may also be adjusted to modify the opacity.

Temperature-temporal profile of steps (iii) and (iv), in addition to the composition of the precursor glass are judiciously prescribed so as to produce the desired crystalline phase(s); desired total weight of crystalline phase; desired proportions of the predominate crystalline phase and/or minor crystalline phase(s) and residual glass; desired crystal phase assemblages of the predominate crystalline phase and/or minor crystalline phase(s) and residual glass; desired grain sizes or grain size distributions among the predominate crystalline phase and/or minor crystalline phase(s); and, hence the final integrity, quality, color, and/or opacity, of resultant glass-ceramics and/or glass-ceramic articles according to aspects and/or embodiments of this disclosure.

The method may include subjecting the glass-ceramic to ion exchange treatment to provide an IX glass-ceramic. In one or more alternative embodiments, the method includes subjecting the glass article to ion exchange treatment to provide an IX glass article, prior to ceramming the glass article or even without ceramming the glass article. In one or more embodiments, the precursor glass may also be subjected to ion exchange treatment to provide an IX glass. In one or more embodiments, potassium (K) ions, for example, could either replace, or be replaced by, sodium (Na) ions in the glass-ceramic (and/or glass article), again depending upon the IX temperature conditions. Alternatively, other alkali metal ions having larger atomic radii, such as (Rb) rubidium or cesium (Cs) could replace smaller alkali metal ions in the glass-ceramic (and/or glass article). Similarly, other alkali metal salts such as, but not limited to, sulfates, halides, and the like may be used in the ion exchange process.

It is contemplated that both types of ion exchange can take place; i.e., larger for smaller ions are replaced and/or smaller for larger ions are replaced. In one or more embodiments, the method involves ion exchanging (particularly sodium-for-potassium ion exchange) the glass-ceramic article (and/or glass article) in a $KNO_3$ bath at temperatures from about 300° C. to about 500° C. (e.g., from about 360 to about 450° C.) for up to 10 h. In one some aspects and/or embodiments, the method involves ion exchanging (particularly lithium-for-sodium ion exchange) the glass-ceramic article (and/or glass article) by placing it in a $NaNO_3$ bath at temperatures between 330-450° C. for times up to 10 h. In other aspects and/or embodiments, the ion exchange process can be accomplished utilizing mixed potassium/sodium baths at similar temperatures and times; e.g., an 80/20 $KNO_3/NaNO_3$ bath or alternatively a 60/40 $KNO_3/NaNO_3$ at comparable temperatures. In still other aspects and/or embodiments, a two-step ion exchange process is contemplated wherein the first step is accomplished in a Li-containing salt bath; e.g. the molten salt bath can be a high temperature sulfate salt bath composed of $Li_2SO_4$ as a major ingredient, but diluted with $Na_2SO_4$, $K_2SO_4$ or $Cs_2SO_4$ in sufficient concentration to create a molten bath. This ion exchange step functions to replace the larger sodium ions in the glass-ceramic article with the smaller lithium ions which are found in the Li-containing salt bath. The second ion exchange step functions to exchange Na into the glass-ceramic article (and/or glass article) and can be accomplished as above by a $NaNO_3$ bath at temperatures between 320° C. and 430° C. The glass-ceramic can also be ion exchanged in a bath containing Ag or Cu ions to impart antimicrobial or antiviral properties to the material.

In one or more embodiments, the glass-ceramic (and/or glass article) is subjected to IX treatment to form an IX glass-ceramic article (and/or glass article) having at least a portion of at least one surface subjected to an IX process, such that the IX portion of the least one surface exhibits a CS layer having a DOL greater than or equal to 2% of the overall article thickness while exhibiting a compressive stress ($\sigma_s$) in the surface of at least 300 MPa. Any IX process known to those in the art might be suitable as long as the above DOL and compressive stress ($\sigma_s$) are achievable.

In a more particular embodiment, the glass-ceramics described herein may be incorporated into a housing or enclosure of a device and may exhibit an overall thickness of 2 mm and a CS layer with a DOL of about 40 μm or greater and a compressive stress ($\sigma_s$) of about 500 MPa or greater. Again any IX process which achieves these features is suitable.

It is noted that in addition to single step IX processes, multiple IX procedures might be utilized to create a designed IX profile for enhanced performance. That is, a stress profile created to a selected DOL by using IX baths formulated with differing concentration of ions or by using multiple IX baths formulated using different ion species having different ionic radii.

The resulting glass-ceramic, made according to one or more embodiments of the method, may exhibit a color presented in CIELAB color space coordinates determined from specular reflectance measurements using a spectrophotometer with various illuminants (e.g, with illuminant D65 or F02). Specular reflectance may be included or excluded in the measurements, as otherwise described herein. In one or more embodiments, the ion exchange treatment is more effective due to the low amount of total crystalline phase in the glass-ceramics disclosed herein. It is believed that the low amount of total crystalline phase leaves a greater portion of glass in the glass-ceramic, which can undergo strengthening via ion exchange. Without being bound by theory, in one or more embodiments, subjecting the glasses or glass-ceramics disclosed herein to an ion exchange process in a molten salt bath of $KNO_3$ and temperature of about 430° C. for up to 16 hours resulted in glass-ceramics exhibiting high indentation crack initiation load values (e.g., from about 10 kgf to about 15 kgf). Without being bound by theory, it is believed that a fast cooling process (during the ceramming process) leads to a higher fictive temperature in the precursor glass, which is believed to result in improved crack resistance (in the form of improved indentation crack initiation load) in substrates that are ion exchanged. Accordingly, subjecting the precursor glasses to a fictivation process or by forming using a fusion process (which has a fast cooling rate), may also result in glass-ceramics exhibiting improved indentation crack initiation load.

In the following examples, various characterizations of the precursor glass composition, precursor glasses and glass-ceramics will be described. The characterizations may include CIELAB color space coordinates, translucency, opacity, viscosity, annealing point, strain point, dielectric parameters, identity of the crystalline phases and/or crystal sizes, elemental profiles, compressive stress profiles, Vickers hardness, CTE, fracture toughness ($K_{1C}$).

CIELAB color space coordinates (e.g., CIE L*; CIE a*; and CIE b*; or CIE L*, a*, and b*; or L*, a*, and b*) for describing the color of the glass-ceramics; described herein were determined by methods known to those in the art from total reflectance—specular included—measurements or reflectance with specular reflectance excluded.

Viscosity of precursor glasses according to aspects and/or embodiments of this disclosure can be by methods known to those in the art, such as, those described in ASTM C965-96 and ASTM C1350M-96.

Annealing point and strain point of precursor glasses described herein can be measured by methods known to those in the art, such as, those described in ASTM C598 (and its progeny, all herein incorporated by reference) "Standard Test Method for Annealing Point and Strain Point of Glass by Beam Bending," ASTM International, Conshohocken, Pa., US.

Identity of the crystalline phases of crystal phase assemblages and/or crystal sizes of a crystalline phase were determined by X-ray diffraction (XRD) analysis techniques known to those in the art, using such commercially available equipment as the model as a PW1830 (Cu Kα radiation) diffractometer manufactured by Philips, Netherlands. Spectra were typically acquired for 2θ from 5 to 80 degrees.

Elemental profiles measured for characterizing surfaces of precursor glasses, and glass-ceramics were determined by analytical techniques know to those in the art, such as, electron microprobe (EMP); x-ray photoluminescence spectroscopy (XPS); secondary ion mass spectroscopy (SIMS) . . . etc.

The compressive stress ($\sigma_s$) of the surface CS layer, average surface compression, and DOL of the glass-ceramics and precursor glasses described herein can be conveniently measured using conventional optical techniques and instrumentation such as commercially available surface stress meter models FSM-30, FSM-60, FSM-6000LE, FSM-7000H . . . etc. available from Luceo Co., Ltd. and/or Orihara Industrial Co., Ltd., both in Tokyo, Japan. In some instances, additional analysis may be required to determine an accurate stress profile.

Vickers hardness of precursor glasses and/or glass-ceramics can be characterized by methods known to those in the art, such as, those described in ASTM C1327 (and its progeny, all herein incorporated by reference) Standard Test Methods for Vickers Indentation Hardness of Advanced Ceramics," ASTM International, Conshohocken, Pa., US.

Coefficient of thermal expansion (CTE) of precursor glasses and/or glass-ceramics can be characterized by methods known to those in the art, such as, those described in ASTM E228 (and its progeny, all herein incorporated by reference) Standard Test Method for Linear Thermal Expansion of Solid Materials with a Push-Rod Dilatometer," ASTM International, Conshohocken, Pa., US.

Fracture toughness ($K_{1C}$) of precursor glasses and/or glass-ceramics can be characterized by methods known to those in the art, such as, those described in ASTM C1421 (and its progeny, all herein incorporated by reference) Standard Test Methods for Determination of Fracture Toughness of Advanced Ceramics at Ambient Temperature," ASTM International, Conshohocken, Pa., US and/or using chevron notched short bar (CNSB) specimens and/or methods substantially according to ASTM E1304 C1421 (and its progeny, all herein incorporated by reference) "Standard Test Method for Plane-Strain (Chevron-Notch) Fracture Toughness of Metallic Materials," ASTM International, Conshohocken, Pa., US.

EXAMPLES

Various embodiments will be further clarified by the following examples, which are in no way intended to limit this disclosure thereto.

Inasmuch as the sum of the individual constituents totals or very closely approximates 100, for all practical purposes the reported values may be deemed to represent mole %. The actual precursor glass batch ingredients may comprise any materials, either oxides, or other compounds, which, when melted together with the other batch components, will be converted into the desired oxide in the proper proportions.

Examples 1-116: The exemplary precursor glass precursors listed in Table I were made in a platinum crucible using a batch of raw materials formulated to yield 1000 g of precursor glass upon melting and refining. Each crucible containing a formulated raw materials batch was placed in a furnace preheated to from 1575° C.-1650° C., the formulated raw materials batch melted and refined to produce a molten precursor glass that was then cast as patties of precursor glass that were annealed for 1 hour at or around the annealing point of the glass composition. In this way individual patties of an exemplary precursor glass could then be cut into multiple pieces and the one or more of the pieces were subjected to a number of different and/or similar thermal treatments (nucleated and crystallized) by placing in a static furnace programmed with such different or similar temperature-temporal cycle. Examples of some of the temperature-temporal cycles to which a number of the patties of the exemplary precursor glasses listed in Table I were subjected included:

i) introduction of the patties into a furnace set at between room temperature and 500° C.;

ii) heat treatment at 5° C./minute (min) to the nucleation temperature (Tn), as shown in Table III (e.g., 750° C.);

iii) hold at Tn for 2 h;

iv) heat at 5° C./min from Tn to the crystallization temperature (Tc), as shown in Table III (e.g., 850° C.-1050° C.); and v) hold for 4 h the crystallization temperature (Tc); and vi) cool to room temperature.

Thermally treated patties of precursor glasses listed in Table I, following thermal treatment as described above to glass-ceramics, were also analyzed for the properties listed in Table I. The precursor glasses listed in Table I were analyzed by X-ray Fluorescence (XRF) and/or by ICP or as batched to determine the components of the precursor glasses. Anneal, strain and softening points were determined by fiber elongation. Density was determined by Buoyancy Method. Each coefficient of thermal expansion (CTE) value is the average value between room temperature and 300° C. Elastic modulus for each precursor glass was determined by resonant ultrasound spectroscopy. Refractive index for each precursor glass is stated for a wavelength of 589.3 nm. Stress optic coefficient (SOC") values were determined by the diametral compression method. Liquidus temperature measurements were reported based on 24 hour and 72 hour gradient boat testing.

TABLE I

Table I: Precursor glass compositions.

| Oxide [mole %] | Example 1 | Example 2 | Example 3 | Example 4 | Example 5 |
|---|---|---|---|---|---|
| $SiO_2$ | 60.42 | 59.42 | 58.36 | 58.36 | 58.34 |
| $Al_2O_3$ | 14.98 | 14.98 | 15.46 | 15.46 | 14.96 |
| $P_2O_5$ | 4.99 | 4.99 | 4.99 | 4.99 | 4.98 |
| $B_2O_3$ | 0.00 | 0.00 | 0.00 | 0.00 | 0.00 |
| $Li_2O$ | 0.00 | 0.00 | 0.00 | 2 | 0.00 |
| $Na_2O$ | 14.98 | 14.98 | 16.05 | 14.06 | 15.56 |
| $K_2O$ | 0.00 | 0.00 | 0.00 | 0.00 | 0.00 |
| MgO | 2.49 | 2.5 | 2.99 | 2.99 | 4.00 |
| CaO | 0.06 | 0.06 | 0.06 | 0.05 | 0.06 |
| ZnO | 0.00 | 0.00 | 0.00 | 0.00 | 0.00 |
| BaO | 0.00 | 0.00 | 0.00 | 0.00 | 0.00 |
| $TiO_2$ | 2.00 | 3.00 | 1.99 | 1.99 | 2.00 |
| $TeO_2$ | 0.00 | 0.00 | 0.00 | 0.00 | 0.00 |
| $Nb_2O_5$ | 0.00 | 0.00 | 0.00 | 0.00 | 0.00 |
| $SnO_2$ | 0.08 | 0.08 | 0.10 | 0.10 | 0.10 |
| $ZrO_2$ | 0.00 | 0.00 | 0.00 | 0.00 | 0.00 |
| $MnO_2$ | 0.00 | 0.00 | 0.00 | 0.00 | 0.00 |
| $La_2O_3$ | 0.00 | 0.00 | 0.00 | 0.00 | 0.00 |
| F— | 0.00 | 0.00 | 0.00 | 0.00 | 0.00 |
| $CeO_2$ | 0.00 | 0.00 | 0.00 | 0.00 | 0.00 |
| $[R_2O—Al_2O_3]$ | 0.00 | 0.00 | 0.59 | 0.60 | 0.60 |
| Strain Pt (C.): | | | 612 | 587 | 619 |
| Anneal Pt (C.): | | | 659 | 632 | 664 |
| Softening Pt (C.): | | | 918 | 887 | 930 |
| CTE ($\times 10^{-7}$/C.): | | | 83 | 81.6 | 81.8 |
| Density (g/cm^3): | | | 2.441 | 2.439 | 2.444 |
| Poisson's Ratio: | | | 0.218 | 0.169 | 0.202 |
| Shear Modulus (Mpsi): | | | 4.039 | 4.248 | 4.042 |
| Young's Modulus (Mpsi): | | | 9.836 | 9.929 | 9.715 |
| Refractive Index: | | | 1.5047 | 1.4965 | 1.4944 |
| Stress optic coefficient | | | | | |
| Fracture toughness (MPa/m1/2) | | | 0.684 | 0.709 | 0.638 |
| Hardness (MPa) | | | 536 | 552 | 536 |
| Liquidus temperature | 1105 | 1110 | 1130 | 1130 | 1120 |
| Fulcher_A | | −3.779 | | | |
| Fulcher_B | | 9595 | | | |
| Fulcher_T0 | | 83.8 | | | |

| Oxide [mole %] | Example 6 | Example 7 | Example 8 | Example 9 | Example 10 |
|---|---|---|---|---|---|
| $SiO_2$ | 59.48 | 56.02 | 55.02 | 56.02 | 55.02 |
| $Al_2O_3$ | 14.38 | 15.28 | 15.00 | 15.27 | 15.00 |
| $P_2O_5$ | 5.67 | 7.41 | 7.28 | 5.56 | 7.28 |
| $B_2O_3$ | 0.00 | 0.00 | 0.00 | | |

TABLE I-continued

Table I: Precursor glass compositions.

|  |  |  |  |  |  |
|---|---|---|---|---|---|
| $Li_2O$ | 0.00 | 0.00 | 0.00 | | |
| $Na_2O$ | 15.48 | 14.83 | 14.54 | 14.83 | 14.54 |
| $K_2O$ | 0.00 | 0.47 | 0.45 | 0.47 | 0.45 |
| MgO | 2.89 | 0.36 | 0.36 | 0.38 | 0.36 |
| CaO | 0.00 | 3.71 | 3.63 | 3.70 | 3.63 |
| ZnO | 0.00 | 0.00 | 0.00 | | |
| BaO | 0.00 | 0.00 | 0.00 | | |
| $TiO_2$ | 2.00 | 1.85 | 3.63 | 3.71 | 3.63 |
| $TeO_2$ | 0.00 | 0.00 | 0.00 | | |
| $Nb_2O_5$ | 0.00 | 0.00 | 0.00 | | |
| $SnO_2$ | 0.10 | 0.07 | 0.07 | 0.08 | 0.07 |
| $ZrO_2$ | 0.00 | 0.00 | 0.00 | | |
| $MnO_2$ | 0.00 | 0.00 | 0.00 | | |
| $La_2O_3$ | 0.00 | 0.00 | 0.00 | | |
| F— | 0.00 | 0.00 | 0.00 | | |
| $CeO_2$ | 0.00 | 0.00 | 0.00 | | |
| $[R_2O—Al_2O_3]$ | 1.10 | 0.02 | −0.01 | 0.03 | −0.01 |
| Strain Pt (C.): | 611 | 610 | 604 | | |
| Anneal Pt (C.): | 655 | 665 | 656 | | |
| Softening Pt (C.): | 921 | 930 | 917 | | |
| CTE (×10^−7/C.): | 79.8 | 85.8 | 86 | | |
| Density (g/cm^3): | 2.43 | 2.447 | 2.463 | | |
| Poisson's Ratio: | 0.209 | 0.233 | 0.278 | | |
| Shear Modulus (Mpsi): | 4.261 | 4.228 | 4.036 | | |
| Young's Modulus (Mpsi): | 10.301 | 10.423 | 10.313 | | |
| Refractive Index: | 1.4971 | 1.5077 | 1.5057 | | |
| Stress optic coefficient | | | | | |
| Fracture toughness (MPa/m1/2) | 0.75 | 0.742 | 0.737 | | |
| Hardness (MPa) | 564 | 557 | 537 | | |
| Liquidus temperature | 1090 | 1170 | 1140 | 1155 | 1130 |
| Fulcher_A | −2.992 | −1.968 | −2.401 | | −2.985 |
| Fulcher_B | 7985.9 | 5460.4 | 6257.2 | | 7468.4 |
| Fulcher_T0 | 155.5 | 341 | 248.1 | | 170 |

| | Example = ▶ | | | | |
|---|---|---|---|---|---|
| Oxide [mole %] | 11 | 12 | 13 | 14 | 15 |
| $SiO_2$ | 54.03 | 56.04 | 55.00 | 55.01 | 57.56 |
| $Al_2O_3$ | 14.74 | 15.28 | 14.55 | 15.46 | 15.70 |
| $P_2O_5$ | 8.93 | 7.41 | 7.27 | 7.27 | 7.62 |
| $B_2O_3$ | 0.00 | 0.00 | 0.00 | 0.00 | 0.00 |
| $Li_2O$ | 0.00 | 0.00 | 0.00 | 0.00 | 0.00 |
| $Na_2O$ | 14.29 | 14.81 | 15.00 | 14.09 | 15.23 |
| $K_2O$ | 0.44 | 0.46 | 0.46 | 0.45 | 0.48 |
| MgO | 0.35 | 0.37 | 0.36 | 0.36 | 0.38 |
| CaO | 3.57 | 1.85 | 3.64 | 3.64 | 1.91 |
| ZnO | 0.00 | 0.00 | 0.00 | 0.00 | 0.00 |
| BaO | 0.00 | 0.00 | 0.00 | 0.00 | 0.00 |
| $TiO_2$ | 3.57 | 3.70 | 3.63 | 3.63 | 0.95 |
| $TeO_2$ | 0.00 | 0.00 | 0.00 | 0.00 | 0.00 |
| $Nb_2O_5$ | 0.00 | 0.00 | 0.00 | 0.00 | 0.00 |
| $SnO_2$ | 0.07 | 0.07 | 0.07 | 0.07 | 0.08 |
| $ZrO_2$ | 0.00 | 0.00 | 0.00 | 0.00 | 0.00 |
| $MnO_2$ | 0.00 | 0.00 | 0.00 | 0.00 | 0.00 |
| $La_2O_3$ | 0.00 | 0.00 | 0.00 | 0.00 | 0.09 |
| F— | 0.00 | 0.00 | 0.00 | 0.00 | 0.00 |
| $CeO_2$ | 0.00 | 0.00 | 0.00 | 0.00 | 0.00 |
| $[R_2O—Al_2O_3]$ | −0.01 | −0.01 | 0.91 | −0.92 | 0.01 |
| Strain Pt (C.): | | | | | |
| Anneal Pt (C.): | | | | | |
| Softening Pt (C.): | | | | | |
| CTE (×10^−7/C.): | | | | | |
| Density (g/cm^3): | | | | | |
| Poisson's Ratio: | | | | | |
| Shear Modulus (Mpsi): | | | | | |
| Young's Modulus (Mpsi): | | | | | |
| Refractive Index: | | | | | |
| Stress optic coefficient | | | | | |
| Fracture toughness (MPa/m1/2) | 1060 | 1110 | 1130 | 1110 | |
| Hardness (MPa) | | −2.835 | | | |
| Liquidus temperature | | 7459.3 | | | |
| Fulcher_A | | 166.7 | | | |
| Fulcher_B | | | | | |
| Fulcher_T0 | | | | | |

TABLE I-continued

Table I: Precursor glass compositions.

| Oxide [mole %] | Example → | | | | |
|---|---|---|---|---|---|
| | 16 | 17 | 18 | 19 | 20 |
| $SiO_2$ | 57.36 | 57.08 | 57.07 | 56.55 | 56.04 |
| $Al_2O_3$ | 15.64 | 15.57 | 15.57 | 15.43 | 15.28 |
| $P_2O_5$ | 7.59 | 7.55 | 7.55 | 7.48 | 7.41 |
| $B_2O_3$ | 0.00 | 0.00 | 0.00 | 0.00 | 0.00 |
| $Li_2O$ | 0.00 | 0.00 | 0.00 | 0.00 | 0.00 |
| $Na_2O$ | 15.17 | 15.09 | 15.10 | 14.96 | 14.81 |
| $K_2O$ | 0.48 | 0.47 | 0.47 | 0.47 | 0.46 |
| MgO | 0.37 | 0.38 | 0.39 | 0.37 | 0.37 |
| CaO | 1.89 | 1.89 | 0.00 | 0.93 | 1.85 |
| ZnO | 0.00 | 0.00 | 0.00 | 0.00 | 0.00 |
| BaO | 0.00 | 0.00 | 0.00 | 0.00 | 0.00 |
| $TiO_2$ | 0.94 | 0.94 | 3.78 | 3.74 | 3.70 |
| $TeO_2$ | 0.00 | 0.00 | 0.00 | 0.00 | 0.00 |
| $Nb_2O_5$ | 0.00 | 0.00 | 0.00 | 0.00 | 0.00 |
| $SnO_2$ | 0.07 | 0.08 | 0.07 | 0.07 | 0.07 |
| $ZrO_2$ | 0.00 | 0.00 | 0.00 | 0.00 | 0.00 |
| $MnO_2$ | 0.00 | 0.00 | 0.00 | 0.00 | 0.00 |
| $La_2O_3$ | 0.47 | 0.94 | 0.00 | 0.00 | 0.00 |
| F— | 0.00 | 0.00 | 0.00 | 0.00 | 0.00 |
| $CeO_2$ | 0.00 | 0.00 | 0.00 | 0.00 | 0.00 |
| [$R_2O-Al_2O_3$] | 0.01 | −0.01 | 0.00 | 0.00 | −0.01 |
| Strain Pt (C.): | | | | | |
| Anneal Pt (C.): | | | | | |
| Softening Pt (C.): | | | | | |
| CTE (×10^−7/C.): | | | | | |
| Density (g/cm^3): | | | | | |
| Poisson's Ratio: | | | | | |
| Shear Modulus (Mpsi): | | | | | |
| Young's Modulus (Mpsi): | | | | | |
| Refractive Index: | | | | | |
| Stress optic coefficient | | | | | |
| Fracture toughness (MPa/m1/2) | | | | | |
| Hardness (MPa) | | | | | |
| Liquidus temperature | | | | | |
| Fulcher_A | | | | | |
| Fulcher_B | | | | | |
| Fulcher_T0 | | | | | |

| Oxide [mole %] | Example → | | | | |
|---|---|---|---|---|---|
| | 21 | 22 | 23 | 24 | 25 |
| $SiO_2$ | 57.59 | 57.05 | 56.53 | 57.06 | 56.78 |
| $Al_2O_3$ | 15.71 | 15.56 | 15.42 | 15.56 | 15.49 |
| $P_2O_5$ | 7.62 | 7.54 | 7.47 | 7.54 | 7.51 |
| $B_2O_3$ | 0.00 | 0.00 | 0.00 | 0.00 | 0.00 |
| $Li_2O$ | 0.00 | 0.00 | 0.00 | 0.00 | 0.00 |
| $Na_2O$ | 15.23 | 15.09 | 14.94 | 13.68 | 15.01 |
| $K_2O$ | 0.48 | 0.47 | 0.46 | 1.89 | 0.47 |
| MgO | 0.38 | 0.39 | 0.37 | 0.37 | 0.37 |
| CaO | 0.05 | 0.05 | 0.05 | 0.05 | 0.05 |
| ZnO | 0.00 | 0.00 | 0.00 | 0.00 | 0.00 |
| BaO | 0.00 | 0.00 | 0.00 | 0.00 | 0.00 |
| $TiO_2$ | 2.86 | 3.78 | 4.68 | 3.77 | 3.76 |
| $TeO_2$ | 0.00 | 0.00 | 0.00 | 0.00 | 0.00 |
| $Nb_2O_5$ | 0.00 | 0.00 | 0.00 | 0.00 | 0.00 |
| $SnO_2$ | 0.08 | 0.07 | 0.07 | 0.07 | 0.07 |
| $ZrO_2$ | 0.00 | 0.00 | 0.00 | 0.00 | 0.00 |
| $MnO_2$ | 0.00 | 0.00 | 0.00 | 0.00 | 0.00 |
| $La_2O_3$ | 0.00 | 0.00 | 0.00 | 0.00 | 0.47 |
| F— | 0.00 | 0.00 | 0.00 | 0.00 | 0.00 |
| $CeO_2$ | 0.00 | 0.00 | 0.00 | 0.00 | 0.00 |
| [$R_2O-Al_2O_3$] | 0.00 | 0.00 | −0.02 | 0.01 | −0.01 |
| Strain Pt (C.): | | | | | |
| Anneal Pt (C.): | | | | | |
| Softening Pt (C.): | | | | | |
| CTE (×10^−7/C.): | | | | | |
| Density (g/cm^3): | | | | | |
| Poisson's Ratio: | | | | | |
| Shear Modulus (Mpsi): | | | | | |
| Young's Modulus (Mpsi): | | | | | |
| Refractive Index: | | | | | |
| Stress optic coefficient | | | | | |
| Fracture toughness (MPa/m1/2) | | | | | |

TABLE I-continued

Table I: Precursor glass compositions.

Hardness (MPa)
Liquidus temperature
Fulcher_A
Fulcher_B
Fulcher_T0

| Oxide [mole %] | Example = ▶ | | | | |
|---|---|---|---|---|---|
| | 26 | 27 | 28 | 29 | 30 |
| $SiO_2$ | 56.51 | 56.03 | 56.03 | 56.02 | 57.08 |
| $Al_2O_3$ | 15.42 | 15.19 | 15.28 | 15.37 | 15.48 |
| $P_2O_5$ | 7.47 | 7.41 | 7.41 | 7.41 | 7.55 |
| $B_2O_3$ | 0.00 | 0.00 | 0.00 | 0.00 | 0.00 |
| $Li_2O$ | 0.00 | 0.00 | 0.00 | 0.00 | 0.00 |
| $Na_2O$ | 14.94 | 14.91 | 14.82 | 14.73 | 15.19 |
| $K_2O$ | 0.47 | 0.46 | 0.46 | 0.46 | 0.47 |
| MgO | 0.38 | 0.37 | 0.37 | 0.37 | 0.39 |
| CaO | 0.05 | 1.85 | 1.85 | 1.85 | 0.00 |
| ZnO | 0.00 | 0.00 | 0.00 | 0.00 | 0.00 |
| BaO | 0.00 | 0.00 | 0.00 | 0.00 | 0.00 |
| $TiO_2$ | 3.74 | 3.70 | 3.70 | 3.71 | 3.77 |
| $TeO_2$ | 0.00 | 0.00 | 0.00 | 0.00 | 0.00 |
| $Nb_2O_5$ | 0.00 | 0.00 | 0.00 | 0.00 | 0.00 |
| $SnO_2$ | 0.08 | 0.07 | 0.07 | 0.07 | 0.07 |
| $ZrO_2$ | 0.00 | 0.00 | 0.00 | 0.00 | 0.00 |
| $MnO_2$ | 0.00 | 0.00 | 0.00 | 0.00 | 0.00 |
| $La_2O_3$ | 0.93 | 0.00 | 0.00 | 0.00 | 0.00 |
| F— | 0.00 | 0.00 | 0.00 | 0.00 | 0.00 |
| $CeO_2$ | 0.00 | 0.00 | 0.00 | 0.00 | 0.00 |
| [$R_2O$—$Al_2O_3$] | −0.01 | 0.18 | 0.00 | −0.18 | 0.18 |

Strain Pt (C.):
Anneal Pt (C.):
Softening Pt (C.):
CTE ($\times 10^{-7}$/C.):
Density (g/cm^3):
Poisson's Ratio:
Shear Modulus (Mpsi):
Young's Modulus (Mpsi):
Refractive Index:
Stress optic coefficient
Fracture toughness (MPa/m1/2)
Hardness (MPa)
Liquidus temperature
Fulcher_A
Fulcher_B
Fulcher_T0

| Oxide [mole %] | Example = ▶ | | | | |
|---|---|---|---|---|---|
| | 31 | 32 | 33 | 34 | 35 |
| $SiO_2$ | 57.07 | 57.07 | 57.05 | 57.06 | 57.05 |
| $Al_2O_3$ | 15.57 | 15.67 | 15.18 | 15.28 | 15.37 |
| $P_2O_5$ | 7.55 | 7.55 | 7.54 | 7.54 | 7.55 |
| $B_2O_3$ | 0.00 | 0.00 | 0.00 | 0.00 | 0.00 |
| $Li_2O$ | 0.00 | 0.00 | 0.00 | 0.00 | 0.00 |
| $Na_2O$ | 15.10 | 15.00 | 15.46 | 15.36 | 15.28 |
| $K_2O$ | 0.47 | 0.47 | 0.47 | 0.47 | 0.47 |
| MgO | 0.39 | 0.39 | 0.38 | 0.38 | 0.38 |
| CaO | 0.00 | 0.00 | 0.05 | 0.05 | 0.05 |
| ZnO | 0.00 | 0.00 | 0.00 | 0.00 | 0.00 |
| BaO | 0.00 | 0.00 | 0.00 | 0.00 | 0.00 |
| $TiO_2$ | 3.78 | 3.78 | 3.78 | 3.77 | 3.77 |
| $TeO_2$ | 0.00 | 0.00 | 0.00 | 0.00 | 0.00 |
| $Nb_2O_5$ | 0.00 | 0.00 | 0.00 | 0.00 | 0.00 |
| $SnO_2$ | 0.07 | 0.07 | 0.07 | 0.07 | 0.07 |
| $ZrO_2$ | 0.00 | 0.00 | 0.00 | 0.00 | 0.00 |
| $MnO_2$ | 0.00 | 0.00 | 0.00 | 0.00 | 0.00 |
| $La_2O_3$ | 0.00 | 0.00 | 0.00 | 0.00 | 0.00 |
| F— | 0.00 | 0.00 | 0.00 | 0.00 | 0.00 |
| $CeO_2$ | 0.00 | 0.00 | 0.00 | 0.00 | 0.00 |
| [$R_2O$—$Al_2O_3$] | 0.00 | −0.20 | 0.75 | 0.55 | 0.38 |

Strain Pt (C.):
Anneal Pt (C.):
Softening Pt (C.):
CTE ($\times 10^{-7}$/C.):

TABLE I-continued

Table I: Precursor glass compositions.

| | | | |
|---|---|---|---|
| Density (g/cm^3): | | 2.432 | 2.427 |
| Poisson's Ratio: | | | |
| Shear Modulus (Mpsi): | | | |
| Young's Modulus (Mpsi): | | | |
| Refractive Index: | | | |
| Stress optic coefficient | | | |
| Fracture toughness (MPa/m1/2) | 1110 | 1125 | 1130 |
| Hardness (MPa) | | | |
| Liquidus temperature | | | |
| Fulcher_A | | | |
| Fulcher_B | | | |
| Fulcher_T0 | | | |

| | Example = ▶ | | | | |
|---|---|---|---|---|---|
| Oxide [mole %] | 36 | 37 | 38 | 39 | 40 |
| SiO$_2$ | 58.17 | 57.05 | 55.99 | 60.77 | 59.27 |
| Al$_2$O$_3$ | 15.76 | 15.47 | 15.18 | 15.94 | 15.94 |
| P$_2$O$_5$ | 5.76 | 7.54 | 9.26 | 4.98 | 6.48 |
| B$_2$O$_3$ | 0.00 | 0.00 | 0.00 | 0.00 | 0.00 |
| Li$_2$O | 0.00 | 0.00 | 0.00 | 0.00 | 0.00 |
| Na$_2$O | 15.47 | 15.18 | 14.90 | 16.23 | 16.24 |
| K$_2$O | 0.48 | 0.47 | 0.46 | 0.00 | 0.00 |
| MgO | 0.38 | 0.39 | 0.37 | 0.02 | 0.02 |
| CaO | 0.05 | 0.05 | 0.05 | 0.06 | 0.05 |
| ZnO | 0.00 | 0.00 | 0.00 | 0.00 | 0.00 |
| BaO | 0.00 | 0.00 | 0.00 | 0.00 | 0.00 |
| TiO$_2$ | 3.84 | 3.77 | 3.71 | 2.00 | 1.99 |
| TeO$_2$ | 0.00 | 0.00 | 0.00 | 0.00 | 0.00 |
| Nb$_2$O$_5$ | 0.00 | 0.00 | 0.00 | 0.00 | 0.00 |
| SnO$_2$ | 0.08 | 0.07 | 0.07 | 0.00 | 0.00 |
| ZrO$_2$ | 0.00 | 0.00 | 0.00 | 0.00 | 0.00 |
| MnO$_2$ | 0.00 | 0.00 | 0.00 | 0.00 | 0.00 |
| La$_2$O$_3$ | 0.00 | 0.00 | 0.00 | 0.00 | 0.00 |
| F— | 0.00 | 0.00 | 0.00 | 0.00 | 0.00 |
| CeO$_2$ | 0.00 | 0.00 | 0.00 | 0.00 | 0.00 |
| [R$_2$O—Al$_2$O$_3$] | 0.19 | 0.18 | 0.18 | 0.29 | 0.30 |
| Strain Pt (C.): | | | | 624 | 604 |
| Anneal Pt (C.): | | | | 683 | 661 |
| Softening Pt (C.): | | | | 963 | 946 |
| CTE (×10^−7/C.): | | | | 82.9 | 82.1 |
| Density (g/cm^3): | 2.436 | 2.428 | 2.422 | 2.417 | 2.413 |
| Poisson's Ratio: | | | | | |
| Shear Modulus (Mpsi): | | | | | |
| Young's Modulus (Mpsi): | | | | | |
| Refractive Index: | | | | | |
| Stress optic coefficient | | | | | |
| Fracture toughness (MPa/m1/2) | 1150 | 1140 | 1130 | | |
| Hardness (MPa) | | | | | |
| Liquidus temperature | | | | | |
| Fulcher_A | | | | | |
| Fulcher_B | | | | | |
| Fulcher_T0 | | | | | |

| | Example = ▶ | | | | |
|---|---|---|---|---|---|
| Oxide [mole %] | 41 | 42 | 43 | 44 | 45 |
| SiO$_2$ | 58.28 | 57.49 | 59.48 | 61.46 | 54.50 |
| Al$_2$O$_3$ | 15.94 | 15.86 | 14.88 | 13.88 | 18.16 |
| P$_2$O$_5$ | 6.47 | 6.45 | 6.44 | 6.44 | 7.27 |
| B$_2$O$_3$ | 0.00 | 0.00 | 0.00 | 0.00 | 0.00 |
| Li$_2$O | 0.00 | 0.00 | 0.00 | 0.00 | 0.00 |
| Na$_2$O | 16.24 | 16.16 | 15.16 | 14.17 | 18.17 |
| K$_2$O | 0.00 | 0.00 | 0.00 | 0.00 | 0.00 |
| MgO | 0.02 | 0.02 | 0.02 | 0.02 | 0.02 |
| CaO | 0.05 | 0.05 | 0.05 | 0.05 | 0.07 |
| ZnO | 0.00 | 0.00 | 0.00 | 0.00 | 0.00 |
| BaO | 0.00 | 0.00 | 0.00 | 0.00 | 0.00 |
| TiO$_2$ | 2.99 | 3.97 | 3.96 | 3.97 | 1.81 |
| TeO$_2$ | 0.00 | 0.00 | 0.00 | 0.00 | 0.00 |
| Nb$_2$O$_5$ | 0.00 | 0.00 | 0.00 | 0.00 | 0.00 |
| SnO$_2$ | 0.00 | 0.00 | 0.00 | 0.00 | 0.00 |
| ZrO$_2$ | 0.00 | 0.00 | 0.00 | 0.00 | 0.00 |
| MnO$_2$ | 0.00 | 0.00 | 0.00 | 0.00 | 0.00 |
| La$_2$O$_3$ | 0.00 | 0.00 | 0.00 | 0.00 | 0.00 |
| F— | 0.00 | 0.00 | 0.00 | 0.00 | 0.00 |

TABLE I-continued

Table I: Precursor glass compositions.

| | | | | | |
|---|---|---|---|---|---|
| CeO$_2$ | 0.00 | 0.00 | 0.00 | 0.00 | 0.00 |
| [R$_2$O—Al$_2$O$_3$] | 0.30 | 0.30 | 0.28 | 0.29 | 0.01 |
| Strain Pt (C.): | 599 | 594 | 592 | 592 | 598 |
| Anneal Pt (C.): | 652 | 644 | 643 | 643 | 654 |
| Softening Pt (C.): | 924 | 905 | 911 | 917 | 927 |
| CTE (×10^−7/C.): | 81.8 | 81.8 | 78.6 | 74.4 | 88 |
| Density (g/cm^3): | 2.422 | 2.433 | 2.423 | 2.413 | 2.427 |
| Poisson's Ratio: | | | | | |
| Shear Modulus (Mpsi): | | | | | |
| Young's Modulus (Mpsi): | | | | | |
| Refractive Index: | | | | | |
| Stress optic coefficient | | | | | |
| Fracture toughness (MPa/m1/2) | | | 1150 | | |
| Hardness (MPa) | | | | | |
| Liquidus temperature | | | | | |
| Fulcher_A | | | | | |
| Fulcher_B | | | | | |
| Fulcher_T0 | | | | | |

| | Example = ▶ | | | | |
|---|---|---|---|---|---|
| Oxide [mole %] | 46 | 47 | 48 | 49 | 50 |
| SiO$_2$ | 54.50 | 53.53 | 53.54 | 52.59 | 52.59 |
| Al$_2$O$_3$ | 18.17 | 17.84 | 17.85 | 17.52 | 17.53 |
| P$_2$O$_5$ | 7.27 | 7.13 | 7.13 | 7.01 | 7.01 |
| B$_2$O$_3$ | | | | | |
| Li$_2$O | | | | | |
| Na$_2$O | 13.62 | 17.84 | 13.38 | 17.53 | 13.15 |
| K$_2$O | 4.55 | 0.00 | 4.46 | 0.00 | 4.38 |
| MgO | 0.02 | 0.02 | 0.02 | 0.02 | 0.02 |
| CaO | 0.05 | 0.07 | 0.05 | 0.05 | 0.05 |
| ZnO | | | | | |
| BaO | | | | | |
| TiO$_2$ | 1.82 | 3.57 | 3.57 | 5.26 | 5.26 |
| TeO$_2$ | | | | | |
| Nb$_2$O$_5$ | | | | | |
| SnO$_2$ | | | | | |
| ZrO$_2$ | | | | | |
| MnO$_2$ | | | | | |
| La$_2$O$_3$ | | | | | |
| F— | | | | | |
| CeO$_2$ | | | | | |
| [R$_2$O—Al$_2$O$_3$] | 0.00 | 0.00 | −0.01 | 0.01 | 0.00 |
| Strain Pt (C.): | 591 | 593 | 584 | | |
| Anneal Pt (C.): | 647 | 643 | 635 | | |
| Softening Pt (C.): | 935 | 898 | 906 | | |
| CTE (×10^−7/C.): | 94.8 | 86.8 | 93.5 | | |
| Density (g/cm^3): | 2.428 | 2.442 | 2.441 | | |
| Poisson's Ratio: | | | | | |
| Shear Modulus (Mpsi): | | | | | |
| Young's Modulus (Mpsi): | | | | | |
| Refractive Index: | | | | | |
| Stress optic coefficient | | | | | |
| Fracture toughness (MPa/m1/2) | | | | | |
| Hardness (MPa) | | | | | |
| Liquidus temperature | | | | | |
| Fulcher_A | | | | | |
| Fulcher_B | | | | | |
| Fulcher_T0 | | | | | |

| | Example = ▶ | | | | |
|---|---|---|---|---|---|
| Oxide [mole %] | 51 | 52 | 53 | 54 | 55 |
| SiO$_2$ | 57.05 | 57.05 | 57.05 | 58.93 | 60.83 |
| Al$_2$O$_3$ | 14.62 | 14.85 | 15.09 | 14.15 | 13.21 |
| P$_2$O$_5$ | 7.54 | 7.55 | 7.54 | 7.54 | 7.54 |
| B$_2$O$_3$ | | | | | |
| Li$_2$O | | | | | |
| Na$_2$O | 16.03 | 15.79 | 15.56 | 14.61 | 13.67 |
| K$_2$O | 0.47 | 0.47 | 0.47 | 0.47 | 0.47 |
| MgO | 0.38 | 0.38 | 0.38 | 0.38 | 0.38 |
| CaO | 0.05 | 0.05 | 0.05 | 0.05 | 0.05 |
| ZnO | | | | | |
| BaO | | | | | |

TABLE I-continued

Table I: Precursor glass compositions.

| | | | | | |
|---|---|---|---|---|---|
| TiO$_2$ | 3.77 | 3.77 | 3.78 | 3.77 | 3.77 |
| TeO$_2$ | | | | | |
| Nb$_2$O$_5$ | | | | | |
| SnO$_2$ | 0.07 | 0.07 | 0.07 | 0.08 | 0.08 |
| ZrO$_2$ | | | | | |
| MnO$_2$ | | | | | |
| La$_2$O$_3$ | | | | | |
| F— | | | | | |
| CeO$_2$ | | | | | |
| [R$_2$O—Al$_2$O$_3$] | 1.88 | 1.41 | 0.94 | 0.93 | 0.93 |
| Strain Pt (C.): | 569 | 572 | 572 | 575 | 576 |
| Anneal Pt (C.): | 616 | 619 | 620 | 624 | 625 |
| Softening Pt (C.): | 861 | 863 | 871 | 881 | 879 |
| CTE (x10^-7/C.): | 85.6 | 84.4 | 82.7 | 79.9 | 76.3 |
| Density (g/cm^3): | | | | | |
| Poisson's Ratio: | | | | | |
| Shear Modulus (Mpsi): | | | | | |
| Young's Modulus (Mpsi): | | | | | |
| Refractive Index: | | | | | |
| Stress optic coefficient | | | | | |
| Fracture toughness (MPa/m1/2) | 1095 | 1120 | 1120 | 1115 | 1130 |
| Hardness (MPa) | | | | −4.898 | |
| Liquidus temperature | | | | 13266 | |
| Fulcher_A | | | | −187.7 | |
| Fulcher_B | | | | | |
| Fulcher_T0 | | | | | |

| | Example = ▶ | | | | |
|---|---|---|---|---|---|
| Oxide [mole %] | 56 | 57 | 58 | 59 | 60 |
| SiO$_2$ | 62.72 | 58.14 | 57.59 | 57.31 | 57.19 |
| Al$_2$O$_3$ | 12.26 | 15.38 | 15.23 | 15.16 | 15.12 |
| P$_2$O$_5$ | 7.54 | 7.69 | 7.62 | 7.58 | 7.56 |
| B$_2$O$_3$ | | | | | |
| Li$_2$O | | | | | |
| Na$_2$O | 12.72 | 15.86 | 15.71 | 15.63 | 15.61 |
| K$_2$O | 0.47 | 0.48 | 0.48 | 0.48 | 0.47 |
| MgO | 0.38 | 0.38 | 0.38 | 0.38 | 0.38 |
| CaO | 0.05 | 0.05 | 0.05 | 0.05 | 0.05 |
| ZnO | | | | | |
| BaO | | | | | |
| TiO$_2$ | 3.78 | 1.93 | 2.86 | 3.32 | 3.54 |
| TeO$_2$ | | | | | |
| Nb$_2$O$_5$ | | | | | |
| SnO$_2$ | 0.08 | 0.08 | 0.08 | 0.08 | 0.07 |
| ZrO$_2$ | | | | | |
| MnO$_2$ | | | | | |
| La$_2$O$_3$ | | | | | |
| F— | | | | | |
| CeO$_2$ | | | | | |
| [R$_2$O—Al$_2$O$_3$] | 0.93 | 0.96 | 0.96 | 0.95 | 0.96 |
| Strain Pt (C.): | 585 | | | | |
| Anneal Pt (C.): | 638 | | | | |
| Softening Pt (C.): | 889 | | | | |
| CTE (x10^-7/C.): | 72 | | | | |
| Density (g/cm^3): | | | | | |
| Poisson's Ratio: | | | | | |
| Shear Modulus (Mpsi): | | | | | |
| Young's Modulus (Mpsi): | | | | | |
| Refractive Index: | | | | | |
| Stress optic coefficient | | | | | |
| Fracture toughness (MPa/m1/2) | 1140 | 980 | 1090 | 1110 | |
| Hardness (MPa) | −3.265 | −3.697 | −4.622 | | |
| Liquidus temperature | 9524 | 9888 | 12340.5 | | |
| Fulcher_A | 27.3 | 30.5 | −134.4 | | |
| Fulcher_B | | | | | |
| Fulcher_T0 | | | | | |

| | Example = ▶ | | | | |
|---|---|---|---|---|---|
| Oxide [mole %] | 61 | 62 | 63 | 64 | 65 |
| SiO$_2$ | 57.54 | 56.46 | 61.48 | 59.99 | 58.85 |
| Al$_2$O$_3$ | 15.22 | 14.94 | 13.88 | 14.51 | 15.19 |
| P$_2$O$_5$ | 7.61 | 7.46 | 6.45 | 6.77 | 6.65 |
| B$_2$O$_3$ | | | | | |
| Li$_2$O | | | | | |

TABLE I-continued

Table I: Precursor glass compositions.

| | | | | | |
|---|---|---|---|---|---|
| Na₂O | 15.69 | 15.39 | 14.19 | 13.85 | 13.57 |
| K₂O | 0.48 | 0.47 | 0.00 | 0.00 | 0.00 |
| MgO | 0.00 | 1.87 | 0.00 | 0.97 | 1.91 |
| CaO | 0.05 | 0.07 | 0.03 | 0.03 | 0.03 |
| ZnO | | | 0.00 | 0.00 | 0.00 |
| BaO | | | | | |
| TiO₂ | 3.33 | 3.27 | 3.97 | 3.88 | 3.80 |
| TeO₂ | | | | | |
| Nb₂O₅ | | | | | |
| SnO₂ | 0.08 | 0.07 | | | |
| ZrO₂ | | | | | |
| MnO₂ | | | | | |
| La₂O₃ | | | | | |
| F— | | | | | |
| CeO₂ | | | | | |
| [R₂O—Al₂O₃] | 0.95 | 0.92 | 0.31 | −0.66 | −1.62 |
| Strain Pt (C.): | | | | | |
| Anneal Pt (C.): | | | | | |
| Softening Pt (C.): | | | | | |
| CTE (×10^−7/C.): | | | | | |
| Density (g/cm^3): | | | | | |
| Poisson's Ratio: | | | | | |
| Shear Modulus (Mpsi): | | | | | |
| Young's Modulus (Mpsi): | | | | | |
| Refractive Index: | | 1.5 | 1.5 | 1.5 | 1.5 |
| Stress optic coefficient | | 33.57 | 33.43 | 33.46 | |
| Fracture toughness (MPa/m1/2) | | | | | |
| Hardness (MPa) | | | | | |
| Liquidus temperature | | | | | |
| Fulcher_A | | | | | |
| Fulcher_B | | | | | |
| Fulcher_T0 | | | | | |

| | Example = ▶ | | | | |
|---|---|---|---|---|---|
| Oxide [mole %] | 66 | 67 | 68 | 69 | 70 |
| SiO₂ | 58.86 | 58.87 | 60.01 | 56.36 | 57.19 |
| Al₂O₃ | 15.18 | 15.19 | 14.52 | 15.51 | 15.22 |
| P₂O₅ | 6.65 | 6.65 | 6.78 | 7.71 | 7.56 |
| B₂O₃ | | | | | |
| Li₂O | | | | | |
| Na₂O | 13.58 | 13.58 | 13.84 | 15.80 | 15.50 |
| K₂O | 0.00 | 0.00 | 0.00 | 0.48 | 0.47 |
| MgO | 0.96 | 0.00 | 0.00 | 0.39 | 0.38 |
| CaO | 0.03 | 0.01 | 0.01 | 0.06 | 0.06 |
| ZnO | 0.95 | 1.90 | 0.97 | | |
| BaO | | | | | |
| TiO₂ | 3.79 | 3.80 | 3.87 | 3.61 | 3.54 |
| TeO₂ | | | | | |
| Nb₂O₅ | | | | | |
| SnO₂ | | | | 0.08 | 0.08 |
| ZrO₂ | | | | | |
| MnO₂ | | | | | |
| La₂O₃ | | | | | |
| F— | | | | | |
| CeO₂ | | | | | |
| [R₂O—Al₂O₃] | −1.60 | −1.61 | −0.68 | 0.77 | 0.75 |
| Strain Pt (C.): | | | 571 | 572 | 576 |
| Anneal Pt (C.): | | | 618 | 621 | 623 |
| Softening Pt (C.): | | | 866 | 864 | 876 |
| CTE (×10^−7/C.): | | | 82.3 | 82.9 | 81.1 |
| Density (g/cm^3): | | | 2.433 | 2.43 | 2.428 |
| Poisson's Ratio: | | | | | |
| Shear Modulus (Mpsi): | | | | | |
| Young's Modulus (Mpsi): | | | | | |
| Refractive Index: | 1.5 | 1.5 | | | |
| Stress optic coefficient | 34.28 | 34.1 | | | |
| Fracture toughness (MPa/m1/2) | | | 1130 | 1130 | 1120 |
| Hardness (MPa) | | | −3.015 | −3.079 | −3.095 |
| Liquidus temperature | | | 8087.3 | 8366.6 | 8407.1 |
| Fulcher_A | | | 120.9 | 95.8 | 101.8 |
| Fulcher_B | | | | | |
| Fulcher_T0 | | | | | |

TABLE I-continued

Table I: Precursor glass compositions.

| Oxide [mole %] | Example 71 | 72 | 73 | 74 | 75 |
|---|---|---|---|---|---|
| $SiO_2$ | 57.59 | 57.98 | 57.19 | 57.19 | 57.19 |
| $Al_2O_3$ | 15.08 | 14.94 | 15.22 | 15.22 | 15.22 |
| $P_2O_5$ | 7.49 | 7.42 | 7.56 | 7.56 | 7.56 |
| $B_2O_3$ | | | | | |
| $Li_2O$ | | | | | |
| $Na_2O$ | 15.36 | 15.21 | 15.97 | 14.08 | 15.50 |
| $K_2O$ | 0.47 | 0.46 | 0.00 | 1.89 | 0.47 |
| MgO | 0.37 | 0.37 | 0.38 | 0.38 | 0.38 |
| CaO | 0.06 | 0.06 | 0.06 | 0.05 | 0.06 |
| ZnO | | | | | |
| BaO | | | | | |
| $TiO_2$ | 3.51 | 3.48 | 3.54 | 3.54 | 3.07 |
| $TeO_2$ | | | | | |
| $Nb_2O_5$ | | | | | |
| $SnO_2$ | 0.07 | 0.07 | 0.08 | 0.08 | 0.08 |
| $ZrO_2$ | | | | | 0.47 |
| $MnO_2$ | | | | | 0.00 |
| $La_2O_3$ | | | | | |
| F— | | | | | |
| $CeO_2$ | | | | | |
| [$R_2O-Al_2O_3$] | 0.75 | 0.73 | 0.75 | 0.75 | 0.75 |
| Strain Pt (C.): | 574 | 576 | 570 | 585 | 594 |
| Anneal Pt (C.): | 623 | 625 | 620 | 634 | 647 |
| Softening Pt (C.): | 880 | 879 | 869 | 887 | 905 |
| CTE (×10^-7/C.): | 81.2 | 81.5 | 86 | 82.4 | 82.9 |
| Density (g/cm^3): | 2.424 | 2.43 | 2.428 | 2.437 | 2.442 |
| Poisson's Ratio: | | | | | |
| Shear Modulus (Mpsi): | | | | | |
| Young's Modulus (Mpsi): | | | | | |
| Refractive Index: | | | | | |
| Stress optic coefficient | | | | | |
| Fracture toughness (MPa/m1/2) | 1120 | 1120 | 1110 | | |
| Hardness (MPa) | −3.476 | −3.27 | −3.318 | | |
| Liquidus temperature | 9332.5 | 8742.7 | 8971.7 | | |
| Fulcher_A | 48.3 | 78.3 | 68 | | |
| Fulcher_B | | | | | |
| Fulcher_T0 | | | | | |

| Oxide [mole %] | Example 76 | 77 | 78 | 79 | 80 |
|---|---|---|---|---|---|
| $SiO_2$ | 57.19 | 57.19 | 56.92 | 57.19 | 57.19 |
| $Al_2O_3$ | 15.22 | 15.22 | 15.15 | 15.22 | 15.22 |
| $P_2O_5$ | 7.56 | 7.56 | 7.53 | 7.56 | 7.56 |
| $B_2O_3$ | | | | | |
| $Li_2O$ | | | | | |
| $Na_2O$ | 15.50 | 15.50 | 15.43 | 15.50 | 15.50 |
| $K_2O$ | 0.47 | 0.47 | 0.47 | 0.47 | 0.47 |
| MgO | 0.38 | 0.38 | 0.38 | 0.38 | 0.38 |
| CaO | 0.06 | 0.06 | 0.06 | 0.06 | 0.06 |
| ZnO | | | | | |
| BaO | | | | | |
| $TiO_2$ | 2.60 | 3.07 | 2.59 | 3.45 | 2.60 |
| $TeO_2$ | | | | | |
| $Nb_2O_5$ | | | | | |
| $SnO_2$ | 0.08 | 0.55 | 1.49 | 0.08 | 0.08 |
| $ZrO_2$ | 0.95 | 0.00 | 0.00 | 0.00 | 0.00 |
| $MnO_2$ | 0.00 | 0.00 | 0.00 | 0.09 | 0.95 |
| $La_2O_3$ | | | | | |
| F— | | | | | |
| $CeO_2$ | | | | | |
| [$R_2O-Al_2O_3$] | 0.75 | 0.75 | 0.75 | 0.75 | 0.75 |
| Strain Pt (C.): | 586 | 593 | 576 | 572 | |
| Anneal Pt (C.): | 636 | 643 | 625 | 622 | |
| Softening Pt (C.): | 896 | 893 | 878 | 880 | |
| CTE (×10^-7/C.): | 82.8 | 81.3 | 82.1 | 82.8 | |
| Density (g/cm^3): | 2.441 | 2.465 | 2.432 | 2.436 | |
| Poisson's Ratio: | | | | | |
| Shear Modulus (Mpsi): | | | | | |
| Young's Modulus (Mpsi): | | | | | |
| Refractive Index: | | | | | |
| Stress optic coefficient | | | | | |
| Fracture toughness (MPa/m1/2) | | | | | |

TABLE I-continued

Table I: Precursor glass compositions.

Hardness (MPa)
Liquidus temperature
Fulcher_A
Fulcher_B
Fulcher_T0

| Oxide [mole %] | Example = ▶ | | | | |
| --- | --- | --- | --- | --- | --- |
|  | 81 | 82 | 83 | 84 | 85 |
| $SiO_2$ | 63.46 | 61.47 | 60.48 | 63.46 | 61.47 |
| $Al_2O_3$ | 12.89 | 13.39 | 13.88 | 11.90 | 12.89 |
| $P_2O_5$ | 6.44 | 6.44 | 6.44 | 6.44 | 6.44 |
| $B_2O_3$ | | | | | |
| $Li_2O$ | | | | | |
| $Na_2O$ | 13.18 | 13.68 | 14.18 | 12.19 | 13.18 |
| $K_2O$ | 0.00 | 0.00 | 0.00 | 0.00 | 0.00 |
| MgO | 0.00 | 0.00 | 0.00 | 0.00 | 1.98 |
| CaO | 0.05 | 0.05 | 0.05 | 0.05 | 0.06 |
| ZnO | 0.00 | 0.00 | 0.00 | 0.00 | 0.00 |
| BaO | | | | | |
| $TiO_2$ | 3.97 | 4.96 | 4.96 | 5.95 | 3.97 |
| $TeO_2$ | | | | | |
| $Nb_2O_5$ | | | | | |
| $SnO_2$ | | | | | |
| $ZrO_2$ | | | | | |
| $MnO_2$ | | | | | |
| $La_2O_3$ | | | | | |
| F— | | | | | |
| $CeO_2$ | | | | | |
| [$R_2O$—$Al_2O_3$] | 0.29 | 0.29 | 0.30 | 0.29 | 0.29 |

Strain Pt (C.):
Anneal Pt (C.):
Softening Pt (C.):
CTE (×10^−7/C.):
Density (g/cm^3):
Poisson's Ratio:
Shear Modulus (Mpsi):
Young's Modulus (Mpsi):
Refractive Index:
Stress optic coefficient
Fracture toughness (MPa/m1/2)
Hardness (MPa)
Liquidus temperature
Fulcher_A
Fulcher_B
Fulcher_T0

| Oxide [mole %] | Example = ▶ | | | | |
| --- | --- | --- | --- | --- | --- |
|  | 86 | 87 | 88 | 89 | 90 |
| $SiO_2$ | 61.48 | 60.47 | 60.47 | 60.49 | 60.49 |
| $Al_2O_3$ | 12.89 | 12.89 | 12.89 | 12.89 | 12.89 |
| $P_2O_5$ | 6.44 | 6.44 | 6.44 | 6.44 | 6.44 |
| $B_2O_3$ | | | | | |
| $Li_2O$ | | | | | |
| $Na_2O$ | 13.18 | 13.18 | 13.18 | 13.18 | 13.18 |
| $K_2O$ | 0.00 | 0.00 | 0.00 | 0.00 | 0.00 |
| MgO | 0.00 | 2.98 | 1.99 | 1.00 | 0.00 |
| CaO | 0.05 | 0.06 | 0.06 | 0.05 | 0.05 |
| ZnO | 1.99 | 0.00 | 0.99 | 1.98 | 2.97 |
| BaO | | | | | |
| $TiO_2$ | 3.97 | 3.96 | 3.97 | 3.96 | 3.97 |
| $TeO_2$ | | | | | |
| $Nb_2O_5$ | | | | | |
| $SnO_2$ | | | | | |
| $ZrO_2$ | | | | | |
| $MnO_2$ | | | | | |
| $La_2O_3$ | | | | | |
| F— | | | | | |
| $CeO_2$ | | | | | |
| [$R_2O$—$Al_2O_3$] | 0.29 | 0.29 | 0.29 | 0.29 | 0.29 |

Strain Pt (C.):
Anneal Pt (C.):
Softening Pt (C.):
CTE (×10^−7/C.):
Density (g/cm^3):

TABLE I-continued

Table I: Precursor glass compositions.

Poisson's Ratio:
Shear Modulus (Mpsi):
Young's Modulus (Mpsi):
Refractive Index:
Stress optic coefficient
Fracture toughness (MPa/m1/2)
Hardness (MPa)
Liquidus temperature
Fulcher_A
Fulcher_B
Fulcher_T0

| | Example = ▶ | | | | |
|---|---|---|---|---|---|
| Oxide [mole %] | 91 | 92 | 93 | 94 | 95 |
| $SiO_2$ | 59.47 | 59.48 | 59.48 | 59.50 | 59.49 |
| $Al_2O_3$ | 12.89 | 12.89 | 12.89 | 12.89 | 12.89 |
| $P_2O_5$ | 6.44 | 6.44 | 6.44 | 6.45 | 6.44 |
| $B_2O_3$ | | | | | |
| $Li_2O$ | | | | | |
| $Na_2O$ | 13.19 | 13.18 | 13.19 | 13.18 | 13.18 |
| $K_2O$ | 0.00 | 0.00 | 0.00 | 0.00 | 0.00 |
| MgO | 3.96 | 2.98 | 1.98 | 0.99 | 0.00 |
| CaO | 0.08 | 0.06 | 0.06 | 0.05 | 0.05 |
| ZnO | 0.00 | 0.99 | 1.99 | 2.97 | 3.97 |
| BaO | | | | | |
| $TiO_2$ | 3.97 | 3.97 | 3.97 | 3.97 | 3.97 |
| $TeO_2$ | | | | | |
| $Nb_2O_5$ | | | | | |
| $SnO_2$ | | | | | |
| $ZrO_2$ | | | | | |
| $MnO_2$ | | | | | |
| $La_2O_3$ | | | | | |
| F— | | | | | |
| $CeO_2$ | | | | | |
| $[R_2O-Al_2O_3]$ | 0.30 | 0.29 | 0.30 | 0.29 | 0.29 |

Strain Pt (C.):
Anneal Pt (C.):
Softening Pt (C.):
CTE (×10^−7/C.):
Density (g/cm^3):
Poisson's Ratio:
Shear Modulus (Mpsi):
Young's Modulus (Mpsi):
Refractive Index:
Stress optic coefficient
Fracture toughness (MPa/m1/2)
Hardness (MPa)
Liquidus temperature
Fulcher_A
Fulcher_B
Fulcher_T0

| | Example = ▶ | | | | |
|---|---|---|---|---|---|
| Oxide [mole %] | 96 | 97 | 98 | 99 | 100 |
| $SiO_2$ | 58.28 | 58.28 | 58.28 | 58.28 | 58.28 |
| $Al_2O_3$ | 13.95 | 13.95 | 13.95 | 13.95 | 13.95 |
| $P_2O_5$ | 6.47 | 6.47 | 6.47 | 6.47 | 6.47 |
| $B_2O_3$ | | | | | |
| $Li_2O$ | | | | | |
| $Na_2O$ | 14.24 | 14.24 | 14.24 | 14.24 | 14.24 |
| $K_2O$ | 0.00 | 0.00 | 0.00 | 0.00 | 0.00 |
| MgO | 1.00 | 1.00 | 1.00 | 0.99 | 1.00 |
| CaO | 0.05 | 0.05 | 0.05 | 0.05 | 0.05 |
| ZnO | 1.00 | 1.00 | 0.99 | 0.99 | 1.00 |
| BaO | | | | | |
| $TiO_2$ | 4.48 | 3.99 | 2.99 | 4.49 | 3.99 |
| $TeO_2$ | 0.00 | 0.00 | 0.00 | 0.50 | 1.00 |
| $Nb_2O_5$ | 0.50 | 1.00 | 1.99 | 0.00 | 0.00 |
| $SnO_2$ | | | | | |
| $ZrO_2$ | | | | | |
| $MnO_2$ | | | | | |
| $La_2O_3$ | | | | | |
| F— | | | | | |
| $CeO_2$ | | | | | |

TABLE I-continued

Table I: Precursor glass compositions.

| | | | | | |
|---|---|---|---|---|---|
| [$R_2O$—$Al_2O_3$] | 0.29 | 0.29 | 0.29 | 0.29 | 0.29 |
| Strain Pt (C.): | | | | | |
| Anneal Pt (C.): | | | | | |
| Softening Pt (C.): | | | | | |
| CTE (×10^−7/C.): | | | | | |
| Density (g/cm^3): | | | | | |
| Poisson's Ratio: | | | | | |
| Shear Modulus (Mpsi): | | | | | |
| Young's Modulus (Mpsi): | | | | | |
| Refractive Index: | | | | | |
| Stress optic coefficient | | | | | |
| Fracture toughness (MPa/m1/2) | | | | | |
| Hardness (MPa) | | | | | |
| Liquidus temperature | | | | | |
| Fulcher_A | | | | | |
| Fulcher_B | | | | | |
| Fulcher_T0 | | | | | |

| | Example = ▶ | | | | |
|---|---|---|---|---|---|
| Oxide [mole %] | 101 | 102 | 103 | 104 | 105 |
| $SiO_2$ | 58.27 | 57.87 | 57.73 | 57.59 | 56.78 |
| $Al_2O_3$ | 13.94 | 15.31 | 15.27 | 15.23 | 15.02 |
| $P_2O_5$ | 6.47 | 7.65 | 7.64 | 7.62 | 7.51 |
| $B_2O_3$ | | | | | |
| $Li_2O$ | | | | | |
| $Na_2O$ | 14.25 | 15.78 | 15.74 | 15.71 | 15.48 |
| $K_2O$ | 0.00 | 0.48 | 0.48 | 0.48 | 0.47 |
| MgO | 0.99 | 0.38 | 0.38 | 0.38 | 0.38 |
| CaO | 0.05 | 0.05 | 0.05 | 0.05 | 0.05 |
| ZnO | 1.00 | | | | |
| BaO | | | | | |
| $TiO_2$ | 2.99 | 2.40 | 2.63 | 2.86 | 4.23 |
| $TeO_2$ | 2.00 | | | | |
| $Nb_2O_5$ | 0.00 | | | | |
| $SnO_2$ | | 0.08 | 0.08 | 0.08 | 0.07 |
| $ZrO_2$ | | | | | |
| $MnO_2$ | | | | | |
| $La_2O_3$ | | | | | |
| F— | | | | | |
| $CeO_2$ | | | | | |
| [$R_2O$—$Al_2O_3$] | 0.31 | 0.95 | 0.95 | 0.96 | 0.93 |
| Strain Pt (C.): | | | | | |
| Anneal Pt (C.): | | | | | |
| Softening Pt (C.): | | | | | |
| CTE (×10^−7/C.): | | | | | |
| Density (g/cm^3): | | | | | |
| Poisson's Ratio: | | | | | |
| Shear Modulus (Mpsi): | | | | | |
| Young's Modulus (Mpsi): | | | | | |
| Refractive Index: | | | | | |
| Stress optic coefficient | | | | | |
| Fracture toughness (MPa/m1/2) | | | | | |
| Hardness (MPa) | | | | | |
| Liquidus temperature | | | | | |
| Fulcher_A | | | | | |
| Fulcher_B | | | | | |
| Fulcher_T0 | | | | | |

| | Example = ▶ | | | | |
|---|---|---|---|---|---|
| Oxide [mole %] | 106 | 107 | 108 | 109 | 110 |
| $SiO_2$ | 56.53 | 56.00 | 61.17 | 61.15 | 60.98 |
| $Al_2O_3$ | 14.95 | 14.81 | 13.55 | 13.17 | 12.56 |
| $P_2O_5$ | 7.47 | 7.41 | 6.29 | 6.11 | 5.83 |
| $B_2O_3$ | | | | | |
| $Li_2O$ | | | | | |
| $Na_2O$ | 15.41 | 15.27 | 14.04 | 13.93 | 13.90 |
| $K_2O$ | 0.47 | 0.46 | 0.10 | 0.24 | 0.45 |
| MgO | 0.37 | 0.37 | 0.00 | 0.00 | 0.00 |
| CaO | 0.05 | 0.05 | 0.30 | 0.70 | 1.34 |
| ZnO | | | 0.00 | 0.00 | 0.00 |
| BaO | | | 0.00 | 0.00 | 0.00 |
| $TiO_2$ | 4.67 | 5.56 | 4.36 | 4.24 | 4.04 |
| $TeO_2$ | | | | | |
| $Nb_2O_5$ | | | | | |

TABLE I-continued

| Table I: Precursor glass compositions. | | | | | |
|---|---|---|---|---|---|
| $SnO_2$ | 0.07 | 0.07 | | | |
| $ZrO_2$ | | | | | |
| $MnO_2$ | | | | | |
| $La_2O_3$ | | | | | |
| F— | | | 0.19 | 0.45 | 0.90 |
| $CeO_2$ | | | | | |
| [$R_2O—Al_2O_3$] | 0.93 | 0.92 | 0.59 | 1.00 | 1.79 |
| Strain Pt (C.): | | | | | |
| Anneal Pt (C.): | | | | | |
| Softening Pt (C.): | | | | | |
| CTE (×10^−7/C.): | | | | | |
| Density (g/cm^3): | | | | | |
| Poisson's Ratio: | | | | | |
| Shear Modulus (Mpsi): | | | | | |
| Young's Modulus (Mpsi): | | | | | |
| Refractive Index: | | | | | |
| Stress optic coefficient | | | | | |
| Fracture toughness (MPa/m1/2) | | | | | |
| Hardness (MPa) | | | | | |
| Liquidus temperature | | | | | |
| Fulcher_A | | | | | |
| Fulcher_B | | | | | |
| Fulcher_T0 | | | | | |

| | Example = ▶ | | | | |
|---|---|---|---|---|---|
| Oxide [mole %] | 111 | 112 | 113 | 114 | 115 |
| $SiO_2$ | 58.89 | 58.92 | 58.94 | 58.89 | 58.92 |
| $Al_2O_3$ | 14.44 | 14.05 | 13.68 | 14.44 | 14.06 |
| $P_2O_5$ | 6.52 | 6.35 | 6.18 | 6.53 | 6.34 |
| $B_2O_3$ | | | | | |
| $Li_2O$ | | | | | |
| $Na_2O$ | 13.51 | 13.41 | 13.33 | 13.51 | 13.41 |
| $K_2O$ | 0.09 | 0.23 | 0.36 | 0.09 | 0.22 |
| MgO | 1.86 | 1.81 | 1.77 | 0.00 | 0.00 |
| CaO | 0.28 | 0.68 | 1.06 | 0.29 | 0.68 |
| ZnO | 0.00 | 0.00 | 0.00 | 1.86 | 1.82 |
| BaO | 0.00 | 0.00 | 0.00 | 0.00 | 0.00 |
| $TiO_2$ | 4.20 | 4.08 | 3.97 | 4.20 | 4.08 |
| $TeO_2$ | | | | | |
| $Nb_2O_5$ | | | | | |
| $SnO_2$ | | | | | |
| $ZrO_2$ | | | | | |
| $MnO_2$ | | | | | |
| $La_2O_3$ | | | | | |
| F— | 0.19 | 0.45 | 0.71 | 0.19 | 0.46 |
| $CeO_2$ | | | | | |
| [$R_2O—Al_2O_3$] | −0.84 | −0.41 | 0.01 | −0.84 | −0.43 |
| Strain Pt (C.): | | | | | |
| Anneal Pt (C.): | | | | | |
| Softening Pt (C.): | | | | | |
| CTE (×10^−7/C.): | | | | | |
| Density (g/cm^3): | | | | | |
| Poisson's Ratio: | | | | | |
| Shear Modulus (Mpsi): | | | | | |
| Young's Modulus (Mpsi): | | | | | |
| Refractive Index: | | | | | |
| Stress optic coefficient | | | | | |
| Fracture toughness (MPa/m1/2) | | | | | |
| Hardness (MPa) | | | | | |
| Liquidus temperature | | | | | |
| Fulcher_A | | | | | |
| Fulcher_B | | | | | |
| Fulcher_T0 | | | | | |

| | Example = ▶ |
|---|---|
| Oxide [mole %] | 116 |
| $SiO_2$ | 58.96 |
| $Al_2O_3$ | 13.68 |
| $P_2O_5$ | 6.18 |
| $B_2O_3$ | |
| $Li_2O$ | |
| $Na_2O$ | 13.33 |
| $K_2O$ | 0.35 |
| MgO | 0.00 |
| CaO | 1.05 |

TABLE I-continued

Table I: Precursor glass compositions.

| | |
|---|---|
| ZnO | 1.76 |
| BaO | 0.00 |
| TiO$_2$ | 3.97 |
| TeO$_2$ | |
| Nb$_2$O$_5$ | |
| SnO$_2$ | |
| ZrO$_2$ | |
| MnO$_2$ | |
| La$_2$O$_3$ | |
| F— | 0.72 |
| CeO$_2$ | |
| [R$_2$O—Al$_2$O$_3$] | 0.00 |
| Strain Pt (C.): | |
| Anneal Pt (C.): | |
| Softening Pt (C.): | |
| CTE (×10^−7/C.): | |
| Density (g/cm^3): | |
| Poisson's Ratio: | |
| Shear Modulus (Mpsi): | |
| Young's Modulus (Mpsi): | |
| Refractive Index: | |
| Stress optic coefficient | |
| Fracture toughness (MPa/m1/2) | |
| Hardness (MPa) | |
| Liquidus temperature | |
| Fulcher_A | |
| Fulcher_B | |
| Fulcher_T0 | |

Example A: A patty each of the precursor glasses of Examples 3, 4, 5 and 44 was thermally treated as described above to form glass-ceramics. The glass-ceramics were then each ion exchanged in a bath including KNO$_3$, at a temperature of about 410° C. for a period of time until the DOL is about 50 μm. The CS and DOL measurements of each of these glass-ceramics are provided in Table II, according to methods otherwise described herein. For the glass-ceramics formed from the precursor glasses of Examples 3-5, SOC and RI of the glass precursors were utilized to determine CS and DOL of the glass-ceramic. For the glass-ceramic formed from the precursor glass of Example 44, testing was performed at 1550 nm wavelength and SOC and RI are assumed as 31.8 and 1.5, respectively.

TABLE II

CS and DOL data for glass-ceramics formed from the precursor glasses of Examples 3, 4, 5 and 44.

| | Glass-ceramic based on Example 3 | Glass-ceramic based on Example 4 | Glass-ceramic based on Example 5 | Glass-ceramic based on Example 44 |
|---|---|---|---|---|
| CS (MPa) | 1092.0 | 1093.1 | 1097.1 | 702 |
| DOL (μm) | 29.1 | 23.6 | 24.8 | 35 |
| IX time (h) | 2 | 2 | 2 | 1 |
| CS (MPa) | 1084.3 | 1080.0 | 1084.6 | 701 |
| DOL (μm) | 42.2 | 33.1 | 39.8 | 37 |
| IX time (h) | 4 | 4 | 4 | 2 |
| CS (MPa) | | 1050.2 | 1052.3 | 700 |
| DOL (μm) | | 47.5 | 57 | 42 |
| IX time (h) | 8 | 8 | 8 | 4 |

As shown in Table II, the glass-ceramic formed from the precursor glass of Example 44 achieved about the same DOL as the glass-ceramics based on Examples 3, 4, and 5, in half the time.

Figure 2:
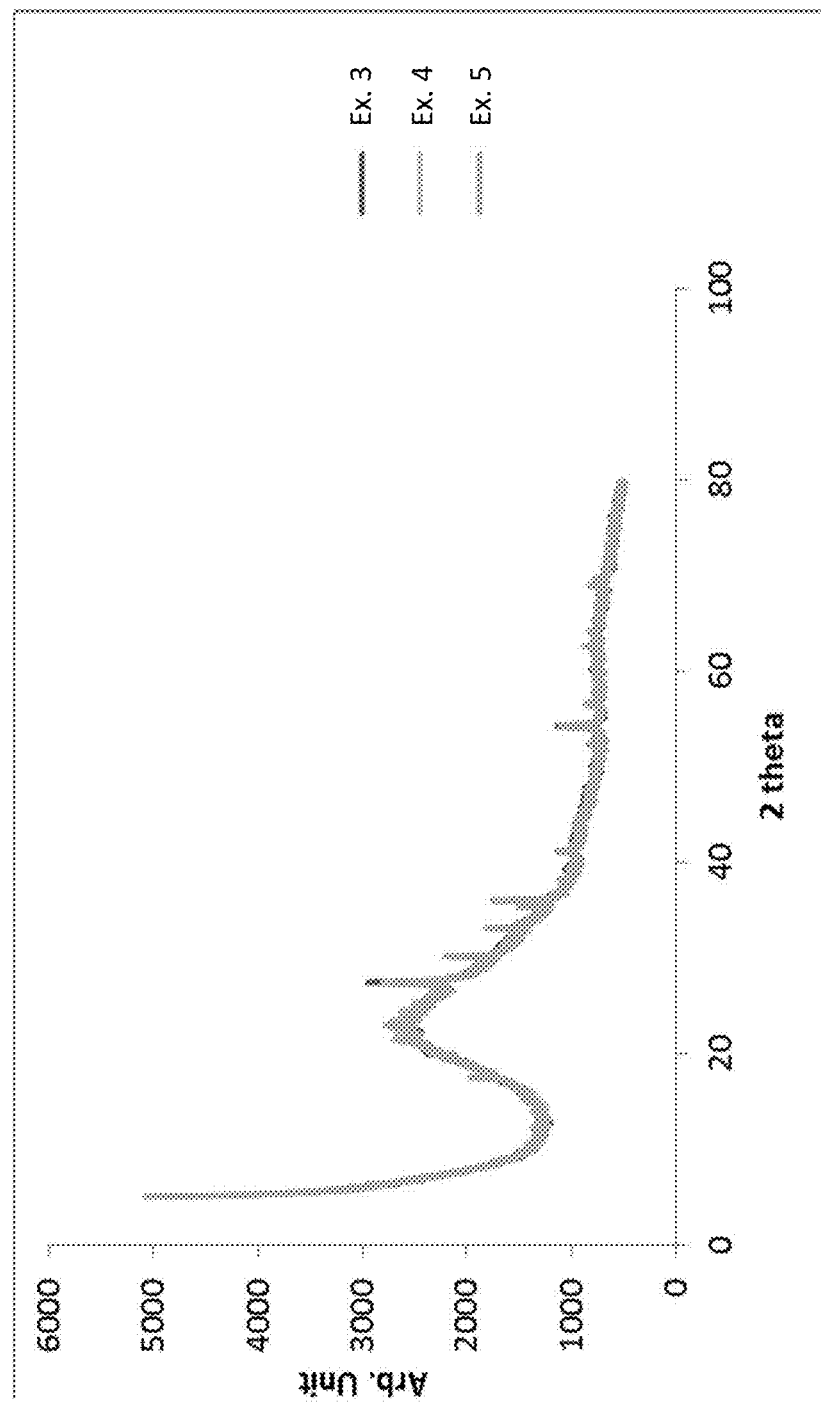
FIG. 2 shows a XRD pattern for glass-ceramics formed from Examples 3-5.
Figure 3:
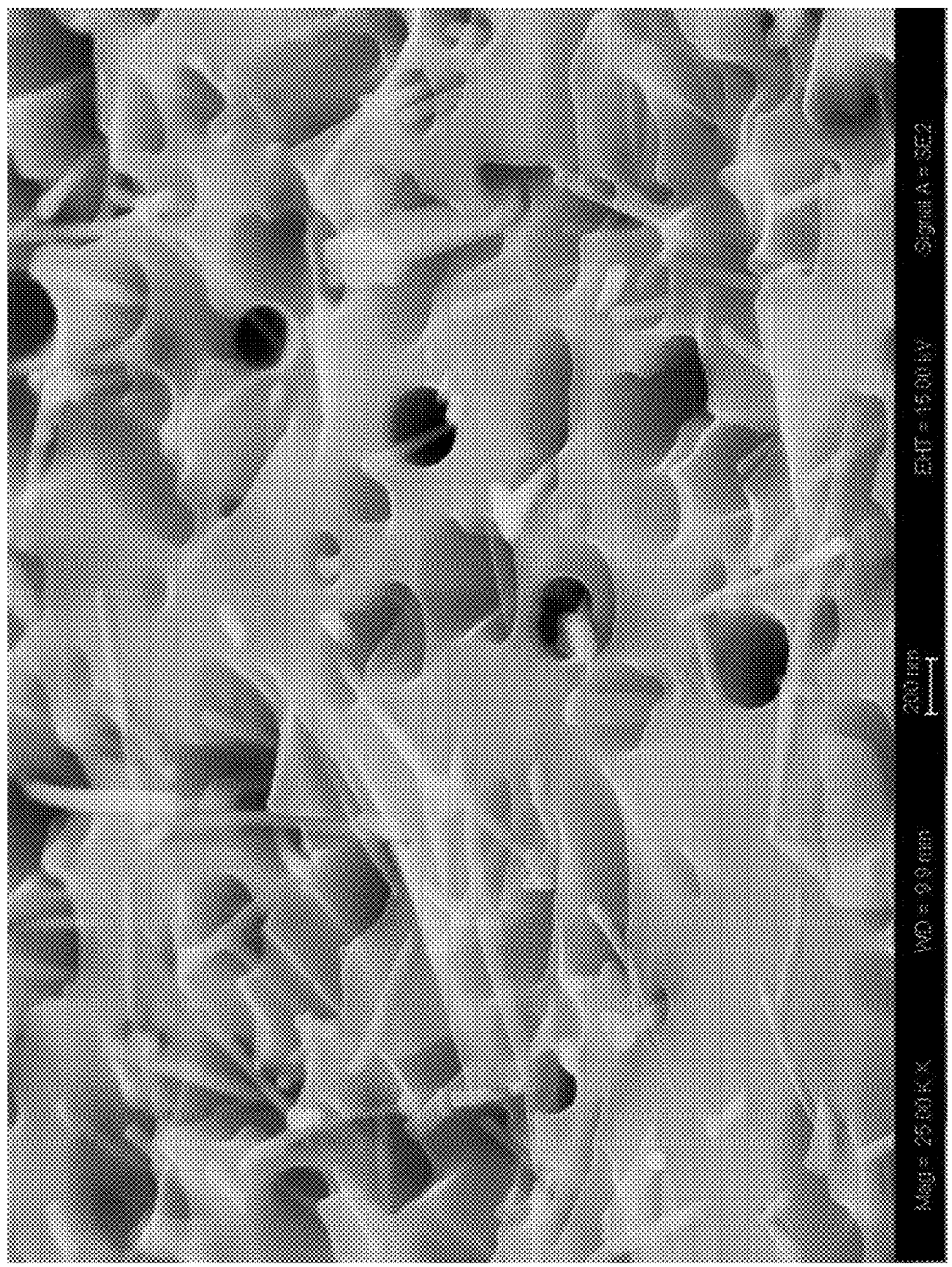
FIG. 3 shows a scanning electron microscope (SEM) backscattered electron image (BEI) micrograph of a glass-ceramics formed from Example 3.
Figure 4:
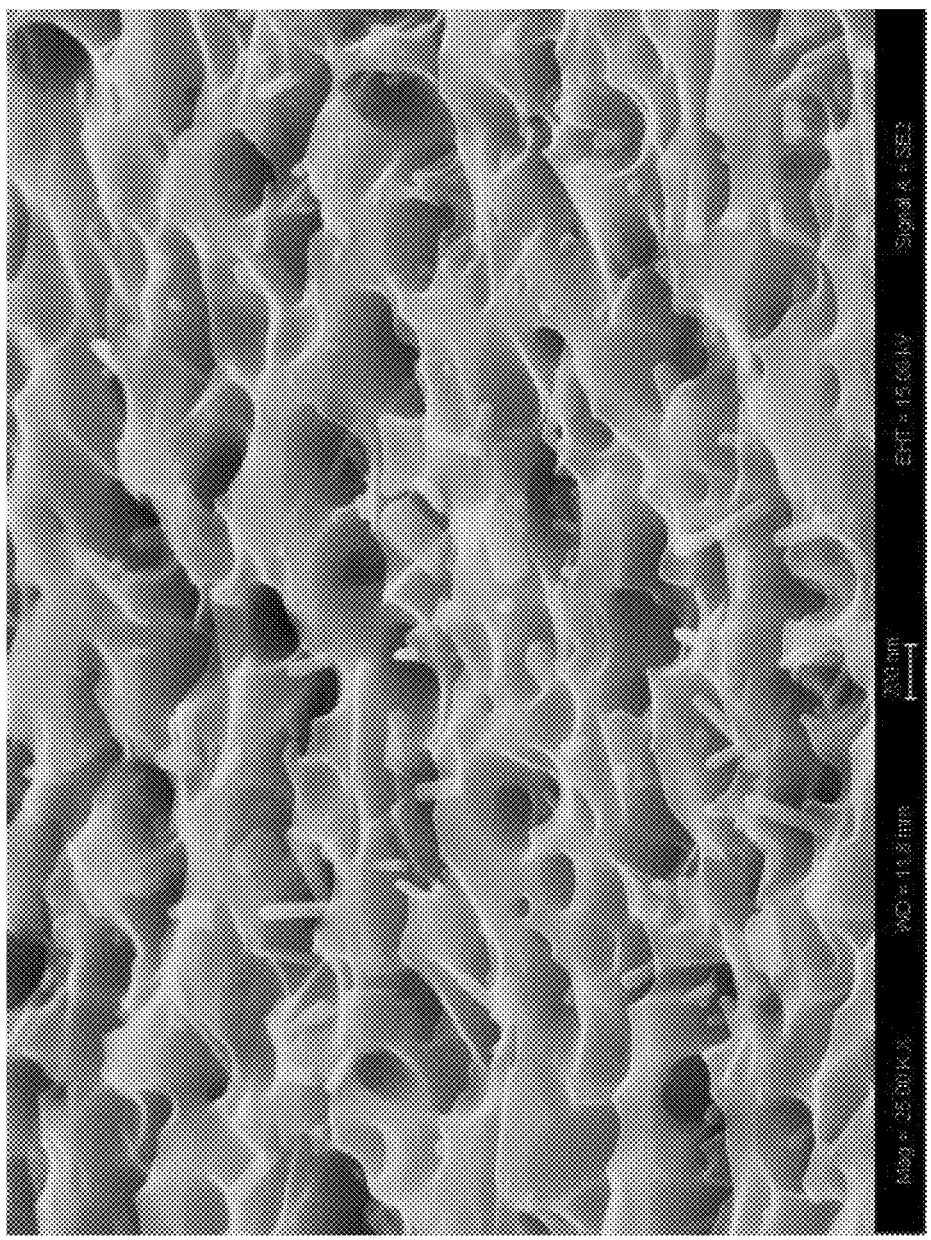
FIG. 4 shows a SEM micrograph (BEI) of a glass-ceramic formed from Example 4.
Figure 5:
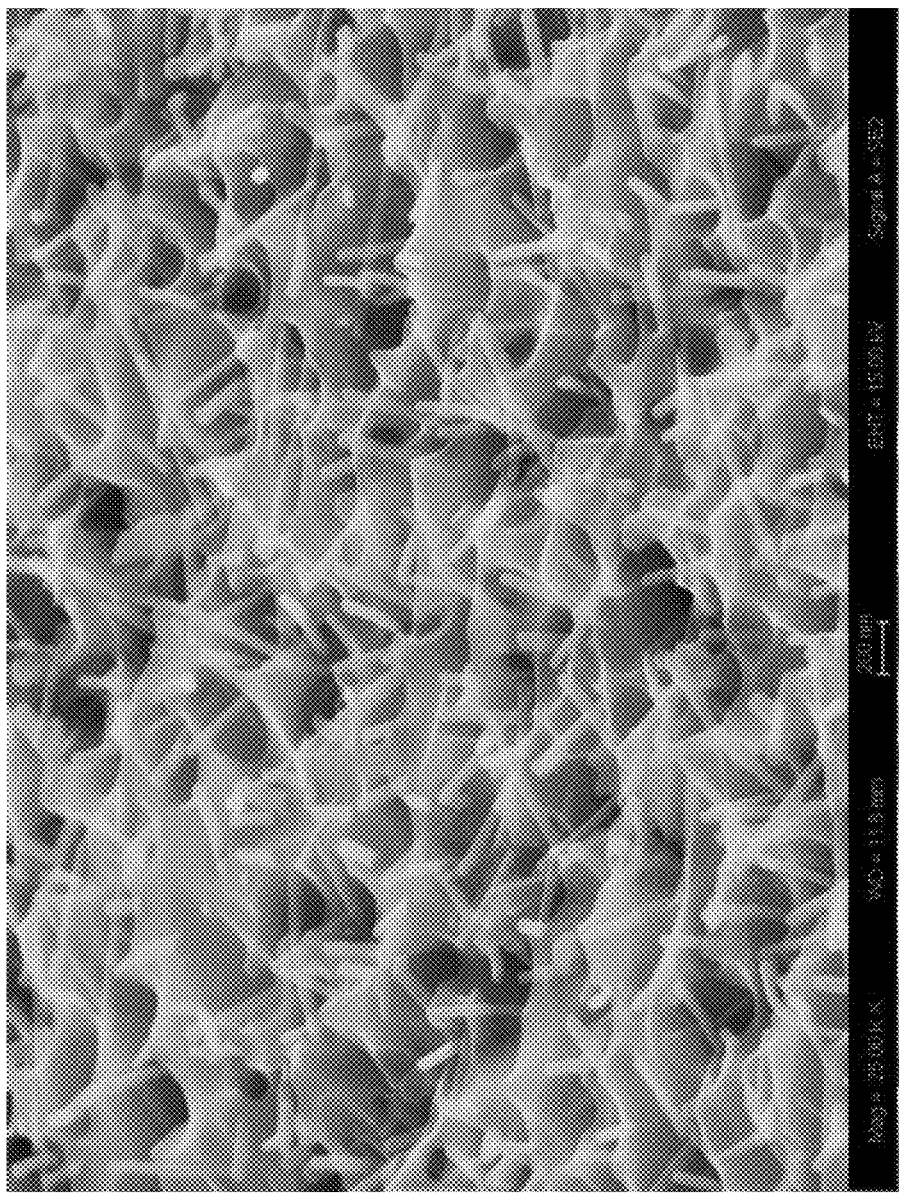
FIG. 5 shows a SEM micrograph (BEI) of one of a glass-ceramic formed from Example 5.

Example B: The glass-ceramics formed from the precursor glasses of Examples 3-5 were heat treated at close to softening point for about 20 hours. An XRD analysis was performed on the resulting glass-ceramics and an XRD pattern showing the results is shown in FIG. 2. The XRD pattern indicates that the glass-ceramics formed from the precursor glasses of Examples 3-5 have a predominant crystalline phase of rutile. FIGS. 3-5 show the SEM micrograph of the glass-ceramics formed from the precursor glasses of Examples 3, 4, and 5, respectively. The glass-ceramics were exposed to a 0.5% HF etchant for 30 seconds prior to being evaluated under the SEM and the SEM micrograph was taken at a magnitude of 25 kx with 60 degree tilt. The "needle-like" structures indicating a rutile crystalline phase are visible in FIGS. 3-5. The needle-like structures are enriched in titanium.

Figure 6:
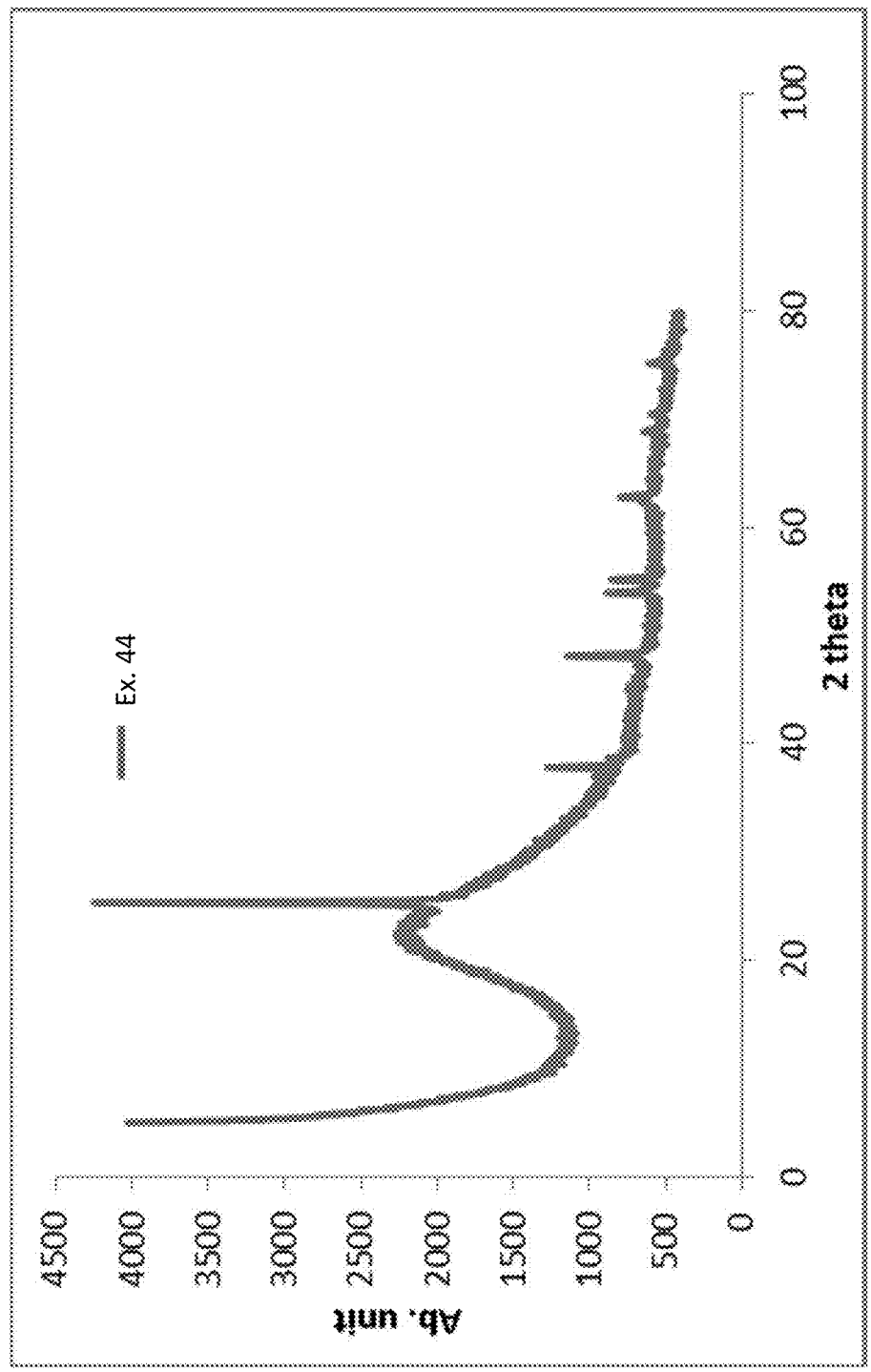
FIG. 6 shows a XRD pattern for a glass-ceramic formed from Example 44.
Figure 7:
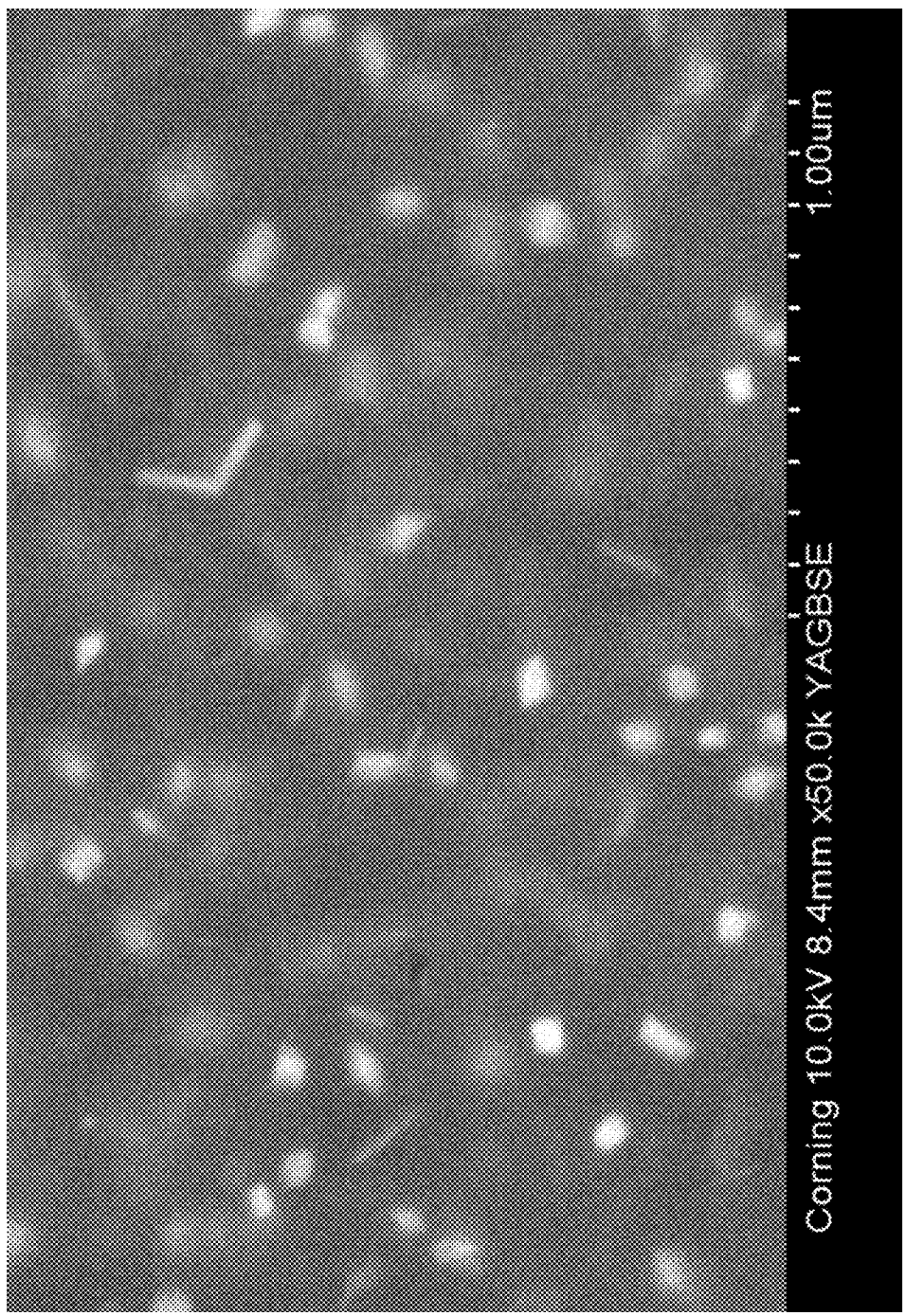
FIG. 7 shows a SEM micrograph (BEI) of the glass-ceramic shown in FIG. 6.

The glass-ceramic formed from the precursor glass of Example 44 was heat treated at 750° C. for 2 hours and then heat treated at 875° C. for 4 hours. The temperature was increased from 750° C. to 875° C. at a rate of about 5° C./minute. XRD analysis was performed on the resulting glass-ceramics; FIG. 6 shows the XRD pattern of the results. The XRD pattern indicates that the glass-ceramic formed from the precursor glass of Example 44 has a predominant crystalline phase of anatase. A SEM micrograph of the glass-ceramic formed from the precursor glass of Example 44 is shown in FIG. 7. The glass-ceramics were exposed to a 0.5% HF etchant for 30 seconds prior to being evaluated under the SEM and the SEM micrograph was taken at a magnitude of 25 kx with 60 degree tilt. The "needle-like" and bright structures indicating an anatase crystalline phase are visible in FIG. 6. The needle-like and bright structures are enriched in titanium.

Figure 8:
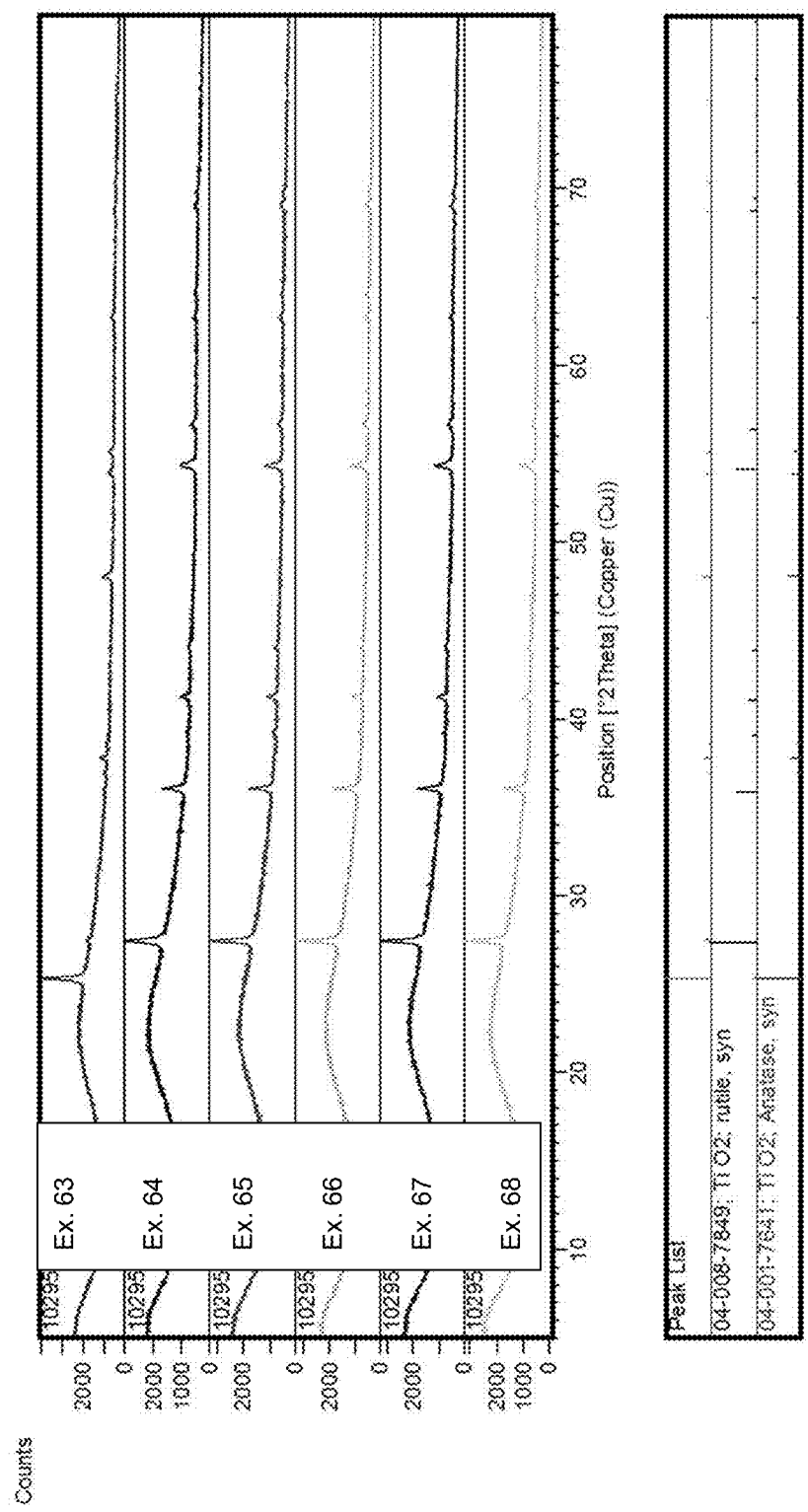
FIG. 8 shows a XRD pattern for glass-ceramics formed from Examples 63-68.

Example C: The glass-ceramics formed from the precursor glasses of Examples 63-68 were heat treated at 825° C. for 2 hours and then heat treated at 1000° C. for 4 hours. The temperature was increased from 825° C. to 1000° C. at a rate of about 5° C./minute. XRD analysis was performed on the resulting glass-ceramics; FIG. 8 shows the XRD pattern of the results. The XRD pattern indicates that the glass-ceramic formed from the precursor glass of Example 63 has a predominant crystalline phase of anatase and the glass-ceramics formed from the precursor glasses of Examples 64-68 have a predominant crystalline phase of rutile.

Figure 9:
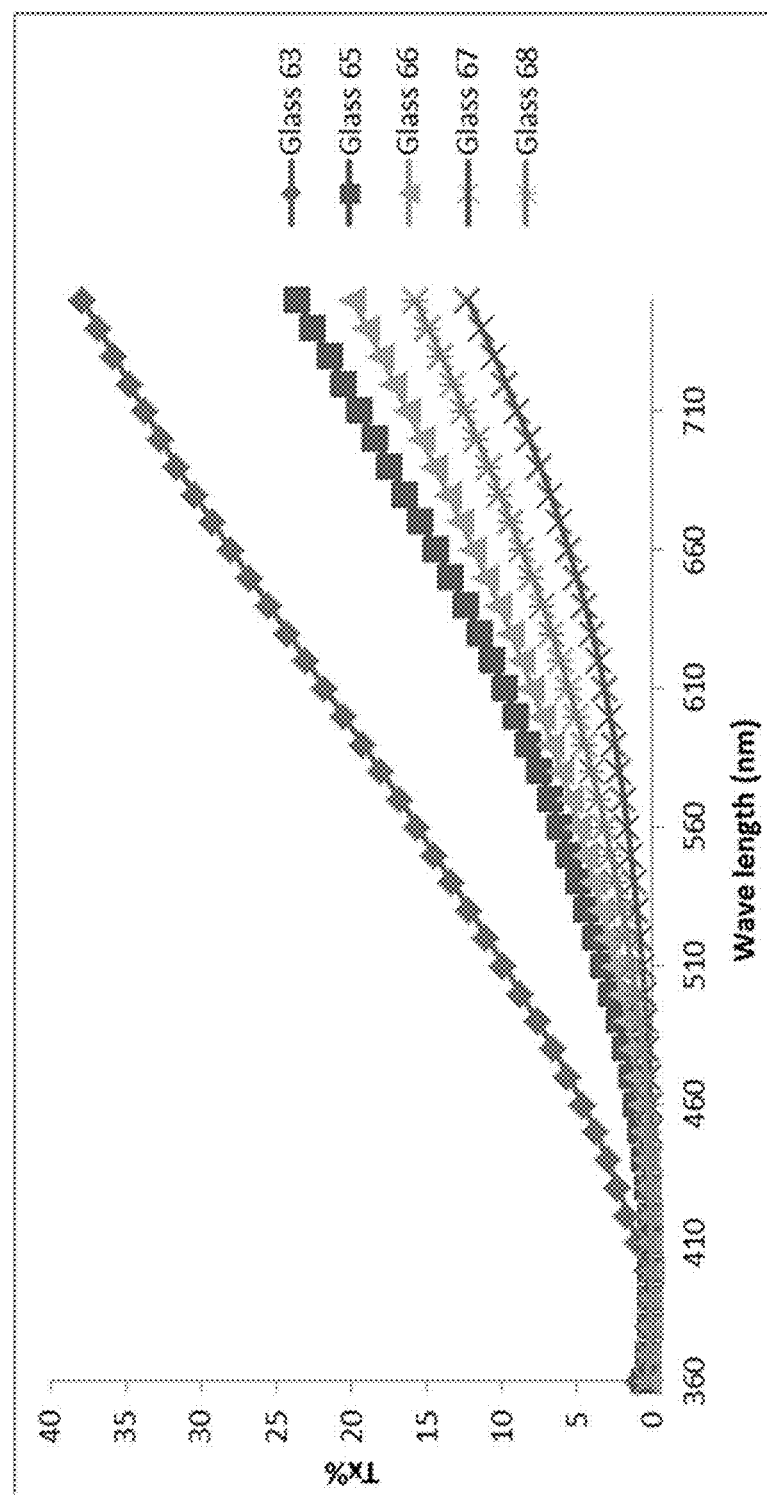
FIG. 9 shows a transmission spectra of glass-ceramics formed from Examples 63-68, and having a thickness of about 1.0 mm.

FIG. 9 shows a transmission spectrum of a glass-ceramic article formed from the precursor glass of Example 63, having a thickness of 1.0 mm after being heat treated at 750° C. for 2 hours followed by heat treatment at 875° C. for 4 hours. FIG. 9 also shows a transmission spectrum of glass-ceramic articles formed from the precursor glasses of Examples 65-68, having a thickness of 1.0 mm after being heat treated at 850° C. for 2 hours followed by heat treatment at 925° C. for 4 hours.

Figure 10:
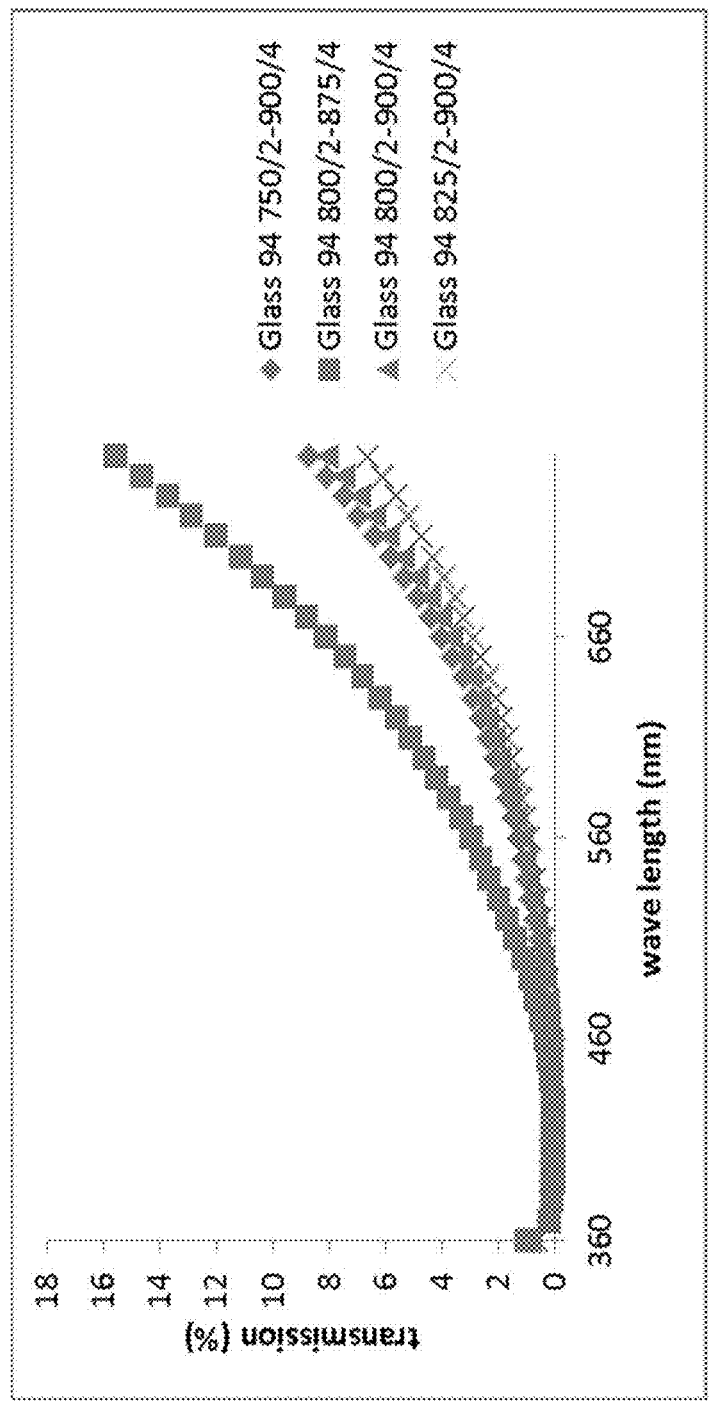
FIG. 10 is a graph comparing the transmission spectra of glass-ceramics formed from Example 94 and having a thickness of about 0.8 mm, after various heat treatments.

FIG. 10 shows a transmission spectrum of glass-ceramic articles formed from the precursor glass of Example 94, each having a thickness of 0.8 mm. Each of the glass-ceramic articles were formed by heat treating a glass article having a composition according to Example 94 as follows: 1) heat treatment at 750° C. for 2 hours, followed by heat treatment at 900° C. for 4 hours; 2) heat treatment at 800° C. for 2 hours, followed by heat treatment at 875° C. for 4 hours; 3) heat treatment at 800° C. for 2 hours, followed by heat treatment at 900° C. for 4 hours; and 4) heat treatment at 800° C. for 2 hours, followed by heat treatment at 925° C. for 4 hours.

Figure 11:
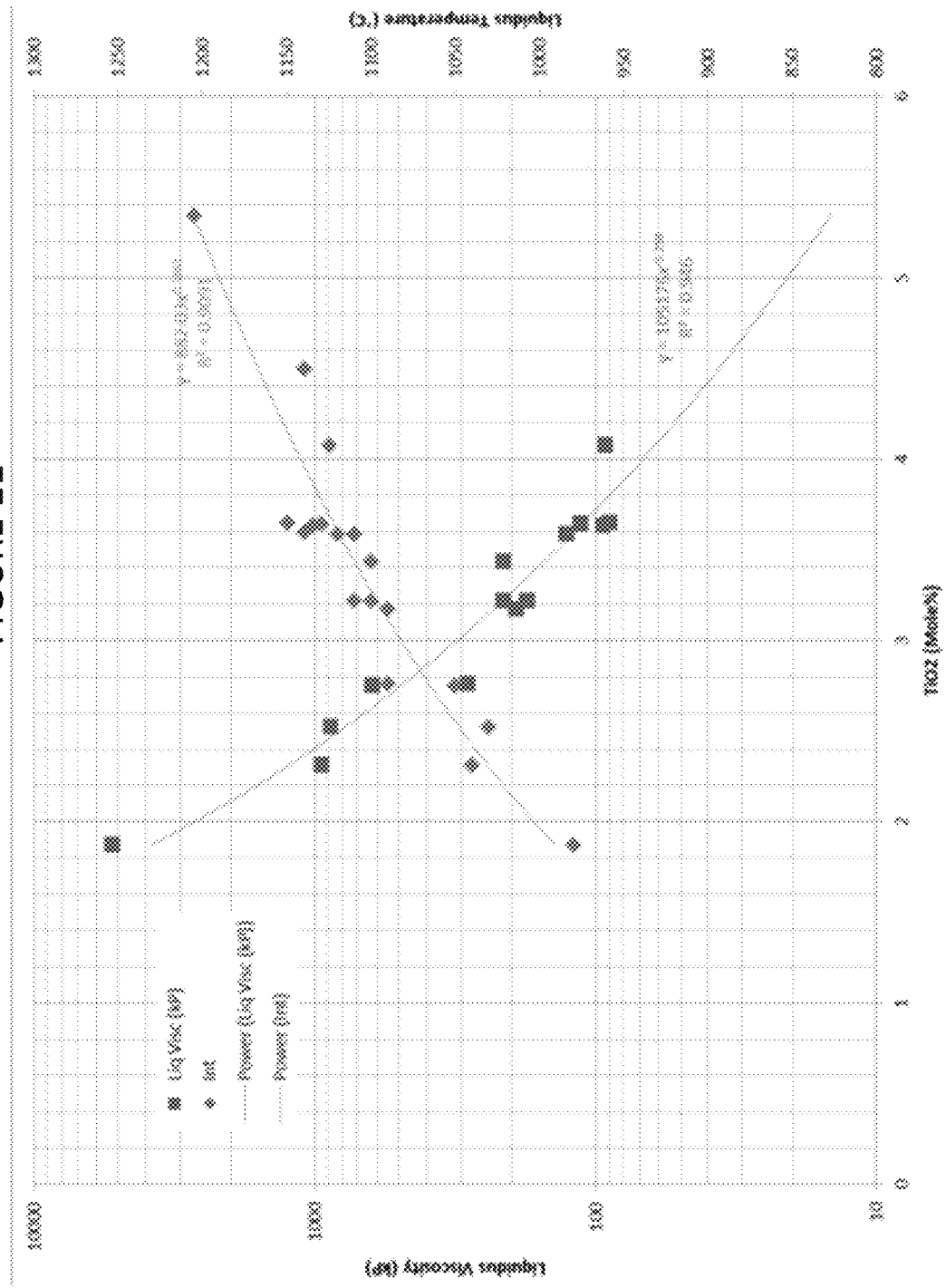
FIG. 11 shows a graph illustrating the relationship between $TiO_2$ content, liquidus viscosity and liquidus temperature, based on selected Examples from Table 1.

FIG. 11 shows a graph illustrating liquidus temperature and liquidus viscosity as a function of $TiO_2$ content, based on the Examples shown in Table I. The liquidus temperatures were measured by using the gradient boat method. Crushed glass was loaded into a platinum boat and held for 24 hours. The glass was then examined with an optical microscope and the highest temperature where crystals were observed was identified as the liquidus. The viscosity was measured as a function of temperature by the rotating cylinder method. This data was then used to calculate the viscosity at the liquidus temperature (liquidus viscosity). As shown in FIG. 11, liquidus viscosity decreases generally as $TiO_2$ content increases and liquidus temperature increases generally as $TiO_2$ content increases.

Figure 12:
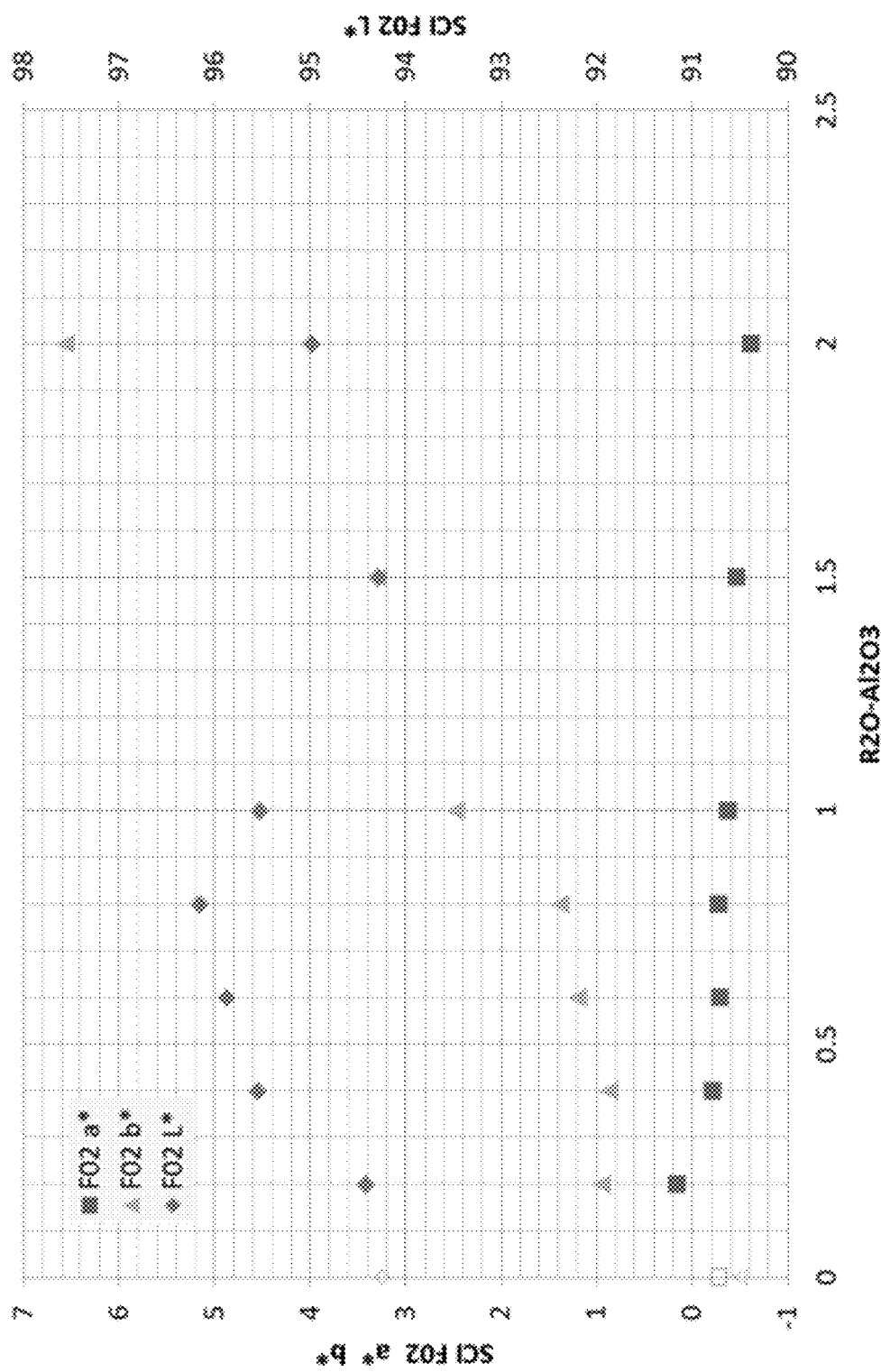
FIG. 12 shows a graph illustrating the variations in CIELAB color coordinates as a function of the compositional relationship ($R_2O—Al_2O_3$), based on selected Examples from Table 1.

FIG. 12 shows a graph illustrating the variation in CIELAB color coordinates as a function of the compositional relationship ($R_2O$—$Al_2O_3$), based on Examples shown in Table I. The graph shows that L* hits a maximum of 97 at, when $R_2O$—$Al_2O_3$=0.8. When the value of ($R_2O$—$Al_2O_3$) increases, b* starts to increase. Opacity for all samples was between 98% and 99% for 0.8 mm thick samples.

The grain sizes of the crystals in the glass-ceramics according to one or more embodiments can be evaluated by scanning electron microscope images of the glass-ceramics. For example, as shown in FIGS. 3-5, some of the rutile crystals shown have a length of about 1 μm or less, 400 nm or less or 200 nm or less. As also shown in FIGS. 3-5, some of the rutile crystals shown have a width of about 50 nm or less.

Example D: The color of glass-ceramic articles according to the Examples shown in Table I was analyzed. The color measured is presented in CIELAB color space coordinates, as shown in Table III, and was determined from specular reflectance measurements using a spectrophotometer, with illuminant D65.

TABLE III

Heat treatment conditions and SCI color measurements.

| | Example = ▶ | | | | |
|---|---|---|---|---|---|
| | 1 | 2 | 3 | 4 | 5 |
| Heat treatment 1 (Tn) (C.) | 700 | 700 | | | |
| Heat treatment 2 (Tc) (C.) | 850 | 850 | | | |
| Color L* | 92.1 | 84.01 | | | |
| Color a* | −0.11 | 0.07 | | | |
| Color b* | 3.31 | 8.29 | | | |
| Heat treatment 1 (Tn) (C.) | 700 | 700 | | | |
| Heat treatment 2 (Tc) (C.) | 875 | 875 | | | |
| Color L* | 93.87 | 83.35 | | | |
| Color a* | −0.45 | −0.09 | | | |
| Color b* | 1.46 | 0.68 | | | |

| | Example = ▶ | | | | |
|---|---|---|---|---|---|
| | 6 | 7 | 8 | 9 | 10 |
| Heat treatment 1 (Tn) (C.) | | 700 | 700 | 700 | 700 |
| Heat treatment 2 (Tc) (C.) | | 750 | 825 | 750 | 750 |
| Color L* | | 94.28 | 92.62 | 91.4 | 92.34 |
| Color a* | | −0.43 | −0.03 | −0.48 | −0.19 |

| | Example = ▶ | | | | |
|---|---|---|---|---|---|
| | 6 | 7 | 8 | 9 | 10 |
| Color b* | | 6.42 | 2.49 | 9.72 | 10.52 |
| Heat treatment 1 (Tn) (C.) | | 700 | 700 | 700 | 700 |
| Heat treatment 2 (Tc) (C.) | | 800 | 800 | 800 | 800 |
| Color L* | | 89.68 | 88.28 | 90.69 | 88.71 |
| Color a* | | −1.6 | 0.73 | −0.68 | −0.06 |
| Color b* | | 15.81 | 6.1 | 13.46 | 11.49 |
| Heat treatment 1 (Tn) (C.) | | 700 | 700 | 700 | 700 |
| Heat treatment 2 (Tc) (C.) | | 825 | 850 | 850 | 850 |
| Color L* | | 90.82 | 94.12 | 82.91 | 93.74 |
| Color a* | | 0.02 | −0.24 | 1.26 | −0.1 |
| Color b* | | 13.41 | 2.68 | 12.03 | 2.36 |

| | Example = ▶ | | | | |
|---|---|---|---|---|---|
| | 11 | 12 | 13 | 14 | 15 |
| Heat treatment 1 (Tn) (C.) | 700 | 700 | 700 | 700 | 700 |
| Heat treatment 2 (Tc) (C.) | 750 | 750 | 750 | 750 | 800 |
| Color L* | 93.53 | 87.1 | 92.44 | 90.84 | 93.82 |
| Color a* | −0.27 | 0.11 | −0.16 | −0.07 | −0.22 |
| Color b* | 7.99 | 11.07 | 11.29 | 12.72 | 7.38 |
| Heat treatment 1 (Tn) (C.) | 700 | 700 | 700 | 700 | 700 |
| Heat treatment 2 (Tc) (C.) | 800 | 800 | 800 | 800 | 850 |
| Color L* | 90.37 | 91.51 | 88.87 | 88.12 | 93.12 |
| Color a* | 0.82 | −0.05 | 0.05 | 0.82 | −0.94 |
| Color b* | 8.97 | 1.39 | 11.62 | 10.65 | 2.08 |
| Heat treatment 1 (Tn) (C.) | 700 | 700 | 700 | 700 | |
| Heat treatment 2 (Tc) (C.) | 850 | 850 | 850 | 850 | |
| Color L* | 92.3 | 94.96 | 93.69 | 91.75 | |
| Color a* | 0.97 | −0.34 | −0.25 | 1.22 | |
| Color b* | 7.23 | 1.46 | 2.41 | 5.48 | |

TABLE III-continued

Heat treatment conditions and SCI color measurements.

| | Example 16 | Example 17 | Example 18 | Example 19 | Example 20 |
|---|---|---|---|---|---|
| Heat treatment 1 (Tn) (C.) | 700 | 700 | 700 | 700 | 700 |
| Heat treatment 2 (Tc) (C.) | 800 | 800 | 800 | 800 | 800 |
| Color L* | 92.46 | 95.14 | 89.68 | 87.3 | 90.93 |
| Color a* | 0.48 | −0.59 | 0.12 | 0.58 | 0.23 |
| Color b* | 3.49 | 3.12 | 1.37 | 16.07 | 0.76 |
| Heat treatment 1 (Tn) (C.) | 700 | 700 | 700 | 700 | 700 |
| Heat treatment 2 (Tc) (C.) | 850 | 850 | 850 | 850 | 850 |
| Color L* | 92.35 | 94.97 | 94.12 | 79.89 | 93.37 |
| Color a* | −0.71 | −0.58 | 0.39 | 0.44 | 0.02 |
| Color b* | 2.08 | 3.7 | 1.93 | −3.84 | 2.27 |

| | Example 21 | Example 22 | Example 23 | Example 24 | Example 25 |
|---|---|---|---|---|---|
| Heat treatment 1 (Tn) (C.) | 700 | 700 | 700 | 700 | 700 |
| Heat treatment 2 (Tc) (C.) | 825 | 825 | 825 | 825 | 825 |
| Color L* | 89.89 | 92.83 | 88.18 | 93.01 | 87.94 |
| Color a* | −0.42 | 0.37 | 0.71 | 0.3 | 0.32 |
| Color b* | 7.63 | 1.72 | 16.67 | 1.66 | 13.15 |
| Heat treatment 1 (Tn) (C.) | 700 | 700 | 700 | 700 | 700 |
| Heat treatment 2 (Tc) (C.) | 800 | 800 | 800 | 800 | 800 |
| Color L* | 88.54 | 89.08 | 92.22 | 88.55 | 88.16 |
| Color a* | 0.13 | 0.21 | −0.19 | −0.04 | 0.8 |
| Color b* | 8.57 | 1.57 | 12.27 | 0.74 | 14.34 |
| Heat treatment 1 (Tn) (C.) | 700 | 700 | 700 | 700 | 700 |
| Heat treatment 2 (Tc) (C.) | 850 | 850 | 850 | 850 | 850 |
| Color L* | 93 | 93.72 | 84.68 | 93.54 | 85.57 |
| Color a* | −0.74 | 0.51 | 1.41 | 0.37 | 0.52 |
| Color b* | 9.93 | 1.82 | 8.14 | 1.68 | 11.41 |
| Heat treatment 1 (Tn) (C.) | 700 | 700 | 700 | 700 | 700 |
| Heat treatment 2 (Tc) (C.) | 875 | 875 | 875 | 875 | 875 |
| Color L* | 91.98 | 93.98 | 87.26 | 95.1 | 87.7 |
| Color a* | −0.48 | 0.5 | −0.36 | 0.14 | 0.78 |
| Color b* | 11.01 | 2.61 | −2.91 | 1.54 | 2.98 |

| | Example 26 | Example 27 | Example 28 | Example 29 | Example 30 |
|---|---|---|---|---|---|
| Heat treatment 1 (Tn) (C.) | 700 | 700 | 700 | 700 | 700 |
| Heat treatment 2 (Tc) (C.) | 825 | 825 | 825 | 825 | 825 |
| Color L* | 89.65 | 93.99 | 93.57 | 91.38 | 92.18 |
| Color a* | 1.03 | −0.39 | −0.14 | 0.77 | −0.44 |
| Color b* | 4.35 | 0.61 | 0.93 | 3.07 | 0.68 |
| Heat treatment 1 (Tn) (C.) | 700 | 700 | 700 | 700 | 700 |
| Heat treatment 2 (Tc) (C.) | 800 | 850 | 850 | 850 | 850 |
| Color L* | 89.23 | 95.01 | 94.42 | 91.86 | 94.96 |
| Color a* | 0.97 | −0.38 | −0.15 | 0.75 | −0.55 |
| Color b* | 4.13 | 1.26 | 1.43 | 3.65 | 0.88 |
| Heat treatment 1 (Tn) (C.) | 700 | 700 | 700 | 700 | 700 |
| Heat treatment 2 (Tc) (C.) | 850 | 875 | 875 | 875 | 875 |
| Color L* | 88.9 | 95.45 | 94.66 | 91.61 | 96.6 |
| Color a* | 1.01 | −0.39 | −0.17 | 0.56 | −0.16 |
| Color b* | 3.94 | 1.33 | 1.39 | 2.42 | 1.44 |
| Heat treatment 1 (Tn) (C.) | 700 | | | | |
| Heat treatment 2 (Tc) (C.) | 875 | | | | |
| Color L* | 90.08 | | | | |
| Color a* | 0.3 | | | | |
| Color b* | 1.6 | | | | |

| | Example 31 | Example 32 | Example 33 | Example 34 | Example 35 |
|---|---|---|---|---|---|
| Heat treatment 1 (Tn) (C.) | 700 | 700 | 700 | 700 | 700 |
| Heat treatment 2 (Tc) (C.) | 825 | 825 | 850 | 850 | 850 |
| Color L* | 91.92 | 91.71 | 96.11 | 95.83 | 95.52 |
| Color a* | −0.02 | 0.46 | −0.39 | −0.42 | −0.3 |
| Color b* | 0.47 | 1.44 | 1.2 | 1.02 | 0.74 |
| Heat treatment 1 (Tn) (C.) | 700 | 700 | 700 | 700 | 700 |
| Heat treatment 2 (Tc) (C.) | 850 | 850 | 875 | 875 | 875 |
| Color L* | 94.72 | 93.96 | 96.86 | 96.64 | 96.33 |
| Color a* | 0.2 | 0.66 | −0.1 | −0.1 | −0.05 |
| Color b* | 0.82 | 1.84 | 1.8 | 1.83 | 1.38 |
| Heat treatment 1 (Tn) (C.) | 700 | 700 | 700 | 700 | 700 |
| Heat treatment 2 (Tc) (C.) | 875 | 875 | 875 | 875 | 875 |
| Color L* | 95.51 | 94.19 | 96.95 | 96.86 | 96.92 |
| Color a* | 0.17 | 0.69 | −0.17 | −0.17 | −0.18 |
| Color b* | 1.11 | 1.82 | 2.03 | 1.92 | 1.85 |
| Heat treatment 1 (Tn) (C.) | — | — | — | | |
| Heat treatment 2 (Tc) (C.) | | | 875 | 875 | 875 |
| Color L* | | | 96.7 | | 96.93 |

| | Example 31 | Example 32 | Example 33 | Example 34 | Example 35 |
|---|---|---|---|---|---|
| Color a* | | | −0.23 | | −0.14 |
| Color b* | | | 2.19 | | 1.97 |
| Heat treatment 1 (Tn) (C.) | | | 700 | 700 | 700 |
| Heat treatment 2 (Tc) (C.) | | | 850 | 850 | 850 |
| Color L* | | | 94.07 | 94.04 | 93.72 |
| Color a* | | | −0.98 | −0.9 | −0.99 |
| Color b* | | | 0.5 | 0.02 | −0.12 |
| Heat treatment 1 (Tn) (C.) | | | — | — | — |
| Heat treatment 2 (Tc) (C.) | | | 875 | 875 | 875 |
| Color L* | | | 96.92 | 96.87 | 96.91 |
| Color a* | | | −0.17 | −0.2 | −0.21 |
| Color b* | | | 2.05 | 1.9 | 1.87 |
| Heat treatment 1 (Tn) (C.) | | | 700 | 700 | 700 |
| Heat treatment 2 (Tc) (C.) | | | 850 | 850 | 850 |
| Color L* | | | 95.97 | 95.86 | 95.46 |
| Color a* | | | −0.44 | −0.42 | −0.37 |
| Color b* | | | 1.23 | 1.01 | 0.73 |
| Heat treatment 1 (Tn) (C.) | | | | 700 | 700 |
| Heat treatment 2 (Tc) (C.) | | | | 875 | 875 |
| Color L* | | | | 96.65 | 96.34 |
| Color a* | | | | −0.14 | −0.09 |
| Color b* | | | | 1.85 | 1.39 |

TABLE III-continued

Heat treatment conditions and SCI color measurements.

| | Example = ▶ | | | | |
|---|---|---|---|---|---|
| | 36 | 37 | 38 | 39 | 40 |
| Heat treatment 1 (Tn) (C.) | 700 | 700 | 700 | | |
| Heat treatment 2 (Tc) (C.) | 850 | 850 | 850 | | |
| Color L* | 87.9 | 94.35 | 92.12 | | |
| Color a* | 0.97 | 0.24 | 0.15 | | |
| Color b* | 13.66 | 0.79 | 9.98 | | |
| Heat treatment 1 (Tn) (C.) | 700 | 700 | 700 | | |
| Heat treatment 2 (Tc) (C.) | 875 | 875 | 875 | | |
| Color L* | 86.85 | 95.21 | 91.95 | | |
| Color a* | 0.51 | 0.35 | 0.24 | | |
| Color b* | 10.17 | 1.47 | 11.26 | | |
| Heat treatment 1 (Tn) (C.) | 700 | 700 | 700 | | |
| Heat treatment 2 (Tc) (C.) | 875 | 875 | 875 | | |
| Color L* | 85.95 | 96.44 | 92.94 | | |
| Color a* | 0.82 | −0.13 | 0.09 | | |
| Color b* | 10.09 | 1.42 | 9.81 | | |
| Heat treatment 1 (Tn) (C.) | — | — | — | | |
| Heat treatment 2 (Tc) (C.) | 875 | 875 | 875 | | |
| Color L* | 73.79 | 96.67 | 93.1 | | |
| Color a* | 1.06 | −0.04 | −0.22 | | |
| Color b* | −2.68 | 1.77 | 8.6 | | |
| Heat treatment 1 (Tn) (C.) | 700 | 700 | 700 | | |
| Heat treatment 2 (Tc) (C.) | 850 | 850 | 850 | | |
| Color L* | 74.01 | 93.9 | | | |
| Color a* | 8 | −0.59 | | | |
| Color b* | 18.03 | 0 | | | |

| | Example = ▶ | | | | |
|---|---|---|---|---|---|
| | 41 | 42 | 43 | 44 | 45 |
| Heat treatment 1 (Tn) (C.) | 700 | 700 | 700 | 750 | |
| Heat treatment 2 (Tc) (C.) | 850 | 850 | 850 | 875 | |
| Color L* | 87.9 | 94.35 | 92.12 | 93.76 | |
| Color a* | 0.97 | 0.24 | 0.15 | 0.23 | |
| Color b* | 13.66 | 0.79 | 9.98 | 1.36 | |
| Heat treatment 1 (Tn) (C.) | 700 | 700 | 700 | 750 | |
| Heat treatment 2 (Tc) (C.) | 875 | 875 | 875 | 865 | |
| Color L* | 86.85 | 95.21 | 91.95 | 94.84 | |
| Color a* | 0.51 | 0.35 | 0.24 | 0.29 | |
| Color b* | 10.17 | 1.47 | 11.26 | 1.02 | |
| Heat treatment step 1 | 700 | 700 | 700 | 800/30 m | |
| Heat treatment step 2 | 875 | 875 | 875 | 925/2 h | |
| Color L* | 85.95 | 96.44 | 92.94 | 94.37 | |
| Color a* | 0.82 | −0.13 | 0.09 | −0.02 | |
| Color b* | 10.09 | 1.42 | 9.81 | 1.26 | |

| | Example = ▶ | | | | |
|---|---|---|---|---|---|
| | 51 | 52 | 53 | 54 | 55 |
| Heat treatment 1 (Tn) (C.) | 0 | 0 | 0 | 0 | 0 |
| Heat treatment 2 (Tc) (C.) | 900 | 900 | 900 | 900 | 900 |
| Color L* | 95.81 | 96.05 | 96.03 | 94.38 | |
| Color a* | −0.49 | −0.48 | −0.44 | −0.63 | |
| Color b* | 5.56 | 4.41 | 3.61 | 3.99 | |
| Heat treatment 1 (Tn) (C.) | 700 | 700 | 700 | 700 | 700 |
| Heat treatment 2 (Tc) (C.) | 900 | 900 | 900 | 900 | 900 |
| Color L* | 95.15 | 96.55 | 96.81 | 94.92 | |
| Color a* | −0.76 | −0.32 | −0.22 | −0.59 | |
| Color b* | 6.71 | 3.98 | 3.25 | 4.46 | |
| Heat treatment 1 (Tn) (C.) | 0 | 0 | 0 | 0 | 0 |
| Heat treatment 2 (Tc) (C.) | 875 | 875 | 875 | 875 | 875 |
| Color L* | 95.01 | 94.42 | 95.45 | 93.65 | 93.88 |
| Color a* | −0.83 | −0.6 | −0.53 | −0.65 | −0.05 |
| Color b* | 5.75 | 3.26 | 2.52 | 2.53 | 6.7 |
| Heat treatment 1 (Tn) (C.) | 700 | 700 | 700 | 700 | 700 |
| Heat treatment 2 (Tc) (C.) | 875 | 875 | 875 | 875 | 875 |
| Color L* | 94.96 | 94.85 | 96.06 | 94.4 | 94.34 |
| Color a* | −0.83 | −0.62 | −0.44 | −0.59 | −0.36 |
| Color b* | 6.03 | 3.26 | 2.28 | 2.66 | 6.71 |
| Heat treatment 1 (Tn) (C.) | 700 | 700 | 700 | 700 | 700 |
| Heat treatment 2 (Tc) (C.) | 850 | 850 | 850 | 850 | 850 |
| Color L* | 94.74 | 94.18 | 95.43 | 94.07 | 93.53 |
| Color a* | −0.83 | −0.65 | −0.52 | −0.7 | 0.09 |
| Color b* | 5.84 | 2.9 | 2.17 | 2.21 | 7.66 |
| Heat treatment 1 (Tn) (C.) | 700 | 700 | 700 | 700 | 700 |
| Heat treatment 2 (Tc) (C.) | 825 | 825 | 825 | 825 | 825 |
| Color L* | 94.17 | 93.15 | 92.78 | 91.01 | 91.34 |
| Color a* | −0.49 | −0.84 | −0.86 | −0.95 | 0.91 |
| Color b* | 6.01 | 3.26 | 1.23 | 2.49 | 8.43 |

| | Example = ▶ | | | | |
|---|---|---|---|---|---|
| | 56 | 57 | 58 | 59 | 60 |
| Heat treatment 1 (Tn) (C.) | 0 | 0 | 0 | 0 | 0 |
| Heat treatment 2 (Tc) (C.) | 900 | 900 | 900 | 900 | 900 |
| Color L* | 94.8 | 94.12 | 94.72 | 95.27 | 95.14 |
| Color a* | −0.69 | −1.34 | −0.63 | −0.73 | −0.49 |
| Color b* | 6.29 | 10.5 | 8.01 | 7.27 | 4.54 |
| Heat treatment 1 (Tn) (C.) | 700 | 700 | 700 | 700 | 700 |
| Heat treatment 2 (Tc) (C.) | 900 | 900 | 900 | 900 | 900 |
| Color L* | 92.91 | 94.4 | 94.31 | 95.41 | 95.73 |
| Color a* | −0.05 | −1.24 | −0.75 | −0.61 | −0.42 |
| Color b* | 9.24 | 9.93 | 9.76 | 6.56 | 4.75 |
| Heat treatment 1 (Tn) (C.) | 0 | 0 | 0 | 0 | 0 |
| Heat treatment 2 (Tc) (C.) | 875 | 875 | 875 | 875 | 875 |
| Color L* | 90.35 | 93.53 | 93.72 | 94.83 | 94.45 |
| Color a* | 1.37 | −1.22 | −0.32 | −0.53 | −0.49 |
| Color b* | 9.69 | 8.5 | 9.87 | 7.7 | 3.99 |
| Heat treatment 1 (Tn) (C.) | 700 | 700 | 700 | 700 | 700 |
| Heat treatment 2 (Tc) (C.) | 875 | 875 | 875 | 875 | 875 |
| Color L* | 90.92 | 94.55 | 95.29 | 95.21 | 94.43 |
| Color a* | 0.93 | −0.36 | −0.38 | −0.31 | −0.52 |
| Color b* | 8.98 | 8.48 | 6.77 | 6.62 | 3.89 |
| Heat treatment 1 (Tn) (C.) | 700 | 700 | 700 | 700 | 700 |
| Heat treatment 2 (Tc) (C.) | 850 | 850 | 850 | 850 | 850 |
| Color L* | 89.9 | 93.1 | 94.21 | 94.4 | 93.57 |
| Color a* | 1.44 | −1.27 | −0.66 | −0.22 | −0.69 |
| Color b* | 10.89 | 7.01 | 9.07 | 8.26 | 3.93 |
| Heat treatment 1 (Tn) (C.) | 700 | 700 | 700 | 700 | 700 |
| Heat treatment 2 (Tc) (C.) | 825 | 825 | 825 | 825 | 825 |
| Color L* | 87.39 | 91.2 | 92.98 | 93.45 | 91.71 |

TABLE III-continued

Heat treatment conditions and SCI color measurements.

| | | | | | |
|---|---|---|---|---|---|
| Color a* | 1.3 | −1.7 | −0.36 | −0.04 | −0.63 |
| Color b* | 12.88 | 5.03 | 8.47 | 7.29 | 3.77 |

| | Example = ▶ | | | | |
|---|---|---|---|---|---|
| | 61 | 62 | 63 | 64 | 65 |
| Heat treatment 1 (Tn) (C.) | 0 | 0 | 750 | | 850 |
| Heat treatment 2 (Tc) (C.) | 900 | 900 | 875 | | 925 |
| Color L* | 95.36 | 92.95 | 94.83 | | 91.79 |
| Color a* | −0.49 | −0.15 | 0.09 | | −1.02 |
| Color b* | 6.63 | 1.93 | 0.91 | | −1.88 |
| Heat treatment 1 (Tn) (C.) | 700 | 700 | 775 | | |
| Heat treatment 2 (Tc) (C.) | 900 | 900 | 875 | | |
| Color L* | 95.5 | 93.58 | 95.18 | | |
| Color a* | −0.59 | −0.03 | 0.13 | | |
| Color b* | 5.95 | 2.43 | 0.86 | | |
| Heat treatment 1 (Tn) (C.) | 0 | 0 | 800 | | |
| Heat treatment 2 (Tc) (C.) | 875 | 875 | 900 | | |
| Color L* | 94.82 | 92.85 | 95.32 | | |
| Color a* | −0.33 | 0.33 | 0.11 | | |
| Color b* | 7.4 | 2.46 | 1.2 | | |
| Heat treatment 1 (Tn) (C.) | 700 | 700 | 825 | | |
| Heat treatment 2 (Tc) (C.) | 875 | 875 | 900 | | |
| Color L* | 94.68 | 90.99 | 95.25 | | |
| Color a* | −0.13 | 1.03 | 0.14 | | |
| Color b* | 7.75 | 3.29 | 1.2 | | |
| Heat treatment 1 (Tn) (C.) | 700 | 700 | | | |
| Heat treatment 2 (Tc) (C.) | 850 | 850 | | | |
| Color L* | 94.54 | 90.35 | | | |
| Color a* | −0.49 | 1.12 | | | |
| Color b* | 7.71 | 6.53 | | | |
| Heat treatment 1 (Tn) (C.) | 700 | 700 | | | |
| Heat treatment 2 (Tc) (C.) | 825 | 825 | | | |
| Color L* | 93.08 | 89.85 | | | |
| Color a* | 0.08 | 0.04 | | | |
| Color b* | 7.6 | 9 | | | |

| | Example = ▶ | | | | |
|---|---|---|---|---|---|
| | 66 | 67 | 68 | 69 | 70 |
| Heat treatment 1 (Tn) (C.) | 850 | 850 | 850 | 750 | 750 |
| Heat treatment 2 (Tc) (C.) | 925 | 925 | 925 | 875 | 875 |
| Color L* | 91.49 | 90.44 | 92.24 | 95.53 | 95.27 |
| Color a* | −1 | −1.49 | −1 | −0.42 | −0.46 |
| Color b* | −1.48 | −2.97 | −1.16 | 3.87 | 4.66 |
| Heat treatment 1 (Tn) (C.) | | | | 700 | 700 |
| Heat treatment 2 (Tc) (C.) | | | | 875 | 875 |
| Color L* | | | | 94.72 | 95.14 |
| Color a* | | | | −0.53 | −0.48 |
| Color b* | | | | 3.35 | 4.07 |
| Heat treatment 1 (Tn) (C.) | | | | 700 | 700 |
| Heat treatment 2 (Tc) (C.) | | | | 850 | 850 |
| Color L* | | | | 94.4 | 94.63 |
| Color a* | | | | −0.54 | −0.41 |
| Color b* | | | | 3.57 | 5.02 |
| Heat treatment 1 (Tn) (C.) | | | | 0 | 0 |
| Heat treatment 2 (Tc) (C.) | | | | 875 | 875 |
| Color L* | | | | 95 | 94.71 |
| Color a* | | | | −0.45 | −0.47 |
| Color b* | | | | 3.31 | 4.06 |

| | Example = ▶ | | | | |
|---|---|---|---|---|---|
| | 71 | 72 | 73 | 74 | 75 |
| Heat treatment 1 (Tn) (C.) | 750 | 750 | 750 | 750 | 750 |
| Heat treatment 2 (Tc) (C.) | 875 | 875 | 875 | 875 | 875 |
| Color L* | 94.42 | 95.22 | 95 | 95.18 | 94.01 |
| Color a* | −0.44 | −0.25 | −0.22 | −0.26 | −0.35 |
| Color b* | 5.68 | 5.31 | 4.96 | 4.43 | 7.47 |
| Heat treatment 1 (Tn) (C.) | 700 | 700 | 700 | 700 | 750 |
| Heat treatment 2 (Tc) (C.) | 875 | 875 | 875 | 875 | 850 |
| Color L* | 94.93 | 95.42 | 94.14 | 94.74 | 92.19 |
| Color a* | −0.52 | −0.3 | −0.35 | −0.22 | −0.5 |
| Color b* | 4.99 | 5.04 | 4.4 | 4.71 | 8.17 |
| Heat treatment 1 (Tn) (C.) | 700 | 700 | 700 | 700 | 700 |
| Heat treatment 2 (Tc) (C.) | 850 | 850 | 850 | 850 | 875 |
| Color L* | 94.6 | 94.47 | 93.89 | 93.91 | 94.98 |
| Color a* | −0.28 | −0.23 | −0.46 | −0.24 | −0.11 |
| Color b* | 5.52 | 6.22 | 5.53 | 5.93 | 5.09 |
| Heat treatment 1 (Tn) (C.) | 0 | 0 | 0 | 0 | 0 |
| Heat treatment 2 (Tc) (C.) | 875 | 875 | 875 | 875 | 875 |
| Color L* | 95.21 | 95.22 | 94.02 | 94.87 | 95.38 |
| Color a* | −0.54 | −0.29 | −0.37 | −0.32 | −0.39 |
| Color b* | 5.21 | 5.14 | 3.84 | 4.36 | 4.38 |

| | Example = ▶ | | | | |
|---|---|---|---|---|---|
| | 76 | 77 | 78 | 79 | 80 |
| Heat treatment 1 (Tn) (C.) | 750 | 750 | 750 | 750 | 750 |
| Heat treatment 2 (Tc) (C.) | 875 | 875 | 875 | 875 | 875 |
| Color L* | | 94.31 | | 93.69 | 95.27 |
| Color a* | | −0.13 | | −0.3 | −0.46 |
| Color b* | | 6.39 | | 4.61 | 4.66 |
| Heat treatment 1 (Tn) (C.) | 750 | 750 | 750 | 750 | 700 |
| Heat treatment 2 (Tc) (C.) | 850 | 850 | 850 | 850 | 875 |
| Color L* | | 94.14 | | 93.11 | 95.14 |
| Color a* | | −0.29 | | −0.36 | −0.48 |
| Color b* | | 6.36 | | 5.61 | 4.07 |
| Heat treatment 1 (Tn) (C.) | 700 | 700 | 700 | 700 | 700 |
| Heat treatment 2 (Tc) (C.) | 875 | 875 | 875 | 875 | 850 |
| Color L* | | 93.61 | | 93.45 | 94.63 |
| Color a* | | −0.02 | | −0.29 | −0.41 |
| Color b* | | 7.57 | | 4.41 | 5.02 |
| Heat treatment 1 (Tn) (C.) | 0 | 0 | 0 | 0 | 0 |
| Heat treatment 2 (Tc) (C.) | 875 | 875 | 875 | 875 | 875 |
| Color L* | | 94.25 | | 93.73 | 94.71 |
| Color a* | | 0.05 | | −0.35 | −0.47 |
| Color b* | | 5.89 | | 4.35 | 4.06 |

| | Example = ▶ | | | | |
|---|---|---|---|---|---|
| | 86 | 87 | 88 | 89 | 90 |
| Heat treatment 1 (Tn) (C.) | | 750 | 750 | 750 | 750 |

TABLE III-continued

Heat treatment conditions and SCI color measurements.

| | | | | |
|---|---|---|---|---|
| Heat treatment 2 (Tc) (C.) | 900 | 900 | 900 | 900 |
| Color L* | 94.85 | 94.48 | 92.17 | 92.19 |
| Color a* | −0.49 | −0.65 | −1.01 | −1.14 |
| Color b* | 0.99 | 0.46 | −1.45 | −1.43 |
| Heat treatment 1 (Tn) (C.) | 750 | 800 | 750 | 800 |
| Heat treatment 2 (Tc) (C.) | 900 | 900 | 900 | 875 |
| Color L* | 94.87 | 94.29 | 92.19 | 89.72 |
| Color a* | −0.48 | −0.6 | −1.08 | −1.57 |
| Color b* | 1.08 | 0.58 | −1.42 | −3.06 |
| Heat treatment 1 (Tn) (C.) | 800 | | 800 | 800 |
| Heat treatment 2 (Tc) (C.) | 900 | | 875 | 900 |
| Color L* | 94.33 | | 90.62 | 92.85 |
| Color a* | −0.55 | | −1.26 | −1.09 |
| Color b* | 0.28 | | −2.51 | −0.89 |
| Heat treatment 1 (Tn) (C.) | 800 | | 800 | 825 |
| Heat treatment 2 (Tc) (C.) | 900 | | 875 | 900 |
| Color L* | 94.34 | | 90.58 | 93.14 |
| Color a* | −0.55 | | −1.27 | −1 |
| Color b* | 0.33 | | −2.52 | −0.56 |

| | Example = ▶ | | | | |
|---|---|---|---|---|---|
| | 86 | 87 | 88 | 89 | 90 |
| Heat treatment 1 (Tn) (C.) | | 825 | | 800 | |
| Heat treatment 2 (Tc) (C.) | | 900 | | 900 | |
| Color L* | | 94.12 | | 92.77 | |
| Color a* | | −0.6 | | −0.96 | |
| Color b* | | −0.02 | | −0.92 | |
| Heat treatment 1 (Tn) (C.) | | 825 | | 800 | |
| Heat treatment 2 (Tc) (C.) | | 900 | | 900 | |
| Color L* | | 94.12 | | 92.7 | |
| Color a* | | −0.58 | | −0.97 | |
| Color b* | | −0.03 | | −1.02 | |

| | Example = ▶ | | | | |
|---|---|---|---|---|---|
| | 91 | 92 | 93 | 94 | 95 |
| Heat treatment 1 (Tn) (C.) | 750 | | 800 | 750 | 825 |
| Heat treatment 2 (Tc) (C.) | 900 | | 875 | 900 | 900 |
| Color L* | 94.46 | | 93.48 | 94.1 | 93.41 |
| Color a* | −0.52 | | −0.83 | −0.63 | −0.75 |
| Color b* | 1.23 | | −0.03 | 0.68 | −0.49 |
| Heat treatment 1 (Tn) (C.) | 800 | | 800 | 825 | |
| Heat treatment 2 (Tc) (C.) | 900 | | 900 | 900 | |
| Color L* | 94.46 | | 94.76 | 94.13 | |
| Color a* | −0.51 | | −0.59 | −0.69 | |
| Color b* | 1.26 | | 0.91 | 1.99 | |

| | Example = ▶ | | | | |
|---|---|---|---|---|---|
| | 108 | 109 | 110 | 111 | 112 |
| Heat treatment 1 (Tn) (C.) | 800 | 800 | 800 | 800 | 800 |
| Heat treatment 2 (Tc) (C.) | 950 | 950 | 950 | 950 | 950 |
| Color L* | 93.49 | 92.33 | 94.35 | 94.22 | 94.85 |
| Color a* | −0.62 | −0.7 | −0.25 | −0.79 | −0.58 |
| Color b* | 0.36 | 0.41 | 4.88 | −0.07 | 0.7 |

TABLE III-continued

Heat treatment conditions and SCI color measurements.

| | Example = ▶ | | | |
|---|---|---|---|---|
| | 113 | 114 | 115 | 116 |
| Heat treatment 1 (Tn) (C.) | 800 | 800 | 800 | 800 |
| Heat treatment 2 (Tc) (C.) | 950 | 950 | 950 | 950 |
| Color L* | 94.88 | 93.82 | 93.55 | 95.45 |
| Color a* | −0.54 | −0.9 | −0.57 | −0.66 |
| Color b* | 1.5 | −0.67 | −0.38 | 1.94 |

Example E: The indentation crack initiation load for a glass-ceramic formed from the precursor glass composition of Example 44 was measured using a Vickers indenter. The glass-ceramic was formed according to the methods described herein and IX as provided below in Table IV, along with the indentation threshold results.

TABLE IV

Table IV: Vickers indentation crack initiation load for a glass-ceramic including the glass of Example 44.

| | Example = ▶ | | |
|---|---|---|---|
| | 44 | | |
| Ion exchange condition | 1 hour at 410° C. | 2 hours at 410° C. | 4 hours at 410° C. |
| Indentation threshold (kgf) | 10 | 15 | 25 |

Example F: Various optical properties of Examples 63 and 65-68 were measured, including total transmission, opacity, transmission color, reflectance color and refractive index. One glass-ceramic sample each was formed from each of the precursor glasses of Examples 63 and 65-68. The samples had length and width dimensions of 1 inch (i.e., each sample was 1 square inch). The thickness of each sample is provided below in Table V. Each of the samples were polished, had a flat surface and exhibited a white color.

TABLE V

Thickness of Examples 63, 65-68 used for opacity measurements.

| | Example = ▶ | | | | |
|---|---|---|---|---|---|
| | 63 | 65 | 66 | 67 | 68 |
| Thickness (mm) | 0.73 | 0.73 | 0.99 | 1.03 | 1.03 |

Prior to measurement, the surfaces of each sample was given a drag wipe cleaning using a Texwipe TX-609 wiper dampened with HPLC grade reagent alcohol. The samples were then measured for 2500 nm-250 nm total transmittance and total reflectance using a Perkin-Elmer 950 #2 spectrophotometer with 150 mm diameter sphere detector. The following parameters were used:
  Spectral Bandwidth—PMT—3.0 nm
  PbS—Servo, Gain—18
  Scan Speed—420 nm/min
  Scan Step Size—2 nm
  Signal Average Time—0.2 Seconds
  Aperture—None
The total transmittance measurement was obtained by fixing each sample at the sphere entry port to provide collection of off-axis scattered light transmitted by the sample if any exists. The total reflectance was measured with both white and black backing for determination of opacity. % Opacity is calculated using the equation:

$$\% \text{ Opacity} = \frac{\% R \text{ black back}}{\% R \text{ White back}} \times 100.$$

Figure 13:
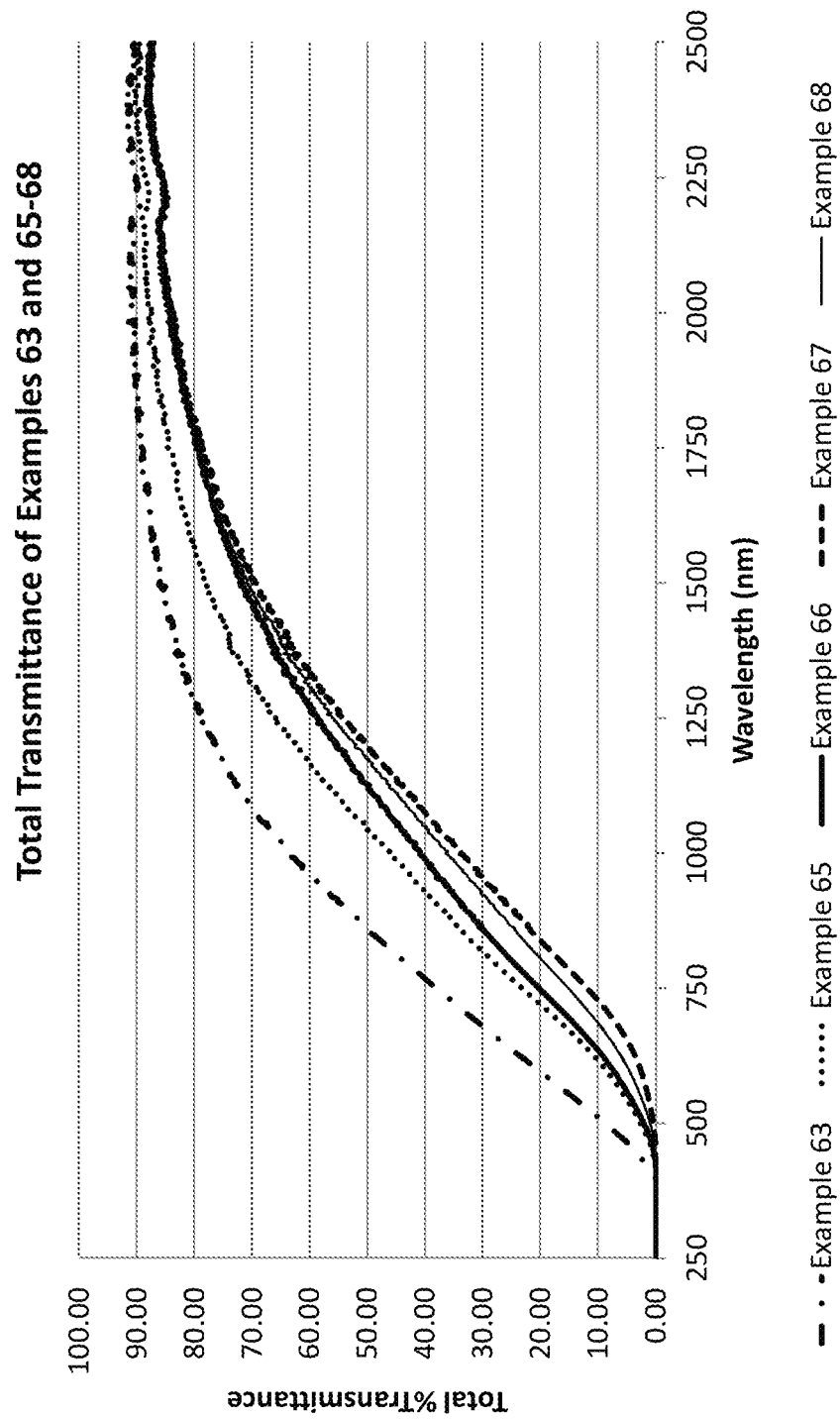
FIG. 13 is a graph illustrating the total transmittance of glass-ceramics formed from Examples 63 and 65-68.
Figure 14:
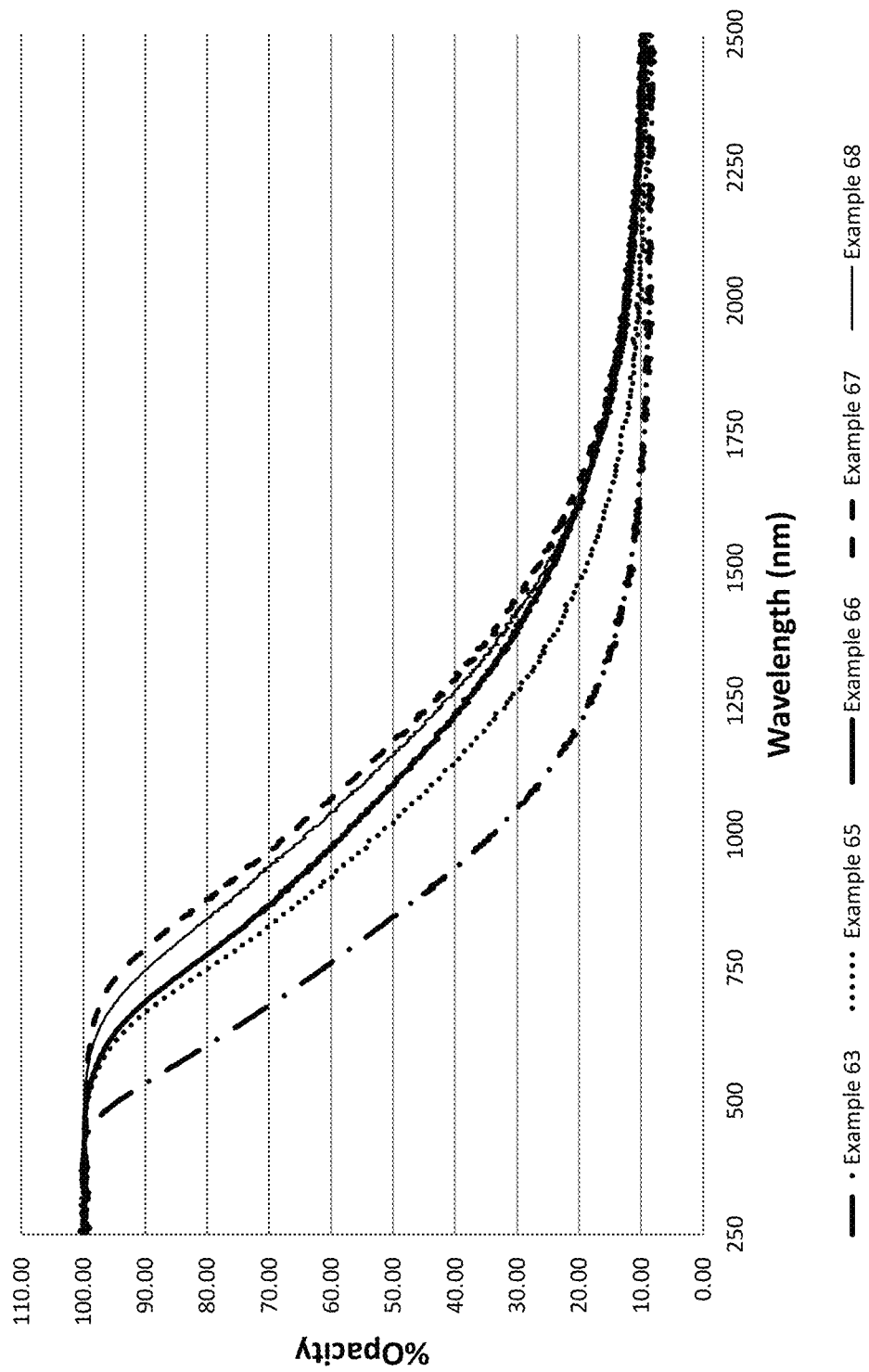
FIG. 14 is a graph illustrating the opacity of the glass-ceramics shown in FIG. 1.

The total transmittance of Examples 63 and 65-68 is shown in FIG. 13. Opacity of Examples 63 and 65-68 is shown in FIG. 14. The average opacity of Examples 63 and 65-68 is shown below in Table VI.

TABLE VI

Average % Opacity of Examples 63 and 65-68.

| | Example = ▶ | | | | |
|---|---|---|---|---|---|
| | 63 | 65 | 66 | 67 | 68 |
| Average % Opacity over the visible spectrum (380 nm-780 nm) | 82.42 | 93.32 | 94.34 | 97.91 | 96.78 |

The index of refraction measurements were performed on the Metricon Model 2010 Prism Coupler at 633 nm. The Metricon 2010 prism coupler operated as a fully automated refractometer, in which the refractive index of bulk materials and/or films can be measured. Refractive indices of bulk materials (e.g., Examples 63, and 65-68) were measured by the Metricon 2010 Prism Coupler using the following principle. If a material with an index of n is coupled to a prism with an index $n_p$, laser light directed onto the base of the prism will be totally reflected until the angle of incidence θ becomes less than the critical angle $θ_c$ where:

$$θ_c = \arc \sin(n/n_p)$$

The θc is measured using a photodetector (see FIG. 1) since the intensity on the detector drops significantly as θ drops below the critical angle. Since np is known, n can be determined from the above equation.

The instrument parameters used for the index measurements are as follows:
Substrate Mode
Half step table interval
Prism: 200-P-1, code 1073.6
Coupling load: ~3.5 lb.
3 repeat scans
Source: 1550 nm laser The instrument(s) used are calibrated periodically according to ASTM recommended procedures using absolute physical standards, or standards traceable to the National Institute of Standards and Technology (NIST).

The transmittance color results, reflectance color results (with black backing) and refractive index results are provided in Tables VIIA, VIIB and VIIC.

TABLE VIIA

Table VIIA: Transmittance color results of Examples 63 and 65-58.

| Example = ▶ | | | 63 | | | |
|---|---|---|---|---|---|---|
| Illuminant CIE A | | | | | | |
| Tristimulus: | X = | 22.06 | Y = | 17.08 | Z = | 1.65 |
| Chromaticity: | x = | 0.5409 | y = | 0.4187 | z = | 0.0404 |
| CIE L* a* b*: | L* = | 48.36 | a* = | 14.26 | b* = | 38.86 |
| Illuminant CIE F02 | | | | | | |
| Tristimulus: | X = | 17.83 | Y = | 16.18 | Z = | 2.62 |
| Chromaticity: | x = | 0.4868 | y = | 0.4418 | z = | 0.0714 |
| a*CIE L* a* b*: | L* = | 47.21 | a* = | 5.99 | b* = | 41.64 |
| Illuminant CIE D65 | | | | | | |
| Tristimulus: | X = | 15.69 | Y = | 14.92 | Z = | 4.46 |
| Chromaticity: | x = | 0.4474 | y = | 0.4254 | z = | 0.1272 |
| CIE L* a* b*: | L* = | 45.53 | a* = | 9.34 | b* = | 36.81 |
| Example = ▶ | | | 65 | | | |
| Illuminant CIE A | | | | | | |
| Tristimulus: | X = | 9.57 | Y = | 6.97 | Z = | 0.38 |
| Chromaticity: | x = | 0.5656 | y = | 0.4122 | z = | 0.0222 |
| CIE L* a* b*: | L* = | 31.75 | a* = | 14.98 | b* = | 38.28 |
| Illuminant CIE F02 | | | | | | |
| Tristimulus: | X = | 7.35 | Y = | 6.41 | Z = | 0.52 |
| Chromaticity: | x = | 0.5151 | y = | 0.4489 | z = | 0.0361 |
| CIE L* a* b*: | L* = | 30.42 | a* = | 7.18 | b* = | 40.75 |
| Illuminant CIE D65 | | | | | | |
| Tristimulus: | X = | 6.53 | Y = | 5.82 | Z = | 0.94 |
| Chromaticity: | x = | 0.4917 | y = | 0.4378 | z = | 0.0706 |
| CIE L* a* b*: | L* = | 28.94 | a* = | 11.25 | b* = | 36.30 |
| Example = ▶ | | | 66 | | | |
| Illuminant CIE A | | | | | | |
| Tristimulus: | X = | 8.20 | Y = | 5.93 | Z = | 0.27 |
| Chromaticity: | x = | 0.5693 | y = | 0.4117 | z = | 0.0189 |
| CIE L* a* b*: | L* = | 29.24 | a* = | 14.73 | b* = | 38.36 |
| Illuminant CIE F02 | | | | | | |
| Tristimulus: | X = | 6.28 | Y = | 5.44 | Z = | 0.36 |
| Chromaticity: | x = | 0.5198 | y = | 0.4503 | z = | 0.0299 |
| CIE L* a* b*: | L* = | 27.96 | a* = | 7.20 | b* = | 39.99 |
| Illuminant CIE D65 | | | | | | |
| Tristimulus: | X = | 5.57 | Y = | 4.91 | Z = | 0.66 |
| Chromaticity: | x = | 0.4999 | y = | 0.4405 | z = | 0.0596 |
| CIE L* a* b*: | L* = | 26.48 | a* = | 11.31 | b* = | 36.01 |
| Example = ▶ | | | 67 | | | |
| Illuminant CIE A | | | | | | |
| Tristimulus: | X = | 3.06 | Y = | 2.05 | Z = | 0.05 |
| Chromaticity: | x = | 0.5935 | y = | 0.3975 | z = | 0.0089 |
| CIE L* a* b*: | L* = | 15.75 | a* = | 14.15 | b* = | 25.12 |
| Illuminant CIE F02 | | | | | | |
| Tristimulus: | X = | 2.20 | Y = | 1.80 | Z = | 0.05 |
| Chromaticity: | x = | 0.5435 | y = | 0.4433 | z = | 0.0131 |
| CIE L* a* b*: | L* = | 14.37 | a* = | 7.73 | b* = | 23.58 |
| Illuminant CIE D65 | | | | | | |
| Tristimulus: | X = | 2.00 | Y = | 1.60 | Z = | 0.10 |
| Chromaticity: | x = | 0.5401 | y = | 0.4324 | z = | 0.0275 |
| CIE L* a* b*: | L* = | 13.25 | a* = | 12.14 | b* = | 21.36 |
| Example = ▶ | | | 68 | | | |
| Illuminant CIE A | | | | | | |
| Tristimulus: | X = | 5.24 | Y = | 3.65 | Z = | 0.11 |
| Chromaticity: | x = | 0.5819 | y = | 0.4054 | z = | 0.0127 |
| CIE L* a* b*: | L* = | 22.48 | a* = | 14.76 | b* = | 33.71 |
| Illuminant CIE F02 | | | | | | |
| Tristimulus: | X = | 3.91 | Y = | 3.28 | Z = | 0.14 |
| Chromaticity: | x = | 0.5329 | y = | 0.4480 | z = | 0.0191 |
| CIE L* a* b*: | L* = | 21.15 | a* = | 7.75 | b* = | 33.28 |

TABLE VIIA-continued

Table VIIA: Transmittance color results of Examples 63 and 65-58.

Illuminant CIE D65

| | | | | | | | |
|---|---|---|---|---|---|---|---|
| Tristimulus: | X = | 3.49 | Y = | 2.94 | Z = | | 0.26 |
| Chromaticity: | x = | 0.5220 | y = | 0.4385 | z = | | 0.0395 |
| CIE L* a* b*: | L* = | 19.78 | a* = | 12.15 | b* = | | 30.28 |

For transmittance color, the wavelength range was 380 nm to 780 nm, the spectral interval was 2 nm. A illuminant CIE, F02 illuminant CIE, D65 illuminant and a 10-degree standard observer angle were utilized to obtain the tristimulus, chromaticity and CIE L*a*b* measurements.

TABLE VIIB

Table VIIB: Reflectance color results of Examples 63 and 65-58.

Example = ▶ 63

Illuminant CIE A

| | | | | | | | |
|---|---|---|---|---|---|---|---|
| Tristimulus: | X = | 86.60 | Y = | 80.34 | Z = | | 30.84 |
| Chromaticity: | x = | 0.4379 | y = | 0.4062 | z = | | 0.1559 |
| CIE L* a* b*: | L* = | 91.84 | a* = | −4.72 | b* = | | −5.43 |

Illuminant CIE F02

| | | | | | | | |
|---|---|---|---|---|---|---|---|
| Tristimulus: | X = | 82.51 | Y = | 81.14 | Z = | | 60.17 |
| Chromaticity: | x = | 0.3687 | y = | 0.3625 | z = | | 0.2688 |
| CIE L* a* b*: | L* = | 92.19 | a* = | −2.32 | b* = | | −4.98 |

Illuminant CIE D65

| | | | | | | | |
|---|---|---|---|---|---|---|---|
| Tristimulus: | X = | 76.01 | Y = | 81.95 | Z = | | 94.17 |
| Chromaticity: | x = | 0.3015 | y = | 0.3250 | z = | | 0.3735 |
| CIE L* a* b*: | L* = | 92.55 | a* = | −3.40 | b* = | | −4.29 |

Example = ▶ 65

Illuminant CIE A

| | | | | | | | |
|---|---|---|---|---|---|---|---|
| Tristimulus: | X = | 87.74 | Y = | 80.67 | Z = | | 30.23 |
| Chromaticity: | x = | 0.4417 | y = | 0.4061 | z = | | 0.1522 |
| CIE L* a* b*: | L* = | 91.98 | a* = | −3.35 | b* = | | −3.91 |

Illuminant CIE F02

| | | | | | | | |
|---|---|---|---|---|---|---|---|
| Tristimulus: | X = | 82.85 | Y = | 81.18 | Z = | | 58.82 |
| Chromaticity: | x = | 0.3718 | y = | 0.3643 | z = | | 0.2640 |
| CIE L* a* b*: | L* = | 92.21 | a* = | −1.77 | b* = | | −3.51 |

Illuminant CIE D65

| | | | | | | | |
|---|---|---|---|---|---|---|---|
| Tristimulus: | X = | 76.27 | Y = | 81.84 | Z = | | 92.03 |
| Chromaticity: | x = | 0.3049 | y = | 0.3272 | z = | | 0.3679 |
| CIE L* a* b*: | L* = | 92.50 | a* = | −2.67 | b* = | | −2.91 |

Example = ▶ 66

Illuminant CIE A

| | | | | | | | |
|---|---|---|---|---|---|---|---|
| Tristimulus: | X = | 87.10 | Y = | 79.92 | Z = | | 29.69 |
| Chromaticity: | x = | 0.4428 | y = | 0.4063 | z = | | 0.1509 |
| CIE L* a* b*: | L* = | 91.65 | a* = | −3.03 | b* = | | −3.35 |

Illuminant CIE F02

| | | | | | | | |
|---|---|---|---|---|---|---|---|
| Tristimulus: | X = | 82.10 | Y = | 80.38 | Z = | | 57.77 |
| Chromaticity: | x = | 0.3728 | y = | 0.3650 | z = | | 0.2623 |
| CIE L* a* b*: | L* = | 91.86 | a* = | −1.64 | b* = | | −2.97 |

Illuminant CIE D65

| | | | | | | | |
|---|---|---|---|---|---|---|---|
| Tristimulus: | X = | 75.54 | Y = | 80.95 | Z = | | 90.39 |
| Chromaticity: | x = | 0.3060 | y = | 0.3279 | z = | | 0.3661 |
| CIE L* a* b*: | L* = | 92.11 | a* = | −2.45 | b* = | | −2.46 |

TABLE VIIB-continued

Table VIIB: Reflectance color results of Examples 63 and 65-58.

Example = ▶ 67

Illuminant CIE A

| | | | | | | | |
|---|---|---|---|---|---|---|---|
| Tristimulus: | X = | 85.03 | Y = | 78.15 | Z = | | 29.39 |
| Chromaticity: | x = | 0.4416 | y = | 0.4058 | z = | | 0.1526 |
| CIE L* a* b*: | L* = | 90.85 | a* = | −3.26 | b* = | | −4.08 |

Illuminant CIE F02

| | | | | | | | |
|---|---|---|---|---|---|---|---|
| Tristimulus: | X = | 80.28 | Y = | 78.64 | Z = | | 57.26 |
| Chromaticity: | x = | 0.3714 | y = | 0.3638 | z = | | 0.2649 |
| CIE L* a* b*: | L* = | 91.07 | a* = | −1.69 | b* = | | −3.77 |

Illuminant CIE D65

| | | | | | | | |
|---|---|---|---|---|---|---|---|
| Tristimulus: | X = | 73.96 | Y = | 79.29 | Z = | | 89.54 |
| Chromaticity: | x = | 0.3046 | y = | 0.3266 | z = | | 0.3688 |
| CIE L* a* b*: | L* = | 91.37 | a* = | −2.50 | b* = | | −3.14 |

Example = ▶ 68

Illuminant CIE A

| | | | | | | | |
|---|---|---|---|---|---|---|---|
| Tristimulus: | X = | 90.41 | Y = | 82.57 | Z = | | 30.15 |
| Chromaticity: | x = | 0.4451 | y = | 0.4065 | z = | | 0.1484 |
| CIE L* a* b*: | L* = | 92.83 | a* = | −2.33 | b* = | | −2.29 |

Illuminant CIE F02

| | | | | | | | |
|---|---|---|---|---|---|---|---|
| Tristimulus: | X = | 84.92 | Y = | 82.95 | Z = | | 58.63 |
| Chromaticity: | x = | 0.3749 | y = | 0.3662 | z = | | 0.2589 |
| CIE L* a* b*: | L* = | 92.99 | a* = | −1.30 | b* = | | −1.95 |

Illuminant CIE D65

| | | | | | | | |
|---|---|---|---|---|---|---|---|
| Tristimulus: | X = | 78.04 | Y = | 83.35 | Z = | | 91.75 |
| Chromaticity: | x = | 0.3083 | y = | 0.3293 | z = | | 0.3624 |
| CIE L* a* b*: | L* = | 93.17 | a* = | −1.96 | b* = | | −1.57 |

For transmittance and reflectance color, the wavelength range was 380 nm to 780 nm, the spectral interval was 2 nm. CIE illuminants F02 and D65 and a 10-degree standard observer angle were utilized to obtain the tristimulus, chromaticity and CIE L*a*b* measurements.

TABLE VIIC

Table VIIC: Refractive Index of Examples 63 and 65-58.

| | Example = ▶ | | | | |
|---|---|---|---|---|---|
| | 63 | 65 | 66 | 67 | 68 |
| Refractive Index at 1550 nm | 1.4919 | 1.4970 | 1.4972 | 1.4992 | 1.4969 |

Examples 117-128: The exemplary precursor glass compositions listed in Table VIII were made in the same manner as Examples 1-116 and were formed into molten precursor glass that was then cast as patties of precursor glass in the same manner as Examples 1-116. The patties of precursor glass were then thermally treated to form glass-ceramics, as described above with respect to Examples 1-116. The resulting glass-ceramics were also analyzed for the properties listed in Table VIII, in the same manner as Examples 1-116.

TABLE VIII

Table VIII: Precursor glass compositions.

| | Example → | | | | |
|---|---|---|---|---|---|
| | 117 | 118 | 119 | 120 | 121 |
| Oxide [mole %] | | | | | |
| $Al_2O_3$ | 13.88 | 13.88 | 13.84 | 13.84 | 13.85 |
| $B_2O_3$ | 0.00 | 0.00 | 0.00 | 0.00 | 0.00 |
| CaO | 0.04 | 0.05 | 0.04 | 0.04 | 1.00 |
| $Fe_2O_3$ | 0.01 | 0.01 | 0.01 | 0.01 | 0.01 |
| $K_2O$ | 0.06 | 0.06 | 1.00 | 0.06 | 0.06 |
| $Li_2O$ | 0.00 | 0.93 | 0.00 | 0.00 | 0.00 |
| MgO | 1.99 | 1.97 | 1.97 | 1.98 | 1.99 |
| $Na_2O$ | 14.78 | 13.73 | 13.85 | 13.83 | 13.79 |
| $P_2O_5$ | 6.37 | 6.36 | 6.42 | 6.43 | 6.38 |
| $SiO_2$ | 59.96 | 60.11 | 59.99 | 60.00 | 60.05 |
| $SnO_2$ | 0.00 | 0.00 | 0.00 | 0.00 | 0.00 |
| $TiO_2$ | 2.90 | 2.90 | 2.88 | 2.88 | 2.88 |
| ZnO | 0.01 | 0.01 | 0.00 | 0.95 | 0.00 |
| $[R_2O—Al_2O_3]$ | 0.96 | 0.84 | 1.01 | 0.05 | 0 |
| Annealing temperature (C.) | 650 | 650 | 650 | 650 | 650 |
| Tn (C.) for 30 min | 775 | 775 | 775 | 775 | 775 |
| Tc (C.) for 2 hours | 925 | 925 | 925 | 925 | 925 |
| Softening | 887.7 | 872.3 | 892.3 | 892 | 910.3 |
| Annealing Pt. (C.) | 621 | 606 | 620 | 620 | 636 |
| Strain Pt. (C.) | 574 | 562 | 573 | 574 | 590 |
| Density (g/cm³) | 2.427 | 2.427 | 2.427 | 2.437 | 2.429 |
| CTE ($\times 10^{-7}$/C) | 79.2 | 78.6 | 81.7 | 75.8 | 76.6 |
| liquidus | | | | | |
| air | 1090 | 1080 | 1090 | 1080 | 1080 |
| internal | 1075 | 1080 | 1085 | 1075 | 1080 |
| platinum | 1070 | 1070 | 1080 | 1070 | 1070 |
| primary crystalline phase | rutile | Rutile | rutile | Rutile | rutile |
| liquidus viscosity (72 h gradient boat) | | | | | |
| air | 264467.8 | 235510.3 | 292648.2 | 318929.5 | 334228.9 |
| internal | 353452.7 | 235510.3 | 321990.9 | 351815.3 | 334228.9 |
| platinum | 389988.5 | 284787.1 | 354564.3 | 388414.3 | 407190.8 |
| Indentation threshold | | | | | |
| HTV-A | −4.221 | −4.219 | −4.313 | −4.616 | −4.474 |
| HTV_B | 11219.1 | 11244.5 | 11571.9 | 12064.7 | 11756.7 |
| HTV-B0 | −73.4 | −92.4 | −93.3 | −112.2 | −95.9 |
| log(D(cm2/s)) heat treatment | | | | | |
| Color L* | 95.87 | 95.35 | 96.17 | 94.59 | 95.11 |
| Color a* | −0.28 | −0.26 | −0.31 | −0.65 | −0.31 |

| | Example → | | | | |
|---|---|---|---|---|---|
| | 117 | 118 | 119 | 120 | 121 |
| Color b* | 2.91 | 2.07 | 2.85 | 1.42 | 1.47 |

| | Example → | | | | |
|---|---|---|---|---|---|
| | 122 | 123 | 124 | 125 | 126 |
| Oxide [mole %] | | | | | |
| $Al_2O_3$ | 13.94 | 14.19 | 14.13 | 14.14 | 14.21 |
| $B_2O_3$ | 0.5 | 4.17 | 4.44 | 4.35 | 4.15 |
| CaO | 0.04 | 0.05 | 0.05 | 0.05 | 0.05 |
| $Fe_2O_3$ | 0.01 | 0.01 | 0.01 | 0.01 | 0.01 |
| $K_2O$ | 0.06 | 0.02 | 0.02 | 0.02 | 0.02 |
| $Li_2O$ | 0 | 0 | 0 | 0 | 0 |
| MgO | 2.01 | 2.67 | 2.66 | 2.65 | 2.62 |
| $Na_2O$ | 13.73 | 13.27 | 13.34 | 13.35 | 13.19 |
| $P_2O_5$ | 6.36 | 1 | 1.01 | 1 | 0.99 |
| $SiO_2$ | 60.45 | 62.1 | 61.33 | 60.91 | 60.77 |
| $SnO_2$ | 0 | 0.09 | 0.09 | 0.09 | 0.09 |
| $TiO_2$ | 2.91 | 2.44 | 2.91 | 3.42 | 3.9 |

TABLE VIII-continued

Table VIII: Precursor glass compositions.

| | | | | | |
|---|---|---|---|---|---|
| ZnO | 0 | 0 | 0 | 0 | 0 |
| [$R_2O-Al_2O_3$] | −0.15 | −0.9 | −0.77 | −0.77 | −1 |
| Annealing temperature (C.) | 650 | 650 | 650 | 650 | 650 |
| Tn (C.) for 30 min | 775 | 775 | 775 | 775 | 775 |
| Tc (C.) for 2 hours | 925 | 925 | 925 | 925 | 925 |
| Softening | 887.9 | | | | |
| Annealing Pt. (C.) | 614 | | | | |
| Strain Pt. (C.) | 5666 | | | | |
| Density (g/cm$^3$) | 2.414 | | | | |
| CTE (×10$^{-7}$/C) | 75.9 | | | | |
| Liquidus | | | | | |
| air | 1110 | 1100 | 1145 | 1145 | 1190 |
| internal | 1105 | 1100 | 1140 | 1140 | 1190 |
| platinum | 1090 | 1085 | 1125 | 1130 | 1170 |
| primary crystalline phase | rutile | Rutile | rutile | rutile | rutile |
| liquidus viscosity (72 h gradient boat) | | | | | |
| air | 178562.3 | | | | |
| internal | 195696.2 | | | | |
| platinum | 258767.8 | | | | |
| Indentation threshold | | | | | |
| HTV-A | −4.612 | | | | |
| HTV_B | 12274.5 | | | | |
| HTV-B0 | −134.4 | | | | |

| | Example = ▶ | | | | |
|---|---|---|---|---|---|
| | 122 | 123 | 124 | 125 | 126 |
| log(D(cm2/s)) heat treatment | | | | | |
| Color L* | 95.06 | | 92.15 | | |
| Color a* | −0.33 | | −0.76 | | |
| Color b* | 1.5 | | −2 | | |

| | Example = ▶ | |
|---|---|---|
| | 127 | 128 |
| Oxide [mole %] | | |
| $Al_2O_3$ | 14.43 | 14.33 |
| $B_2O_3$ | 3.18 | 3.45 |
| CaO | 0.05 | 0.05 |
| $Fe_2O_3$ | 0.01 | 0.01 |
| $K_2O$ | 0.02 | 0.02 |
| $Li_2O$ | 0 | 0 |
| MgO | 2.66 | 2.68 |
| $Na_2O$ | 13.31 | 13.46 |
| $P_2O_5$ | 1.51 | 1.55 |
| $SiO_2$ | 61.78 | 60.49 |
| $SnO_2$ | 0.09 | 0.09 |
| $TiO_2$ | 2.96 | 3.88 |
| ZnO | 0 | 0 |
| [$R_2O-Al_2O_3$] | −1.1 | −0.85 |
| Annealing temperature (C.) | 650 | 650 |
| Tn (C.) for 30 min | 775 | 775 |
| Tc (C.) for 2 hours | 925 | 925 |
| Softening | | |
| Annealing Pt. (C.) | | |
| Strain Pt. (C.) | | |
| Density (g/cm$^3$) | | |
| CTE (×10$^{-7}$/C) | | |
| Liquidus | | |
| air | 1130 | 1180 |
| internal | 1120 | 1170 |
| platinum | 1120 | 1170 |
| primary crystalline phase | rutile | rutile |
| liquidus viscosity (72 h gradient boat) | | |
| air | | |

TABLE VIII-continued

Table VIII: Precursor glass compositions.

internal platinum Indentation threshold

| | Example → | |
|---|---|---|
| | 127 | 128 |
| HTV-A | | |
| HTV_B | | |
| HTV-B0 | | |
| log(D(cm2/s)) | | |
| heat treatment | | |
| Color L* | 92.13 | 91.97 |
| Color a* | −0.72 | −0.86 |
| Color b* | −1.81 | −2.34 |

Comparative Example 129, Examples 130-134 and Comparative Example 135: The exemplary glass precursors listed in Table IX were made in the same manner as Examples 1-128 and were formed into molten precursor glass that was then cast as patties of precursor glass in the same manner as Examples 1-128. The patties of precursor glass of Examples 130-134 and Comparative Example 135 were then thermally treated to form glass-ceramics, as described above with respect to Examples 1-128. The resulting glass-ceramics were also analyzed for the properties listed in Table IX, in the same manner as Examples 1-128. Glasses formed from comparative Example 129 were not thermally treated to form glass-ceramics.

TABLE IX

Precursor glass compositions.

| Composition (mol %) | Comparative Ex. 129 | Ex. 130 | Ex. 131 | Comparative Ex. 132 | Ex. 133 |
|---|---|---|---|---|---|
| $SiO_2$ | 67.5 | 65.1 | 64.6 | 64.1 | 58.5 |
| $Al_2O_3$ | 12.7 | 12.7 | 12.7 | 12.7 | 12.7 |
| $B_2O_3$ | 3.7 | 3.9 | 3.9 | 3.9 | 9.7 |
| $Li_2O$ | 0 | 0 | 0 | 0 | 0 |
| $Na_2O$ | 13.6 | 13.8 | 13.8 | 13.8 | 13.6 |
| MgO | 2.4 | 2.4 | 2.4 | 2.4 | 2.4 |
| ZnO | 0 | 0 | 0 | 0 | 0 |
| $TiO_2$ | 0 | 2.0 | 2.5 | 3 | 3.0 |
| $SnO_2$ | 0.1 | 0.1 | 0.1 | 0.1 | 0.1 |
| [$R_2O$—$Al_2O_3$] | 0.9 | 1.1 | 1.1 | 1.1 | 0.9 |
| Tn (C) | N/A | 775° C. for 2 hours | 775° C. for 2 hours | 775° C. for 2 hours | 775° C. for 2 hours |
| Tc (C) | N/A | 920 for 4 hours | 920 for 4 hours | 920 for 4 hours | 920 for 4 hours |
| Liquidus Temprature (° C.) | 1005 | 1000 | 1050 | 1090 | 1055 |
| Liquidus viscosity (Poise) | 2,210,000 | 1,620,000 | 500,000 | 185,000 | 51,800 |

| Composition (mol %) | Comparative Ex. 129 | Ex. 130 | Ex. 131 | Ex. 132 | Comparative Ex. 133 |
|---|---|---|---|---|---|
| IX - salt | | $KNO_3$ | | $KNO_3$ | $KNO_3$ | $KNO_3$ |
| IX bath temperature (° C.) | — | 410 | 410 | 410 | 410 |
| IX bath time (hr) | — | 16 | 16 | 16 | 16 |
| Indentation threshold (kgf) | 10-15 | 20-25 | 10-15 | 10-15 | 9-10 |

| Composition (mol %) | Ex. 134 | Compararive Ex. 135 |
|---|---|---|
| $SiO_2$ | 58 | 69.2 |
| $Al_2O_3$ | 12.7 | 12.6 |
| $B_2O_3$ | 9.7 | 1.8 |
| $Li_2O$ | 0 | 7.7 |
| $Na_2O$ | 13.6 | 0.4 |
| MgO | 2.4 | 2.9 |
| ZnO | 0 | 1.7 |
| $TiO_2$ | 3.5 | 3.5 |
| $SnO_2$ | 0.1 | 0.2 |
| [$R_2O$—$Al_2O_3$] | 0.9 | −4.5 |

TABLE IX-continued

| Precursor glass compositions. | | |
|---|---|---|
| Tn (C) | 775° C. for 2 hours | 775° C. for 2 hours |
| Tc (C) | 920 for 4 hours | 920 for 4 hours |
| Liquidus Temprature (° C.) | 1105 | 1245 |
| Liquidus viscosity (Poise) | 19,300 | 10,550 |
| IX - salt | | $NaNO_3$ |
| IX bath temperature (° C.) | | 430 |
| IX bath time (hr) | | 2 |
| Indentation threshold (kgf) | | 7-9 |

The liquidus temperature of Comparative Example 129, Examples 130-134 and Comparative Example 135 was determined by forming a glass powder from the precursor glasses and then isothermally holding the glass powder in a gradient furnace for 72 hours. The viscosity at liquidus temperature for each of Comparative Example 129, Examples 130-134 and Comparative Example 135 was determined from the measurement of high temperature viscosity. Indentation threshold values were determined on the glass formed from Comparative Example 129 (which was not thermally threated to a glass-ceramic) and the glass-ceramics of Examples 130-134 and Comparative Example 135. The glass-ceramics of Examples 130-134 and Comparative Example 135 were ion exchanged at the designated salt bath, at the times and temperatures listed in Table IX prior to testing with a Vickers indenter. The glass formed from Comparative Example 129 was formed using the same process as used to form the glass-ceramics of Examples 130-134 and Comparative Example 135 but was not ion exchanged and exhibited Vickers Indentation Crack Initiation load values in the range from about 10 kgf and 15 kgf For comparison, the precursor glass composition for Comparative Example 129 was formed into a glass article using a fusion draw process and the resulting glass article exhibited Vickers Indentation Crack Initiation load value of from about 20 kgf to about 25 kgf.

Figure 15:
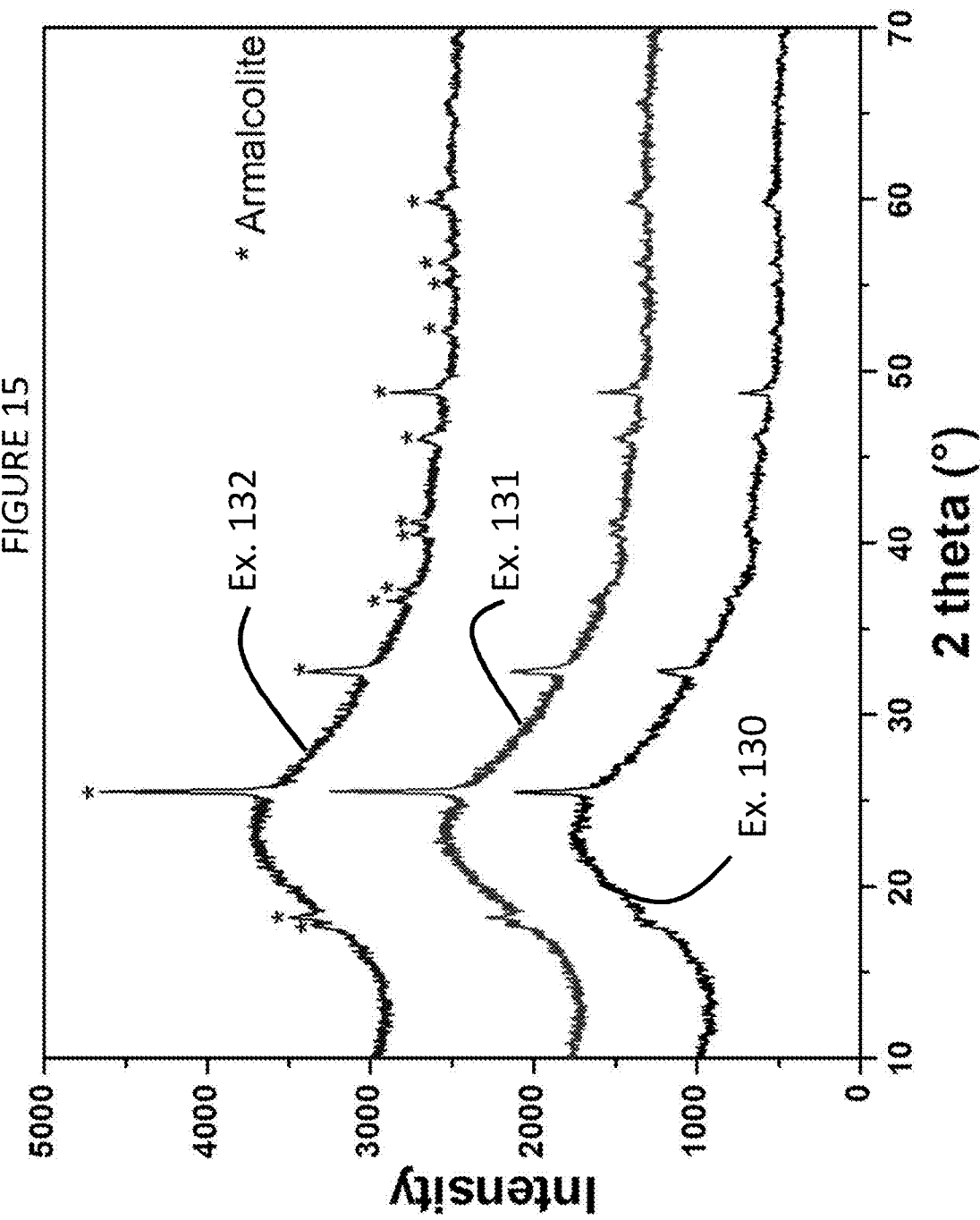
FIG. 15 is a graph showing the x-ray diffraction spectra of the crystalline phase of the glass-ceramics formed from Examples 130-132.
Figure 17A:
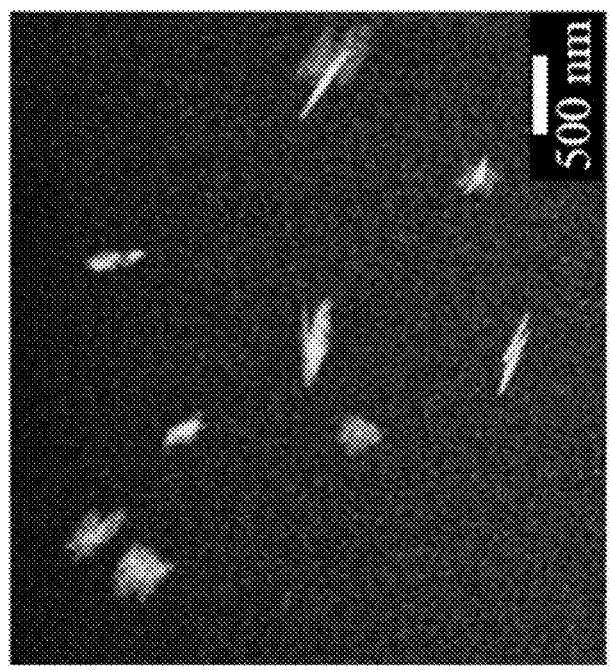
Figure 17B:
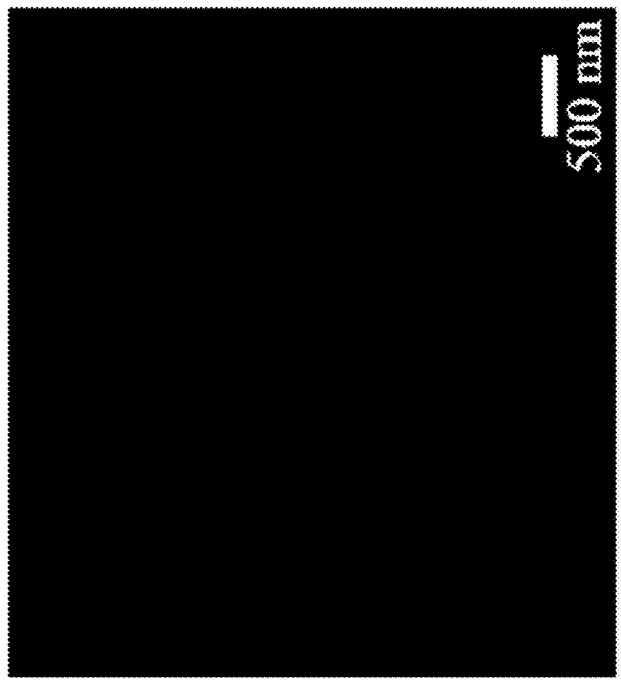

FIG. 15 shows x-ray diffraction spectra of the crystalline phases of the glass-ceramics formed from Examples 130-132, after ceramming at 920° C. for 4 hours. The spectra shows the presence of armalcolite in all three glass-ceramics. The remaining portions of the glass-ceramics remained amorphous.

FIGS. 16A and 16B show high angle annular dark field (HAADF) mapping images for the glass-ceramic of Example 131, after ceramming at 920° C. for 4 hours. FIGS. 17A-17D show energy-dispersive x-ray (EDX) mapping images for the glass-ceramic of Example 131, after ceramming at 920° C. for 4 hours, for elements Mg, Ti, Al and Si, respectively. Without being bound by theory, the glass-ceramic in FIGS. 16A-B and 17A-D may exhibit translucency or opacity depending on the size of the crystals in the crystalline phase or the amount of the formed armalcolite phase.

Figure 18A:
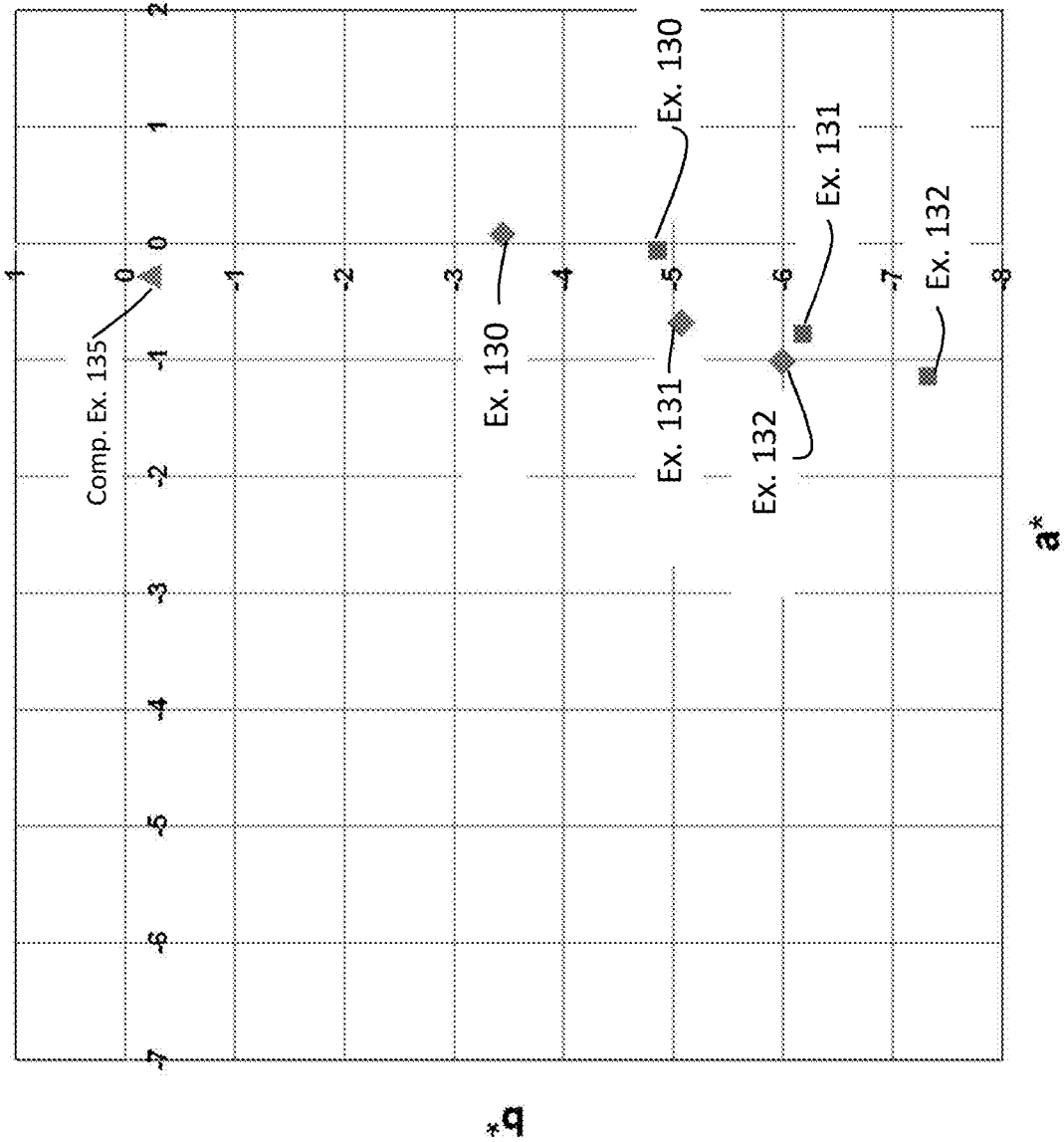
FIG. 18A is a graph of CIELAB color space coordinates a* and b* for glass-ceramics formed from Examples 130-132 and Comparative Example 135.
Figure 18B:
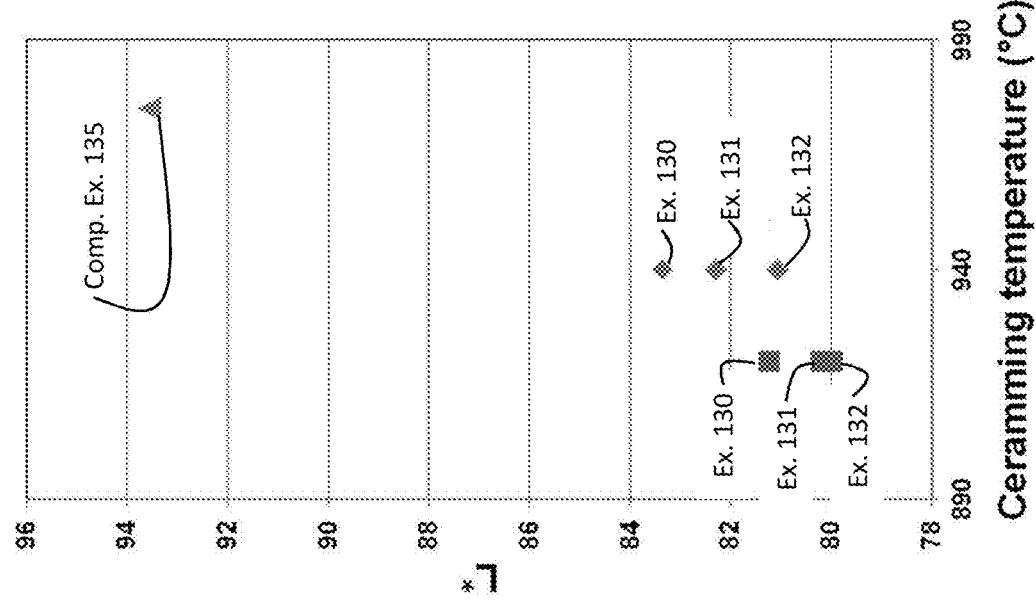
FIG. 18B is a graph of CIELAB color space coordinate L* for glass-ceramics formed from Examples 130-132 and Comparative Example 135.

FIGS. 18A and 18B shows graphical representations of CIELAB color space coordinates L*, a* and b* for the glass-ceramics formed form Examples 130-132 and Comparative Example 135, as measured using a spectrophotometer (supplied by X-rite, model Color i7) with illuminant F02 and specular reflectance included. In FIGS. 18A and 18B, the square data points and diamond data points indicate color coordinates measured after ceramming at 920° C. for 4 hours and 940° C. for 4 hours, respectively.

Figure 19:
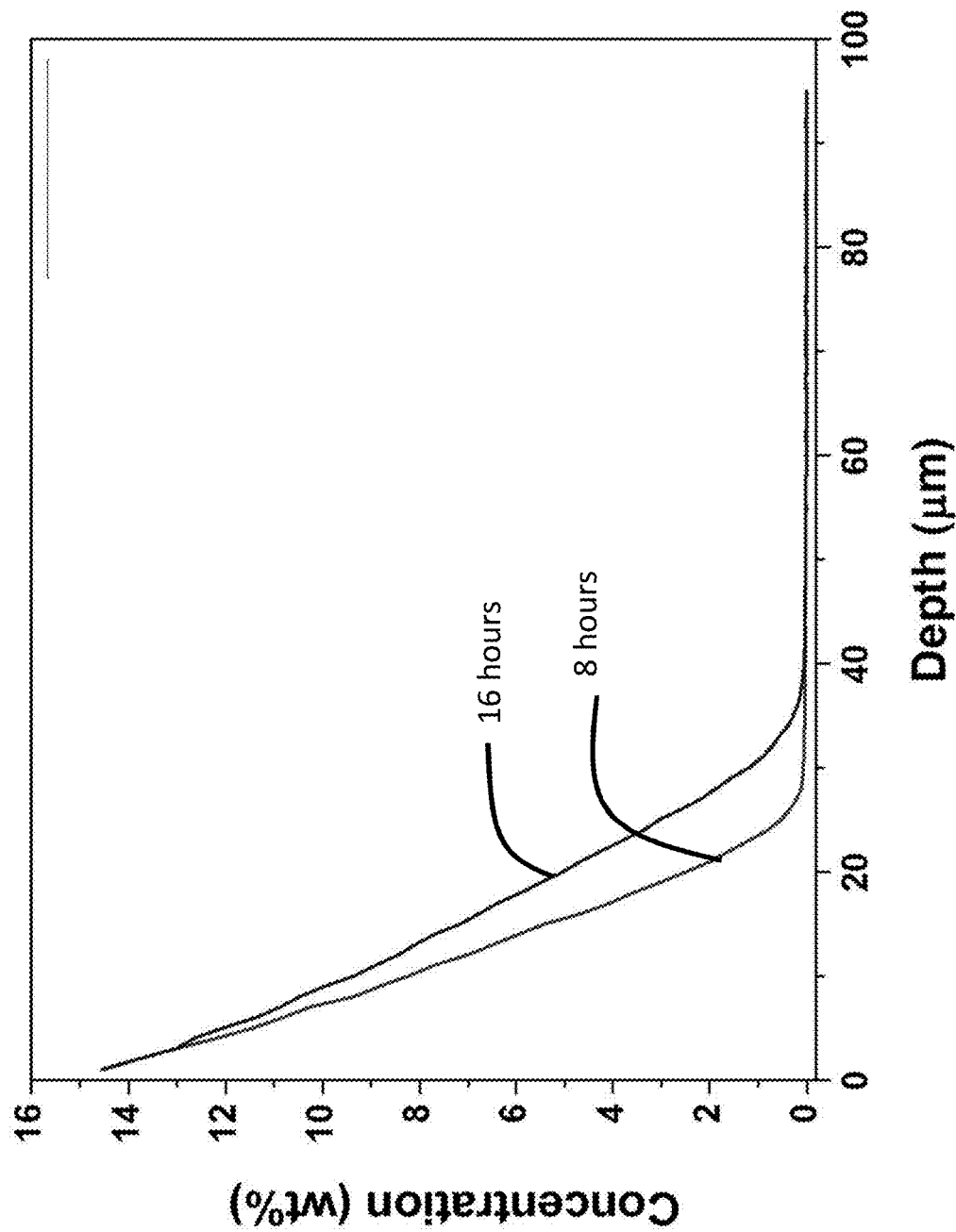
FIG. 19 is a graph showing the concentration of $K^+$ ions present in a glass-ceramic formed from Example 131 (after ceramming at 920° C. for 4 hours) as a function of depth, after being ion exchanged in a molten salt bath including $KNO_3$, having a temperature of 430° C., for two different time periods: 8 hours and 16 hours.

FIG. 19 shows the concentration of K+ ions present in a glass-ceramic formed from Example 131 (after ceramming at 920° C. for 4 hours) as a function of depth, after being ion exchanged in a molten salt bath including $KNO_3$, having a temperature of 430° C., for two different time periods: 8 hours and 16 hours.

Figure 20:
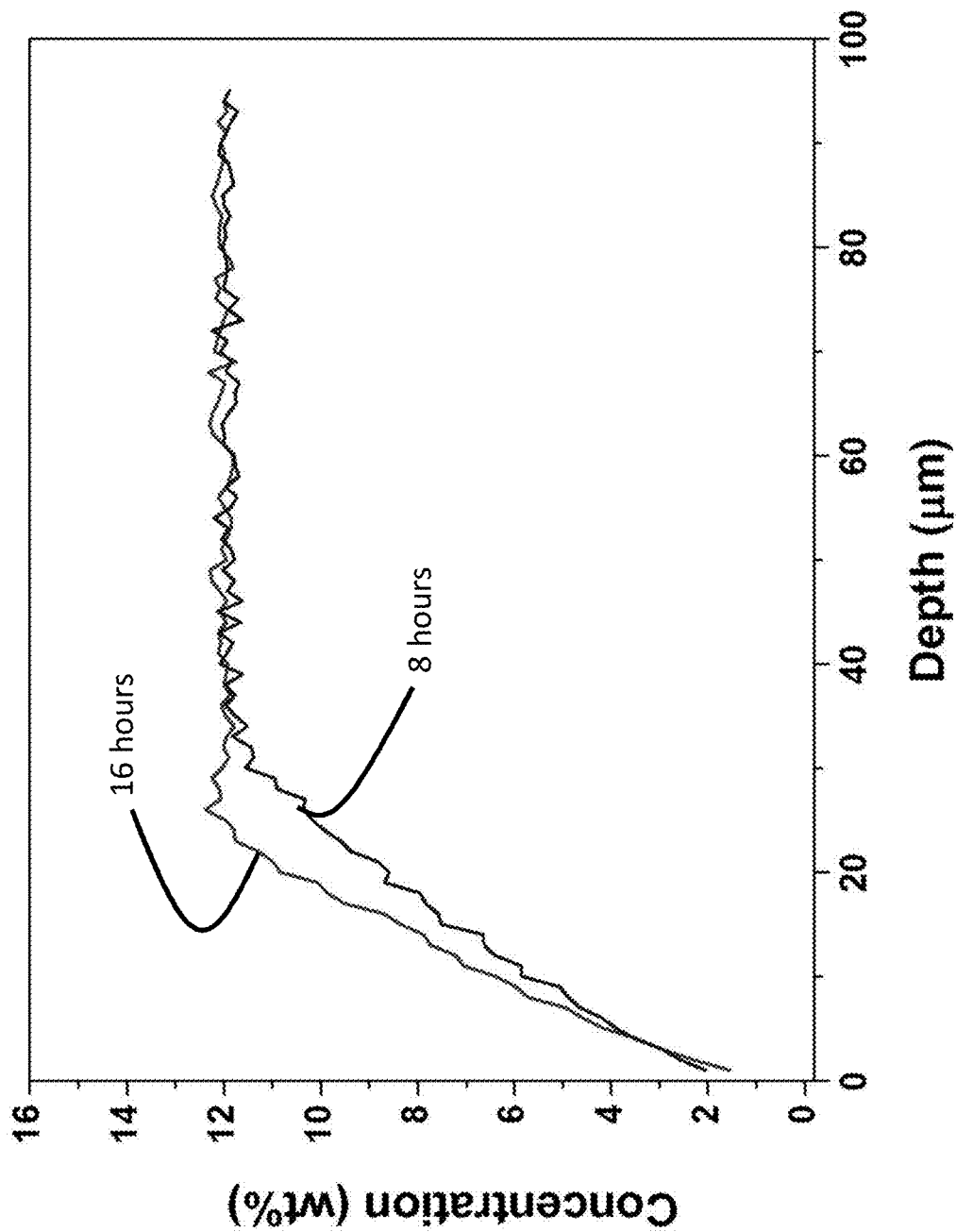
FIG. 20 is a graph showing the concentration of $Na^+$ ions present in the glass-ceramic formed from Example 131 (after ceramming at 920° C. for 4 hours) as a function of depth, after being ion exchanged in a molten salt bath including $NaNO_3$, having a temperature of 430° C., for two different time periods: 8 hours and 16 hours.

FIG. 20 shows the concentration of Na+ ions present in the glass-ceramic formed from Example 131 (after ceramming at 920° C. for 4 hours) as a function of depth, after being ion exchanged in a molten salt bath including $NaNO_3$, having a temperature of 430° C., for two different time periods: 8 hours and 16 hours.

Various modifications and variations can be made to the materials, methods, and articles described herein. Other aspects of the materials, methods, and articles described herein will be apparent from consideration of the specification and practice of the materials, methods, and articles disclosed herein. It is intended that the specification and examples be considered as exemplary.

What is claimed is:

1. A glass-ceramic article comprising:
a predominant crystalline phase comprising anatase, rutile, or a combination thereof; and a composition, in mol %, comprising:
$SiO_2$ in the range from about 45 to about 75;
$Al_2O_3$ in the range from about 4 to about 25;
$P_2O_5$ in the range from about 0.1 to about 10;
MgO in the range from about 0 to about 4;
$R_2O$ in the range from about 0 to about 33;
ZnO in the range from about 0 to about 5;
$ZrO_2$ in the range from about 0 to about 4;
$TiO_2$ in the range from about 0.5 to about 10; and
$B_2O_3$ in the range from about 0 to 4.44,
wherein $R_2O$ comprises one or more of $Na_2O$, $Li_2O$ and $K_2O$.

2. The glass-ceramic article of claim 1, wherein ($R_2O$—$Al_2O_3$) is in the range from about −4 to about 4.

3. The glass-ceramic article of claim 1, wherein the composition comprises, in mol %,
$Li_2O$ in the range from about 0 to about 12;
$Na_2O$ in the range from about 4 to about 20; and
$K_2O$ in the range from about 0 to about 2.

4. The glass-ceramic article of claim 1, wherein the composition comprises, in mol %, $B_2O_3$ in the range from about 2 to 4.41.

5. The glass-ceramic article of claim 1 further comprising a total crystalline phase of up to 20% by weight.

6. The glass-ceramic article of claim 1, further comprising a compressive stress layer extending from a surface of the glass-ceramic article to a depth of the compressive stress layer, the compressive stress layer comprising a compressive stress of about 200 MPa or greater and the depth of compressive stress layer of about 15 µm or greater.

7. The glass-ceramic article of claim 6, further exhibiting a Vickers indentation crack initiation load of about 10 kgf or greater.

8. A glass-ceramic article comprising:
   a predominant crystalline phase comprising anatase, rutile, or a combination thereof,
   wherein the glass-ceramic article is formed from a precursor glass having a liquidus viscosity of about 20 kP or greater.

9. The glass-ceramic article of claim 8, wherein the predominant crystalline phase comprises crystals having a length of about 1 µm or less and a width of about 50 nm or less.

10. The glass-ceramic article of claim 8, wherein the combined amount of anatase and rutile is less than about 12 wt. %, of the glass-ceramic article.

11. The glass-ceramic article of claim 8, further comprising
   a color presented in CIELAB color space coordinates determined from specular reflectance measurements selected from any one of:
   CIE a* in the range from about −2 to about 8, CIE b* in the range from about −7 to about 30, and CIE L* in the range from about 85 to about 100; and
   CIE a* in the range from about −1 to about 0, CIE b* in the range from about −7 to about −3, and CIE L* in the range from about 85 to about 100.

12. The glass-ceramic article of claim 8, further exhibiting a Vickers indentation crack initiation load of about 10 kgf or greater.

13. An electronic or portable computing device comprising the glass-ceramic article of claim 1.

14. An electronic or portable computing device comprising the glass-ceramic article of claim 8.

* * * * *

UNITED STATES PATENT AND TRADEMARK OFFICE
CERTIFICATE OF CORRECTION

PATENT NO. : 10,544,059 B2
APPLICATION NO. : 15/706044
DATED : January 28, 2020
INVENTOR(S) : Matthew John Dejneka et al.

It is certified that error appears in the above-identified patent and that said Letters Patent is hereby corrected as shown below:

On the Title Page

Page 2, Column 2, item [56], Line 23, delete "Li2O3" and insert -- Li2O --, therefor.

Page 3, Column 1, item [56], Line 5, delete "Absortpion" and insert -- Absorption --, therefor.

Page 3, Column 1, item [56], Line 10, delete "Noncrystalline" and insert -- Non-crystalline --, therefor.

Page 3, Column 1, item [56], Line 16, delete "Crystallizaiton" and insert -- Crystallization --, therefor.

Signed and Sealed this
Twenty-fourth Day of March, 2020

Andrei Iancu
*Director of the United States Patent and Trademark Office*